United States Patent [19]

Nagasawa et al.

[11] Patent Number: 5,566,378
[45] Date of Patent: Oct. 15, 1996

[54] MOVABLE HEAD POSITION CONTROLLING DEVICE FOR MAGNETIC RECORDING AND REPRODUCING APPARATUSES

[75] Inventors: Masato Nagasawa; Eiji Yokoyama, both of Nagaokakyo, Japan

[73] Assignee: Mitsubishi Denki Kabushiki Kaisha, Tokyo, Japan

[21] Appl. No.: 304,411

[22] Filed: Sep. 9, 1994

Related U.S. Application Data

[62] Division of Ser. No. 48,951, Apr. 14, 1993, Pat. No. 5,404, 252, which is a continuation of Ser. No. 723,255, Jun. 28, 1991, abandoned.

[30] Foreign Application Priority Data

Jun. 28, 1990 [JP] Japan .................................. 2-171075
Feb. 8, 1991 [JP] Japan .................................. 3-17443

[51] Int. Cl.⁶ ............................................ G11B 21/02
[52] U.S. Cl. ..................................... 360/77.16; 360/77.17
[58] Field of Search ........................... 300/77.16, 77.17, 300/78.09, 77.03, 77.13

[56] References Cited

U.S. PATENT DOCUMENTS

| | | | |
|---|---|---|---|
| 3,626,264 | 12/1971 | Halfhill et al. | 388/816 |
| 4,379,256 | 4/1983 | Maury | 318/561 |
| 4,392,163 | 7/1983 | Rijckaert | 360/76 |
| 4,679,103 | 7/1987 | Workman | 360/78.07 |
| 4,760,471 | 7/1988 | Brush et al. | 360/10.2 |
| 4,851,754 | 7/1989 | Sakamoto et al. | 318/616 |
| 4,954,902 | 9/1990 | Furuhata et al. | 360/10.2 |
| 5,090,005 | 2/1992 | Hara et al. | 369/97 |
| 5,313,347 | 5/1994 | Mitsuhashi | 300/77.16 |
| 5,343,342 | 8/1994 | Kanagawa et al. | 300/77.16 |
| 5,384,676 | 1/1995 | Yokoyama et al. | 360/77.13 |

FOREIGN PATENT DOCUMENTS

| | | |
|---|---|---|
| 0361381 | 4/1990 | European Pat. Off. . |
| 53-118012 | 10/1978 | Japan . |
| 1-253881 | 11/1989 | Japan . |

*Primary Examiner*—Aristotelis Psitos
*Assistant Examiner*—James T. Wilson

[57] ABSTRACT

A movable head position controlling device for magnetic recording and reproducing apparatuses. The position of a magnetic head is detected. The magnetic head is driven by an actuator in accordance with a driving signal. The driving signal is corrected on the basis of the estimated speed of the magnetic head, the absolute height of the movable head, the displacement of the magnetic head, or the output of an equivalent coil. The speed of the magnetic head is estimated by a speed estimating observer. The absolute height is detected by a magnetic field detecting element. The displacement of the magnetic head is detected by non-contacting sensors attached to a member which moves together with the magnetic head and a member which does not move together with the magnetic head, respectively.

21 Claims, 68 Drawing Sheets ns

MOVABLE HEAD POSITION CONTROLLING DEVICE FOR MAGNETIC RECORDING AND REPRODUCING APPARATUSES

This application is a divisional of application Ser. No. 08/048,951, filed on Apr. 14, 1993, which issued as U.S. Pat. No. 5,404,252 filed on Apr. 15, 1995, which is a Rule 62 Continuation of Ser. No.: 07/723,255 filed on Jun. 28, 1991, now abandoned, the entire contents of which are hereby incorporated by reference.

BACKGROUND OF THE INVENTION

1. Field of the Invention

The present invention relates to a movable head position controlling device which is used for magnetic recording and reproducing apparatuses such as a video tape recorder (hereinunder referred to as "VTR").

2. Description of the Related Art

In a magnetic recording and reproducing apparatus such as a VTR, a movable head is used. The movable head is a head which is displaced in accordance with a deflection signal which is supplied from a driving control device. In a VTR, the movable head is provided in such a manner that the end of the movable head projects from the peripheral surface of a rotary drum. By driving the movable head in the state in which a magnetic tape passes over the peripheral surface of the rotary drum, the magnetic head is enabled, for example, to follow a track which is formed on the magnetic tape.

FIG. 46 shows an example of the structure of a movable head. The movable head is composed of a tongue-like piezoelectric bimorph 101 which is bent in accordance with the voltage applied thereto and a magnetic head 103 which is disposed at the free end of the bimorph 101. The magnetic head 103 is fixed to the bimorph 101 and the other end of the bimorph 103 is fixed to the inside of a rotary head (not shown). FIG. 46, and later-described FIGS. 49 and 50 show the positions of a bimorph and a magnetic head on a rotary drum. In these drawings, the circle at the back of the bimorph and the magnetic head represents the outline of the rotary drum.

In FIG. 46, a sensor 102 is a piezoelectric generator formed by cutting a part of the bimorph 101.

When a voltage is applied to the bimorph 101 and the bimorph 101 is warped in accordance with the voltage, the bimorph 101 assumes the state shown in FIG. 47. The angle θ (deg) shown in FIG. 47 is called the amount of inclination of the magnetic head 103 and ξ is called the displacement of the magnetic head 103.

FIG. 48 shows the relationship between the amount of inclination θ (deg) of the magnetic head 103 and the effective length of the bimorph 101. As shown in FIG. 48, as the effective length of the bimorph 101 becomes longer, the amount of inclination of the magnetic head 103 reduces. As the amount of inclination of the magnetic head 103 becomes smaller, the end surface of the magnetic head comes into better contact with the magnetic tape which passes over the peripheral surface of the rotary drum, so that it is possible to record or reproduce a high-frequency signal with higher accuracy. Especially, in the case in which it is necessary to greatly displace the magnetic head 103, that is, it is necessary to increase ξ as at the time of superior reproduction of a VTR, it is preferable that the amount θ (deg) of inclination of the magnetic head 112 is small, that is, the bimorph 101 has a long effective length.

The structure of a bimorph having a longer effective length is shown in FIG. 49. In FIG. 49, a bimorph 201 is comparatively long and it is disposed obliquely relative to the radius of the rotary head. The effective length (the projected length in the right and left direction in the drawing) of the bimorph 201 is therefore longer than that of the bimorph 101 shown in FIG. 46.

The structure of a bimorph having an even longer effective length is shown in FIG. 50. In FIG. 50, an annular bimorph 301 is adopted. The effective length (the projected length in the right and left direction in the drawing) of the bimorph 301 is therefore longer than that of the bimorph 201 shown in FIG. 49.

On the other hand, if the effective length of a bimorph is long, the serial resonance frequency and the parallel resonance frequency become low. FIG. 51 shows an example of the frequency characteristic of a bimorph. In a general frequency characteristic of a bimorph, the phase reverses by 180° when the frequency reaches the primary serial resonance frequency (the frequency at the lower serial resonance point of the two shown in FIG. 51). For this reason, in a VTR system in which tracking is carried out by a movable head, the control frequency band is set at a frequency band lower than the primary serial resonance frequency. If the interval between the primary serial resonance frequency and the secondary serial resonance frequency or the interval between the primary serial resonance frequency and the parallel resonance frequency is long, the control frequency band is set at a frequency band between the primary serial resonance frequency and the secondary serial resonance frequency or between the primary serial resonance frequency and the parallel resonance frequency by phase advancing control. Accordingly, when the effective length of a bimorph is long, it is difficult to secure a sufficiently wide control frequency band, thereby making sufficient tracking difficult. For example, if a track formed on the magnetic tape is rolled, it is difficult for the magnetic head to follow the rolling.

Such a defect can be ameliorated by reducing the peak gain at the serial resonance frequency to a certain extent. By differentiating the output of the sensor, it is possible to reduce the peak of the gain at the serial resonance frequency which is contained in the output.

It is also possible to use an actuator having the structure shown in FIG. 52 in order to drive the magnetic head. The structure of the actuator shown in FIG. 52 will now be explained and the structures of conventional control devices will next be explained.

The actuator shown in FIG. 52 displaces a magnetic head at a large amplitude without inclining the magnetic head. Two magnets 401 and 402 are vertically provided in the actuator, and a yoke 403 is disposed between the magnets 401, 402. An annular yoke 404 is further provided with a gap between the annular yoke 404 and the yoke 403. On the upper side and the lower side of the yoke 404 are provided yokes 405 and 406, respectively. These yokes form a magnetic path for the magnetic fluxes produced by the magnet 401 or 402.

In this actuator, the magnet 401, the yoke 403 and the magnet 402 are disposed within a bobbin 408 which has an actuator coil 407 wound therearound. The actuator coil 407 is situated between the yokes 403 and 404, namely, within the gap. Therefore, when a current flows on the coil 407, a force is applied to the coil 407 in the vertical direction in the drawing. The direction in which the bobbin 408 is moved by this force is regulated by gimbal springs 409 and 410, and the bobbin 408 vertically moves.

Each of the gimbal springs 409, 410 is composed of a discal thin metal sheet provided with a plurality of arcuate slits (not shown). At the centers of the gimbal springs 409, 410, holes are formed, and the bobbin 408 is fitted in the holes so as to be fixed on the inner peripheral edges of the gimbal springs 409, 410. The outer peripheral edges of the gimbal springs 409, 410 are fixed to the yokes. The gimbal springs 409, 410 are parallel to each other.

One 410 of the gimbal springs is integrally formed with a leaf spring 411. The leaf spring 411 is fixed to the bobbin 408 and the free end thereof is fixed to a magnetic head 412. Therefore, the actuator shown in FIG. 52 can displace the magnetic head 412 at a large amplitude without inclining the magnetic head 412.

(1) First example of a conventional device

FIG. 53 shows the structure of a conventional movable head position controlling device for magnetic recording and reproducing apparatuses which is described in Japanese Patent Laid-Open No. Sho. 52-117107. The structure of the device will now be explained on the assumption that the actuator shown in FIG. 52 is used and wobbling servo control is executed.

In this device, the output of a sensor 502 which is formed by cutting a part of a bimorph 501 is a signal which indicates the instantaneous value of the position of a magnetic head 512. The phase of this signal is 90° delayed with respect to the signal for driving the bimorph 501 (the output signal of a driving amplifier 510). A high-impedance amplifier 503 is an amplifier having a high input impedance, and the output of the sensor 502 is amplified by the high-impedance amplifier 503. The sensor 502 is equivalent to a series circuit of a capacitor and a voltage source as viewed from the input terminal of the high-impedance amplifier 503. Since the input impedance is high, the high-impedance amplifier 503 does not constitute a load to the sensor 502.

A differentiator 505 is provided via an adder 504 at a subsequent stage to the high-impedance amplifier 503, and the output of the adder 504 is differentiated by the differentiator 505. Since the output of the high-impedance amplifier 503 indicates the instantaneous value of the position of the magnetic head 512, the result of the differentiation is a signal which indicates the instantaneous value of the speed of the magnetic head 512. The frequency characteristic of the differentiator 505 is a phase advancing characteristic such as that of a high-pass filter. The differentiator 505 can be utilized for reducing the peak gain at a serial resonance frequency to a certain extent. That is, it is possible to reduce the peak of the output of the adder 504 by differentiation.

To the differentiator 505, a low-pass filter 506, a phase advancing circuit 507, a variable gain amplifier 508 are connected in series. The cutoff frequency of the low-pass filter 506 is set so as to attenuate a signal produced by the secondary and higher-order resonance frequencies of the bimorph 501 from among the outputs of the differentiator 505. When a signal passes through the low-pass filter 506, the phase of the signal delays. The phase advancing circuit 507 has a function of advancing the phase of the output of the low-pass filter. The phase advancing circuit 507 compensates for the phase delay in the vicinity of the serial resonance point of the bimorph 551. As a result, of the signals output from the phase advancing circuit 507, the frequency component in the vicinity of the serial resonance point of the bimorph 551 has a phase of clear 0°. The variable gain amplifier 508 is adjustable in order to correspond to the nonuniformity in the characteristic of the bimorph 501.

The output of the variable gain amplifier 508 is input to the driving amplifier 510 via an adder 509. The driving amplifier 510 amplifies the output of the adder 509 and supplies the amplified output to the bimorph 501 as a deflection signal. In this way, the bimorph 501 is driven in accordance with the output of the driving amplifier 510. The above structure can be said to constitute a feedback loop for controlling the driving of the bimorph 501. In other words, by supplying a deflection signal to the bimorph 501, the resonance vibration of the bimorph 501 is suppressed.

The adder 504 between the high-impedance amplifier 503 and the differentiator 503 adds the output of the high-impedance amplifier 503 and the output of a potentiometer 511 and supplies the sum to the differentiator 505. The differentiator 505 fetches the output of the adder 509. It is in order to suppress the frequency component in the vicinity of the parallel resonance point of the bimorph 501 (zero adjustment) that the output of the high-impedance amplifier 503 and the output of a potentiometer 511 are added. Such suppression is possible because the deflection signal is supplied to the bimorph 501, so that the phase of the signal output from the sensor 502 is shifted by 180° at the parallel resonance point. By utilizing the potentiometer 511 in this way, the servo system is stable in the vicinity of the parallel resonance point.

In this structure, however, that is, in the structure in which the peak gain at the serial resonance point is suppressed by the differentiator 505, since the noise contained in the deflection signal, which is the output of the sensor 502, is also amplified, it is impossible to secure a large loop gain of the loop for controlling the bimorph 501.

As a result, there is a trade-off relationship between the good contact between the magnetic head 512 and the magnetic tape, and the sufficient frequency band and loop gain for control. In this way, there is a certain limitation to damping control.

FIG. 53 also shows the structure of a wobbling servo system. The output of the magnetic head 512 is supplied not only to a video signal processor 513 but also a wobbling servo system which is composed of a head position controller 514, a frequency compensator 515 and a converter reset signal generator 516. The output of the wobbling servo system is supplied to the adder 509.

Wobbling servo control is a control for constantly maximizing the amplitude of a reproduction signal from the magnetic head 512. As a tracking control system, a pilot system and a wobbling system are conventionally adopted. In this conventional device, a wobbling system is adopted.

In a pilot system, a multiplicity of pilot signals for tracking servo control are recorded on the same recording track or a multiplicity of pilot signals which belong to the gap between the recording signal frequency allocation are recorded on different tracks so that signals recorded thereon are different from each other. In this system, the levels of the signals obtained as a crosstalk from the adjacent tracks are compared at the time of reproduction and the direction and the amount of off-track are detected. The results of detection are used for the control of the position of the magnetic head.

In a wobbling system, the magnetic head is forcibly vibrated minutely at the time of recording, and the frequency component of the minute vibration which is contained in the reproduction envelope signal is synchronously detected in accordance with magnetic head vibration commanding information. As a result of the synchronous detection, the direction and the amount of off-track are detected.

To state this more explicitly, in a wobbling system, the object of control is an electromagnetically driven actuator 518 having a structure in which the magnetic head 512 is driven when a current is supplied to the actuator 517, as shown in FIG. 54. The wobbling servo system includes a head amplifier 519 for amplifying the output of the magnetic head 512, a wobbling servo circuit 520 for executing wobbling servo control in accordance with the signal which is amplified by the head amplifier 519, and a driver 521 for supplying a current to an actuator coil 517 in accordance with the output of the wobbling servo circuit 520. In the circuit shown in FIG. 53, the function of the wobbling servo circuit 520 is chiefly assigned to the frequency compensator 515.

In the circuit shown in FIG. 53, the output of the magnetic head 512 is first processed by the head position controller 514. The head position controller 514 generates a tracking correction signal from the output of the magnetic head 512. The frequency compensator 515 compensates the frequency in accordance with the output of the head position controller 514 and the output of the converter reset signal generator 516. The converter reset signal generator 516 outputs a signal for moving (resetting) the magnetic head 512 to the tracking starting position. The adder 509 adds the output of the variable gain amplifier 508 and the output of the frequency compensator 515, and supplies the sum to the driving amplifier 510 and the potentiometer 511.

In this way, in this conventional device, good tracking is possible while maintaining a good contact between the magnetic head and the magnetic tape. This is because the wobbling servo system is adopted.

The conventional device having the above-described structure, however, suffers from problems such as the limitation in the control frequency band and the oscillation of the tracking servo system as follows.

When the magnetic head is driven by the actuator having the structure shown in FIG. 52, the phase reversal is caused due to the mechanical resonance of the gimbal springs and the leaf spring. The frequency characteristic of this actuator is such as that shown in FIG. 55, and the phase is reversed by 180° at a frequency above the primary serial resonance frequency. Therefore, the control frequency band must be set at a frequency band sufficiently lower than the primary serial resonance frequency. If the control frequency band is raised beyond this limitation, the phase margin of the servo system is deteriorated due to the phase reversal caused by the mechanical resonance and the gain margin is also deteriorated due to the peak gain produced by the mechanical resonance. As a result, the tracking system is oscillated.

Such problems may be solved by raising the mechanical resonance frequency. In this case, however, the thickness of the gimbal is increased, so that it is necessary to increase the force constant of the actuator, which inconveniently leads to the increase in the dimension of the actuator.

(2) Second example of a conventional device
Head structure

FIG. 56 is a sectional view of the main part of a conventional magnetic recording and reproducing apparatus and FIG. 57 shows the same apparatus with a seat removed therefrom, as viewed in the direction indicated by the arrows A—A in FIG. 56.

In these drawings, the reference numeral 601 represents a fixed drum, 602 a bearing attached to the fixed drum 601, 603 a rotary shaft which is rotatably supported by the bearing 602, 604 a seat fitted over one end of the rotary shaft 603 and 605 a rotary drum attached to the seat 604 by a screw 606. The reference numeral 607 represents an actuator attached to the rotary drum 605 by a screw 608, 609 a lower transformer attached to the fixed drum 601, 610 an upper transformer attached to the seat 604, 611 a distribution board, 612 a contact which does not rotate and which supplies a control current to the actuator 607, 613 rotary electrode which is provided at a part of the seat 604 in such a manner as to come into sliding contact with the contact 612, and 614 and 615 connecting portions. The rotary electrode 613 is electrically connected to the actuator 607 through the connecting portions 614, 615 and the distribution board 611. The reference numeral 616 represents a magnetic head (hereinunder referred to as "movable head") attached to the actuator 607. The movable head 616 is electrically connected to an actuator controller through a connecting portion 617, the distribution board 612 and the connecting portion 615. The reference numeral 618 denotes a recessed portion provided at a part of the rotary drum 605 for receiving the actuator 607. The recessed portion 618 is made larger than the actuator 607 so as to allow the position control of the movable head 616. A plurality of holes 619 used for the position control of the movable head 616 are provided in the recessed portion 618. The reference numeral 620 represents a magnetic tape which passes over the outer peripheral surface of the rotary drum 605 and comes into sliding contact with the movable head 606 during travelling.

FIG. 58 is a plan view of the actuator 607, FIG. 59 shows the same actuator 607, as viewed in the direction indicated by the arrows B—B in FIG. 58, and FIG. 60 is a sectional side elevational view thereof, as viewed in the direction indicated by the arrows C—C in FIG. 58. The reference numeral 621 represents a first yoke composed of a magnetic material and 622 a first permanent magnet which is columnar and fixed to the first yoke 621. A second yoke 623 composed of a magnetic material and provided with a convex portion 623b at a part of the inner periphery thereof is attached to the first yoke 621. A third yoke 624 composed of a magnetic material is attached to the second yoke 623. The reference numeral 625 represents a second permanent magnet which is columnar and fixed to the third yoke 624 with the same magnetic pole opposed to each other, and 626 a pole piece composed of a magnetic material and fixed to either the second permanent magnet 625 or the first permanent magnet 622 at an intermediate position therebetween. A leaf spring 627 is composed of a thin nonmagnetic material. The peripheral edge of the leaf spring 627 is clamped between the first yoke 621 and the second yoke 623, and the extending portion 627a thereof projects outward through windows 621a, 623a provided on the first yoke 621 and the second yoke 623, respectively. The movable head 616 is attached to the end of the extending portion 627a. A leaf spring 628 composed of a thin nonmagnetic material is clamped between the second yoke 623 and the third yoke 624. Fixing members 629 are held by the leaf springs 627 and 628. A bobbin 630 is fixed to the fixing members 629 by an adhesive 632 with a gap between the inner periphery of the bobbin 630 and the outer peripheries of the first permanent magnet 622, the second permanent magnet 625 and the pole piece 626. The reference numeral 631 denotes a coil composed of an electric wire coated with a coating material and wound around the bobbin 630. The bobbin 631 is accommodated in the annular gap G formed by the convex portion of the second yoke 623.

FIG. 61 shows the magnetic head mounted on the rotary drum 605 in the case of being used for a magnetic tape unit in accordance with the present VHS format. The movable head 616 is used as a pair of magnetic heads exclusively for superior reproduction mode (mode for fast forwarding or slowly reproducing the recorded video information). The reference numeral 635 represents a pair of EP heads for a long-time mode for recording video information on a narrow track on the video tape for a long time, 636 a pair of SP head for recording and reproducing normal video information on and from a wide track, 637 a pair of audio heads for recording and reproducing audio information, and 638 a pair of FE heads for erasing the recorded information for each track at the time of recording new information thereon.

Control system

FIG. 62 is a block diagram of a conventional control system and FIG. 63 is a perspective view of the magnetic field generator of the conventional device. In these drawings, the reference numeral 640 represents an AC magnetic field generator for supplying two magnetic fields $B_{f1}$, $B_{f2}$ having different frequencies from each other to the movable head 616. The AC magnetic field generator 640 is disposed at a position along the peripheral surfaces of the rotary drum 605 and the fixed drum 601 on the opposite side to the magnetic tape 620, and the position is controllable. The AC magnetic field generator 640 is provided with AC magnetic field generating coils 645, 645a arranged in the axial direction of the rotary drum 605 so as to generate the magnetic fields $B_{f1}$, $B_{f2}$ having different frequencies $f_1$, $f_2$ from each other. The reference numeral 642 denotes a band-pass filter for passing the frequency component $f_1$ therethrough and 643 a band-pass filter for passing the frequency component $f_2$ therethrough.

(3) Third example of a conventional device

FIG. 64 is a circuit diagram of a third example of a conventional device. The reference numeral 746 represents a driver for supplying a current to a coil 745, 747 an oscillator for generating an AC voltage, 748 and 749 rotary transformers for transmitting and receiving a signal to and from a magnetic head in a rotary drum 705, and 750 and 751 recording/reproduction signal amplifiers for amplifying signals from an audio head and a video head and supplying a recording current. The reference numeral 752 denotes a band-pass filter for only passing therethrough a signal which is electromagnetically induced by the oscillating coil 745 and reproduced by an audio head 737 fixed in the rotary drum 705, and 753 a band-pass filter for only passing therethrough a signal which is electromagnetically induced by the oscillating coil 745 and reproduced by a movable head 716. A sample hold circuit 755 holds the output which is reproduced by the movable head 715 at every other rotation of the rotary drum 705, electromagnetically induced by the oscillating coil 745 and amplified. A differential amplifier obtains the difference between the signals of the sample hold circuits 754 and 755 and has the characteristic shown in FIG. 756. The reference numeral 757 denotes a servo compensator composed of a low-pass filter or the like so as to secure the stability in a position fixing control loop, and 758 a driver for supplying a driving current to an actuator 707.

FIG. 66 is a sectional view of the AC magnetic field generating coil 745. The reference numeral 745c represents a magnetic core for concentrating magnetic fluxes generated by the coil 745, 745U a coil for generating AC magnetic fluxes from the AC current flowing thereon, 745L a coil for generating AC magnetic fluxes in the reverse direction to that generated by the coil 745U, 745b a coil holder for accommodating the coils 745U, 745L, and 759 a fixing member for fixing the AC magnetic field generating coil 745. FIG. 67 shows the directions of the magnetic fluxes generated by the AC magnetic field generating coil 745.

(4) Fourth example a conventional device

FIG. 68 is a circuit diagram of a fourth example of a conventional device and FIG. 69 is an enlarged view of the part A in FIG. 68. Two AC magnetic field generating coils 845, 845a, which are so designed as to be insusceptible to the influence of each head such as nonuniformity in the sensitivity, are disposed in the peripheral direction of a rotary drum 805. The reference numeral 850 denotes a first divider for obtaining the ratio of the amplitudes of the outputs of the two AC magnetic field generating coils 845, 845a which are reproduced by a fixed head, and 860 a second divider for obtaining the ratio of the amplitudes of the outputs of the two AC magnetic field generating coils 845, 845a which are reproduced by a movable head 816.

(5) Control of the height of a magnetic head by an actuator

The operation of the actuator 607 in the second example of a conventional device will be explained with reference to FIGS. 56 to 63.

The first permanent magnet 622 generates magnetic fluxes D by the closed magnetic path formed by the pole piece 626, the second yoke 623 and the first yoke 621.

Similarly, the second permanent magnet 625 generates magnetic fluxes E in the direction opposite to that of the magnetic fluxes D by the closed magnetic path formed by the pole piece 626, the second yoke 623 and the third yoke 624.

Both the magnetic fluxes D and the magnetic fluxes E generated in this way intersect the annular gap G in the same direction, and the total magnetic fluxes generated by the first permanent magnet 622 and the second permanent magnet 625 cross the coil 631.

In this state, when a current is caused to flow on the coil 631 from the contact 612 through the electrode 613 and the connecting portions 615, 614, the bobbin 630 and the movable head 616 are integrally moved in the vertical and axial direction.

Consequently, the movable head 616 is displaced in the direction of the width of the magnetic tape 620 and traces the recorded track with high accuracy.

FIG. 70 shows the hysteresis characteristic between the driving current for the magnetic head actuator 607 and the amount of displacement of the movable head 616, and FIG. 71 shows the recording tracking pattern on the magnetic tape 20 at the time of recording signals by using the magnetic head actuator 607 having the hysteresis characteristic shown in FIG. 70.

As is clear from FIGS. 70 and 71, in the case in which the magnetic head actuator 607 is controlled only at the initial stage, the reference position of the magnetic head 616 varies due to the hysteresis characteristic shown in FIG. 70, so that the recorded tracks overlaps by α.

The movable head 616 detects the magnetic fields $B_{f1}$, $B_{f2}$ generated by the AC magnetic field generating coils 645, 645a, respectively, every time the movable head 616 passes the vicinity of the AC magnetic field generator 640, and outputs the detection signal which is proportional to the intensity of the magnetic field. The band-pass filter 642 transmits the signal component S having a frequency of $f_1$ and the band-pass filter 643 transmits the signal component T having a frequency of $f_2$ The levels of these two signal components S, T vary when the movable head 616 is moved in the axial direction of the rotary drum 695, in other words, with a change in the height of the movable head 616, as shown in FIG. 72. If it is assumed that the height of the movable head 616 at which the two signal components S, T are at the same level is magnetic and the level of the signal components at that time is 1, a subtracter 644 obtains the difference between the signal components S and T, feeds back the difference signal to the actuator 607 and moves the movable head 616 in the direction in which the difference becomes zero. In other words, the movable head 616 is moved so that the levels of the signal components S and T are the same, that is, the height of the movable head 616 is magnetic in FIG. 72. Since it is possible to vary the intersection l of the signal components S, T and vary the height magnetic of the movable head 616 by varying the positions or the like of the AC magnetic field generating coils 645, 645a, it is possible to freely determine the reference position of the movable head 616.

Although the control of one movable head is explained in the second example, it is possible to cancel the difference in head level between channels at the time of recording by an apparatus provided with a plurality of movable heads by controlling each movable head in the same way.

As shown in FIG. 73, the AC magnetic fluxes having a frequency of $f_1$ generated by the two coils 645U, 645L of the AC magnetic field generating coil 645 repel each other at the position at which the coils 645U and 645L are opposed to each other, and a region in which the flux density is high and a region in which the flux density is low are formed in the vertical direction.

The AC magnetic flux is reproduced by a reproduction signal amplifier 650 or 651 through a rotary transformer 648 or 649 when the movable head 616 or the audio head 637 passes the AC magnetic field. At this time, the oscillation frequency $f_1$ of the oscillator 647 is set at a frequency higher than the attenuation-frequency limit of the rotary transformers 648, 649 defined by the frequency characteristic on the low frequency side and lower than the frequency at which the driving current becomes difficult to supply due to the inductance of the AC magnetic field generating coil 645. The attenuation-frequency limit of the rotary transformers 648, 649 is generally several 10 KHz to 100 KHz. For example, if the number of turns of the coils 645U, 645L is several hundred and the frequency at which attenuation start is 1 MHz, the oscillation frequency $f_1$ is determined set as, for example, 100 KHz<$f_1$<1 MHz.

The operation of the second example of a conventional device will be explained with reference to FIGS. 64 to 67.

In FIG. 64 and 66, when the magnetic head 716 or the audio head 737 passes the vicinity of the AC magnetic field generating coil 745, the amplitude of the reproduction signal having a frequency of $f_1$ and output from the reproduction signal amplifier 750 or 751 is increased by moving the movable head 716 upward (away from the deck base) and reduced by moving the movable head 716 downward in the case in which the intermediate position between the two coils 745U and 745L is higher than height of the audio head 737 or the fixed height of the movable head 716 at the neutral position. If the intermediate position between the two coils 745U and 745L are lower than the height of the audio head 737 or the fixed height of the movable head 716 at the neutral position, the direction of attenuation of the reproduction signal is reversed. It is now assumed that the detection sensitivity for the signal output from the reproduction signal amplifier 750 as the reproduction signal from the fixed head (audio head) 737 is equal to the detection sensitivity for the signal output from the reproduction signal amplifier 751 as the reproduction signal from the movable head 716 or they are adjusted to be equal by the gain adjustment of the reproduction signal amplifier 750 or 751. The outputs of the reproduction signal amplifiers 750, 751 are passed through the band-pass filters 752, 753, respectively, which transmit only the frequency $f_1$ and unnecessary noise is removed therefrom. These two outputs are supplied to the sample hold circuits 754 and 755 for sample holding or peak holding so as to obtain the maximum levels thereof and thereafter the difference in level is taken out by the differential amplifier 756 so as to obtain the difference in height between the movable head 716 and the fixed head 737 as a function of a voltage. The difference obtained is passed through the phase compensator 757 such as a low-pass filter in the control system, and the control loop is closed in the direction in which the difference in head level is cancelled. Thus, the movable head 716 and the fixed head 737 are held such that there is no difference in head level at the time of recording, either.

Similarly, in the case in which two movable heads 716 are mounted on the rotary drum 705 at the diametrically opposite positions, it is possible to cancel the difference in the head level between channels by providing the above-described head height fixing control system in each actuator.

In this case, the servo band of the position fixing control loop need not be very wide because the position fixing control system only corrects the difference in height between the movable head 716 and the fixed head 737 or difference in height between two movable heads 716. Since the difference in height or level of head is detected at every other rotation of the rotary drum 705, if the rotary drum 750 rotates at a rate of 1,800 rpm, the time corresponding to 30 Hz is wasted by sampling. Therefore, unless the control frequency band is set at not more than several Hz, the control system oscillates. For this reason, the compensator 757 determines the time constant and the gain so that the control frequency band becomes several Hz and the phase gain is not less than 60 deg.

Returning to the second example, it goes without saying that in the head level control system, while the movable head 616 is passing over the magnetic tape along the peripheral surfaces of the drums 601, 605, the recording/reproduction signal amplifier functions as a recording signal amplifier, and while the movable head 610 moved in the vicinity of the AC magnetic field generating coil 645 on the opposite side of the drums 601, 605 with respect to the magnetic tape 620, the recording/reproduction signal amplifier functions as a reproduction signal amplifier.

The head level control system has the above-described structure. In the conventional device shown in FIG. 64, the detection sensitivities of the heads 716, 737 and the reproduction signal amplifiers 750, 751 must be equal to each other or adjusted to be equal. Actually, however, it is often difficult to equally adjust the sensitivities due to the difference in the number of turns between the fixed head 737 and the movable head 716, the difference in magnetic permeability between the head cores, the nonuniformity in the gains of amplifiers 750, 751 and the difference in the temperature characteristics.

As a countermeasure, in an conventional device shown in FIG. 68, two AC magnetic field generating coils 845 and 845a having different oscillation frequencies $f_1$ and $f_2$ are provided and one AC magnetic field generating coil 845 is fixed such that the intermediate height between the two coils is higher than the height of a fixed head 837 and the intermediate height between the two coils of the other AC magnetic field generating coil is lower than the height of the fixed head 837. At this time, if the height of a movable head 816 is so controlled that the amplitude ratio of the output having a frequency of $f_1$ which is electromagnetically induced by the oscillating coil 845 and reproduced by the fixed head 837 and the output having a frequency of $f_2$ which is electromagnetically induced by the oscillating coil 845*a* and reproduced by the fixed head 837 is equal to the amplitude ratio of the outputs of the movable heads 816, it is possible to cancel the difference in height between the movable head 816 and the fixed head 837 irrespective of the difference in the number of turns between heads, the difference in magnetic permeability between the head cores, the nonuniformity in the gains of amplifiers and the difference in the temperature characteristics so long as the frequency characteristics of the fixed head system and the movable head system are not greatly deviated from the frequency characteristic of each of the heads and reproduction signal amplifiers at the frequencies $f_1$ and $f_2$. The output reproduced by the movable head 816 is input to band-pass filters 853, 853*a* for transmitting only the frequencies $f_1$ and $f_2$, respectively, and the amplitudes of the reproduced signals are input to a divider 860 through sample hold circuits (or peak hold circuits) 855, 855*a* and taken out as a division signal. Similarly, the output reproduced by the fixed head 837 is input to band-pass filters 852, 852*a* for transmitting only the frequencies $f_1$ and $f_2$, respectively, and the amplitudes of the reproduced signals are input to a divider 859 through sample hold circuits 854, 854*a* and taken out as a division signal. The difference between these division signals is obtained by a differential amplifier 856, whereby it is possible to detect the direction and the amount of deviation of the height of the movable head 816 from the height of the fixed head 837. For example, if the top of the movable head 816 is situated at a position higher than the top of the fixed head 837 (the movable head 816 deviates from the fixed head 837 in the direction which is away from the deck base), in the reproduction signal of the movable head 816, the amplitude of the frequency component $f_1$ is larger than that of the frequency component $f_2$ as compared with the reproduction signal of the fixed head 837. Consequently, the output signal of the differential amplifier 856 is negative, so that the movable head 816 is moved down to the position at which there is no difference in head level.

In the above-described manner, accurate head level control is executed even if there is nonuniformity in sensitivity between the heads 816, 837 or the head amplifiers 850, 851. The conventional device shown in FIG. 68, however, requires the highly accurate dividers 859, 860, which may lead to rise in cost.

(6) Fifth example of a conventional device

FIG. 74 is a circuit diagram of a fifth example of a conventional device, which does not use a divider. The reference numeral 961 represents a switching circuit, 962 a a timing controller for controlling the holding timings of sample hold circuit 955, 955*a*.

In the fifth example, the output of a fixed head 937 which is amplified by a reproduction signal amplifier 950 and further the outputs of band-pass filters 952, 952*a* for transmitting only the frequencies $f_1$, $f_2$ are so controlled that the amplitudes of the output signals having frequencies of $f_1$ (=150 KHz) and $f_2$ (=200 KHz), respectively, are equal by adjusting the positions at which AC magnetic field generating coils 945, 945*a* are provided and the driving voltages of the drivers 946, 946*a* by adjusting terminals while observing the output level of the reproduction signal. By controlling the height of a movable head 916 so that the amplitudes of the reproduction signal components having frequencies of $f_1$, $f_2$ are equal in this way, it is possible to eliminate the difference in level between the movable head 917 and the fixed head 937 without using a divider.

In this example in which the two movable heads 916 are mounted on a rotary drum at diametrically opposite positions, the control of these heads is executed by distributing a reproduction signal of each channels to four sample hold circuits 955, 955*a* by the analog switching circuit 961 which is provided at the subsequent stage to band-pass filters 953, 953*a*. In this case, two differential amplifiers 956, 956*a*, two compensators 957, 957*a* and two drivers 958, 958*a* are necessary at the subsequent stages. Such correspondence to multi-channels are also applicable to the conventional devices shown in FIGS. 64 and 68. The control frequency band is set in the conventional device shown in FIG. 74 in quite the same way as in the conventional devices shown in FIGS. 64 and 68, and the gain and the phase is compensated for by a compensator. Since a magnetic head generally picks up a magnetic flux in the direction to which the circumference of the rotary drum is connected, if the AC magnetic field generating coils have the configurations shown in FIG. 66, the outputs are taken out in reproduction envelopes such as those shown in FIGS. 75 to 77. In the case of the structure shown in FIG. 74, since the reproduction signal of the fixed head 937 is adjusted so that $f_1$ and $f_2$ are equal, the output signal takes the form shown in FIG. 75. Even if the sensitivity between the head and the head amplifier is deviated from that of the movable head system, when the levels of the frequency components $f_1$ and $f_2$ becomes equal after the control of the movable head 916, as shown in FIG. 77, the difference in head level is cancelled.

(7) Sixth example of a conventional device

FIG. 78 is a circuit diagram of a sixth example of a conventional device. This example has a structure similar to that which is generally used by a minute displacement gauge. An AC magnetic field generating coil 1045 is disposed such that the intermediate height of the two coils thereof is the same as the height of a movable head 1016. When the movable head 1016 is deviated in the vertical direction, the direction and the amount of deviation of head level is detected by detecting the deviation of the amplitude and the phase shift by a synchronous detector 1063, as shown in FIG. 79. In this case, the processing after sample holding the synchronous detection signals is the same as in the conventional devices shown in FIGS. 64, 68 and 74. In this way, if it is possible to control the difference in level between the movable head 1016 and the fixed head 1037 so as to be constantly cancelled at the time of recording, it is unnecessary to attach a fixed head exclusively for recording to a rotary drum 1005, and recording, reproduction and superior reproduction of a video signal, for example, can be assigned to the movable head 1016 mounted on an actuator 1007. In addition, since it is possible to adjust the level of the movable head 1016 to the level of the fixed head 1037, it is possible to mount a Hi-Fi audio head 1037 for a VHS format and an erase head 1038 for recording new information on the recorded track on the rotary drum 1005 and to mount an EP head 1035 and an SP head 1036 on the actuator, as shown in FIG. 80. It is thus possible to greatly simplify the arrangement of heads in comparison with the arrangement shown in FIG. 61.

In the example shown in FIG. 81, the amplitudes of the reproduction signals having frequencies of $f_1$ and $f_2$, respectively, which are output from the fixed head 1037, are adjusted to be equal by adjusting the mounting position of the AC magnetic field generating coils 1045 and the driving voltage levels. However, it is sometimes impossible to make those amplitude equal merely by adjusting the mounting position of the AC magnetic field generating coils 1045 or the driving voltage levels, or the initial adjustment solely is sometimes insufficient for practical use due to temperature characteristics, change with time, etc.

(8) Seventh example of a conventional device

FIG. 81 is a circuit diagram of a seventh example of a conventional device. In this example, an AC magnetic field control system is provided so as to electrically adjust the amplitudes of the reproduction signals of a fixed head 1137 to be equal when they cannot be made equal by the adjustment of the mounting position of an AC magnetic field generating coil 1145. The reference numeral 1165, 1165a represent variable gain control amplifiers for controlling the level of the AC magnetic fields generated by coils 1145 and 1145a.

In this example, the amplitudes of the output signals having frequencies of $f_1$ and $f_2$, respectively, which are output from a fixed head 1137 and passed through band-pass filters 1152, 1152a, are adjusted to be constant by inputting the outputs of sample hold circuits 1154, 1153a to the gain control input terminals of the variable gain control amplifiers 1165, 1165a, respectively. In this way, the amplitude is so controlled as to be constant (in this case, the reproduction outputs of the fixed head 1137 having frequencies $f_1$, $f_2$ are so controlled as to have equal amplitudes) irrespective of variation of the mechanical position control of the AC magnetic field generating coils 1145, 1145a, temperature characteristics, change with time, etc.

(9) Eight example of a conventional device

FIG. 82 is a circuit diagram of an eighth example of a conventional device. This device has the same structure as the device shown in FIG. 81 except that the control of the magnetic field level is executed by adjusting only one AC magnetic field generating coil 1245a. The reference numeral 1266 represents a differential amplifier.

In this example, the signal components having frequencies of $f_1$ and $f_2$ are extracted from the reproduction output of a fixed head 1237 by band-pass filters 1251, 1252a, respectively, and supplied to sample hold circuits 1254, 1254a, respectively. The differential amplifier 1266 obtains the difference between the values output from the sample hold circuits 1254, 1254a and supplies the driving voltage level of the AC magnetic field generating coil 1245a to the variable gain control amplifier 1265. In this way, the reproduction output level from the other AC magnetic field generating coil 1245 and the reproduction output level from the AC magnetic field generating coil 1245a are adjusted to be equal. This example produces a similar effect to that of the example shown in FIG. 81.

By adding the AC magnetic field control system for controlling the AC magnetic field generating coils 1245, 1245a, it is possible to maintain the accuracy of the movable head position control system shown in FIG. 74 even if there is a fluctuation in adjustment of the mounting position of the AC magnetic field generating coils 945, 945a, temperature characteristics, change with time or the like.

Although the devices shown in FIGS. 64 to 82 have analog circuit structures, it goes without saying that the output of a reproduction signal amplifier or a band-pass filter may be subjected to analog-digital conversion, and after processings such as subtraction, sample holding and compensation filtering by a digital circuit or a software in a microcomputer, the processed output may be subjected to digital-analog conversion so as to drive an actuator.

(10) AC magnetic field generating means

The structure of an AC magnetic field generating coil will now be explained in detail.

In order to rapidly change the flux density depending upon locations, it is first necessary to concentrate magnetic fluxes. For example, there is a method of concentrating magnetic fluxes by applying a current to coils which are opposed to each other, as shown in FIG. 67, so as to cause the coils to repel each other.

As shown in FIG. 73, magnetic fluxes are concentrated on the region between the coils. As magnetic fluxes are apart from the core, they rapidly diverge and the flux density becomes low. In this way, this method is favorable because flux density is different in locations. The change in flux density here does not refer to a change in number of magnetic fluxes at a certain position but a change in the flux density in the direction in which a movable head can detect magnetic fluxes with respect to the axial direction of the rotary drum, as described above. It is therefore necessary to investigate the direction of magnetic fluxed generated by an AC magnetic field generating coil. FIG. 83 schematically shows the coordinate plane for examining the magnetic field distribution of an AC magnetic field generating coil 1345. The reference numerals 1345U, 1345L denote coils, 1345c a magnetic core composed of a soft magnetic material such as soft iron, and 1346 an AC power source for applying a current to the two coils 1345U, 1345L. The plane A is a plane which has the center axis L of the magnetic core 1345c as the normal line and which intersects the center of the space between the two coils 1345U, 1345L. The plane B is a plane parallel to the plane A and distant therefrom by d, and the plane C is a plane parallel to the plane A and the plane B and distant from the plane B by d and from the plane A by 2d. The curved surface D is a part of the peripheral surface of a cylinder which has the center axis in the same direction as the center axis L of the magnetic core 1345c and which has a radius of R. It is assumed that the curved surface D represents a peripheral surface of a rotary drum and that the lines where the curved surface D intersect the planes A, B and C represent the loci of the movable head.

Although an AC current is actually applied to the coils 1345U, 1345L, it is assumed here to apply a DC current thereto for the convenience of explaining the principle. FIGS. 84 to 86 schematically show the vectors of magnetic flux on each plane when a DC current is applied th the coils 1345U, 1345L so as to cause the poles to repel each other. In each drawing, the circle represents the cross section of the magnetic core, and the curve X—X' a line where each plane intersects the curved surface D.

Referring first to the plane A, in the region close to the magnetic core 1345c, the vector of magnetic flux on the plane A is large, and as magnetic fluxes are apart from the core, they take a roundabout path, so that the vector of magnetic flux on the plane A is rapidly reduced.

On the plane B which is distant from the plane A by d, since magnetic fluxes take a roundabout path, the vector of magnetic flux on the plane B is at its maximum in a region which is apart from the core 1345c to a certain extent.

This phenomenon is the same with the plane C, but since magnetic fluxes take a roundabout path and the vector of magnetic flux gradually approaches zero, the absolute value of the vector is smaller than that on the plane B.

As described above, the curve X—X' on each plane represents the locus of the movable head, and the direction in which magnetic fluxes can be detected by the movable head is represented by the line connecting the points on the curve X—X'. In FIG. 87, the magnetic fluxes in FIGS. 84 to 86 are converted into AC magnetic fluxes and the curved surface D is developed into a flat plane. Each group of the arrows represents the vector of magnetic flux on the plane D on each line where the plane D intersects the corresponding plane. Since the magnetic fluxes are AC magnetic fluxes, the vector is represented by pairs of arrows pointing the opposite directions.

FIGS. 88 to 90 show the waveforms output by the induced electromotive force of the movable head which has passed the lines where the planes A, B and C, respectively, intersect the curved surface D on the assumption that the magnetic flux distribution is as shown in FIG. 87. As is obvious from the output waveforms, the peak level is different in planes. In this example, the peak level on the plane B is the highest. In other words, the peak level is a nonlinear function which depends upon the amount of displacement of the movable head in the axial direction of the rotary drum. It is therefore possible to know the absolute position of the movable head by detecting the peak level of the output waveform.

In order to control the position by the movable head as a position sensor, the AC magnetic field generating coil 1345 is disposed such that the movable head is fixed in a region in which the variation of the peak level of the output waveform is large, i.e, the region between the plane A and the plane B or the region between the plane B and the plane C in FIG. 87.

The above-explained magnetic field distribution is obtained in the case in which the AC magnetic field generating coil 1345 is driven by a specific AC voltage. The magnetic field distribution is a function which also depends upon a voltage amplitude. Therefore, by controlling the voltage so as to maximize the variation of the peak level of the output waveform with respect to the height of the head, the position of the movable head can be controlled.

The AC magnetic field generating coil 1345 provided in a drum deck in this way may exert a deleterious influence such as generating noise in the linear audio head and erasing information on the magnetic tape. A method of shielding magnetism by covering a part of a magnetic field generating element with a soft magnetic material 1345s, as shown in FIG. 91 is known. FIG. 92 shows the soft magnetic material, as viewed in the direction indicated by the arrows Y—Y. shown in FIG. 91. The above-described deleterious influence is prevented in this way.

The AC magnetic field generating coil 1345 in this example has the structure shown in FIG. 83 so as to concentrate magnetic fluxes. Alternatively, it may have a structure such as those shown in FIGS. 93 and 94 although the sensitivity of the sensor is deteriorated.

In the above-described conventional devices, the mechanical accuracy for mounting the magnetic field generating coil 640, for example, in FIG. 63 is sufficient even with a change with temperature and time taken into consideration. That is, when the accuracy for mounting the coil 640 is sufficiently lower than the tolerable accuracy for fixing the position of the movable head 616, it is possible to set the height of the movable head 616 at the position determined by the mounting position of the magnetic field generating coil 640 in the above-described manner.

Even in the case in which the accuracy for mounting the coil 640 is low, when a rotary drum provided with a plurality of movable heads, as shown in FIG. 63, is used, it is possible to make the relative height of each movable head equal. (In this case, it is impossible to control the height of the head on the basis of the absolute height of the movable head 616 from the deck base which supports the rotary drum 605).

It is also possible to make the height of the movable head 616 equal to the height of the fixed head on the rotary drum.

As described above, it is possible to control the absolute height of the movable head so as to be equal to the position at which the magnetic field generating coil is mounted or to the absolute position of the fixed head, or to control the relative height of each head so as to be equal. In the present system such as the VHS format and the B format, however, there is a case in which the height of the movable head must be so controlled as not to be equal to the height of the fixed head but to be a little deviated therefrom. In addition, in other systems such as an 8-mm video and D-1 or D-2 digital VTR, if it is possible to regulate the absolute height of the movable head from the deck base to a predetermined height, it is possible to form an accurate recorded track in accordance with the corresponding tape format. If the coil mounting accuracy required with due consideration of temperature characteristics and a change with time is not so strict, the working accuracy required for coil is also lessened and the adjustment of the coil becomes easy, which leads to reduction in the cost of the system. A means for detecting the absolute height of the movable head from the deck base is therefore demanded.

In the conventional devices, it is only possible to detect the height of the head at a predetermined point at every rotation of the rotary drum. Since the movable head sometimes moves within one rotation of the drum due to a change in the tension of the magnetic tape or in the sliding friction between the tape and the head, or sometimes mechanically vibrates, it is necessary to take a measure such as reduction in the mechanical resonance by increasing the rigidity of the gimbal spring of the movable head actuator (FIG. 65).

SUMMARY OF THE INVENTION

Accordingly, it is an object of the present invention to eliminate the above-described problems in the related art and to provide a movable head position controlling device for magnetic recording and reproducing apparatuses which is capable of setting a sufficiently wide control frequency band without increasing the size of an actuator and which is capable of damping control of the actuator without using a differentiator.

It is another object of the present invention to provide a movable head position controlling device for magnetic recording and reproducing apparatuses which is capable of regulating the movable head to be a predetermined absolute height (the height of the head from the deck base) which is positioned at the time of recording irrespective of the mounting accuracy for an AC magnetic field generating coil and which is capable of suppressing the deviation of the height and the vibration of the movable head within one rotation of the rotary drum, thereby enabling an ideal recording tracking pattern to be formed in a magnetic recording and reproducing apparatus.

To achieve this aim, in a first aspect of the present invention, there is provided a device having a fundamental structure (first structure) composed of the following elements:

A) a magnetic head moving means for moving the magnetic head in a predetermined direction at a speed which corresponds to a driving signal;

B) a position detecting means for detecting the position of the magnetic head in the predetermined direction and outputting the result as a position deflection signal;

C) a speed estimating means for estimating the speed of the magnetic head in the predetermined direction on the basis of the driving signal and the position deflection signal and outputting the estimated value which is multiplied by a predetermined coefficient; and D) a feedback and damping means for supplying a signal, which is obtained by subtracting the output of the speed estimating means from a signal from another circuit, to the magnetic head moving means as a driving signal so as to damp the magnetic head moving means.

In this structure, it is possible to damp the magnetic head moving means (including an actuator, for example) by the subtraction of a driving signal, in other words, by an electrical means or a software means. It is possible to suppress the mechanical resonance of the magnetic head moving means and enhance the controllability thereof by such damping. In addition, it is possible to take a large feedback gain for damping, especially, in the case in which accurate estimation of the speed of the magnetic head is possible.

In a second aspect of the present invention, there is provided a device having a fundamental structure (second) composed of the following elements:

A) a magnetic head moving means for moving the magnetic head in a predetermined direction at a speed which corresponds to a driving signal and generating a counter electromotive force, which indicates the speed, in the interior of the magnetic head moving means when the driving signal is applied;

B) an equivalent coil having an inductance approximately equal to that of the magnetic head moving means and generating a counter electromotive force, which indicates the speed, in the interior of the equivalent coil when the driving signal is applied;

C) a speed estimating means for estimating the speed of the magnetic head in the predetermined direction by detecting the counter electromotive force generated in the equivalent coil and outputting the estimated value which is multiplied by a predetermined coefficient; and D) a feedback and damping means for supplying a signal, which is obtained by subtracting the output of the speed estimating means from a signal from another circuit, to the magnetic head moving means as a driving signal so as to damp the magnetic head moving means.

In this structure, approximately the same operation and effect as in the first fundamental structure are obtained. This structure, however, is different from the first structure in that the damping is restricted to electrical damping and in the flow and amount of damping. Although the amount of damping is less in this structure, since the structure is inexpensive, this is suitable for a magnetic recording and reproducing apparatus in which the magnetic head position control device is mainly used for controlling the position of the movable head at the time of superior reproduction.

In a third aspect of the present invention, there is provided a device having a fundamental structure (third) composed of the following elements:

A) an actuator disposed in a rotary drum so as to hold a magnetic head such that at least the magnetic head projects from the peripheral surface of the rotary drum and to move the magnetic head in the axial direction of the rotary drum in accordance with a driving signal;

B) a magnetic field detecting element disposed on the peripheral surface of the rotary drum at a predetermined position in the axial direction of the rotary drum so as to detect a magnetic field; and C) an actuator controller for controlling the position of the magnetic head in the axial direction of the rotary drum so as to be equal to that of the magnetic field detecting element, the actuator including:

a) a coil which is disposed outside of the rotary drum in such a manner as to face the peripheral surface of the rotary drum so as to generate a magnetic field in accordance with the supply of an AC current and on which an electromotive force is generated by electromagnetic induction when the magnetic field is intersected by the magnetic head and the magnetic field detecting element during the rotation of the rotary drum; and b) an absolute height correction loop for correcting the driving signal so that the driving signal output when the electromotive force is generated on the coil by the magnetic head is equal to the driving signal output when the electromotive force is generated on the coil by the magnetic field detecting element.

In this structure, the position of the magnetic head is so controlled as to be at a predetermined absolute height. Consequently, it is possible to control the position of the magnetic head irrespective of the mounting accuracy for the magnetic head or the like. In addition, it is possible to form an ideal recording tracking pattern while suppressing the deviation of the height of the movable head and vibration thereof within one rotation of the rotary drum in magnetic recording and reproducing apparatuses of various formats.

In a fourth aspect of the present invention, there is provided a device having a fundamental structure (fourth) composed of the following elements:

A) an actuator disposed in a rotary drum so as to hold a magnetic head such that at least the magnetic head projects from the peripheral surface of the rotary drum and to move the magnetic head in the axial direction of the rotary drum in accordance with a driving signal;

B) a magnetic field detecting element disposed on the peripheral surface of the rotary drum at a predetermined position in the axial direction of the rotary drum so as to detect a magnetic field; and C) an actuator controller for controlling the position of the magnetic head in the axial direction of the rotary drum so as to be equal to that of the magnetic field detecting element, the actuator being disposed outside of the rotary drum and including:

a) a coil which is disposed outside of the rotary drum in such a manner as to face the peripheral surface of the rotary drum so as to generate a magnetic field in accordance with the supply of an AC current and on which an electromotive force is generated by electromagnetic induction when the magnetic field is intersected by the magnetic head and the magnetic field detecting element during the rotation of the rotary drum; and b) a controlling means for controlling the position of the magnetic head in the axial direction of the rotary drum so that the driving signal output when the electromotive force is generated on the coil by the magnetic head is equal to the driving signal output when the electromotive force is generated on the coil by the magnetic field detecting element by supplying a signal to the actuator; and D) a rotary transformer having channels which correspond to the magnetic field detecting element and the magnetic head, respectively, and connecting the magnetic head and the magnetic field detecting element which rotate together with the rotation of the rotary drum to the actuator controller which does not rotate together with the rotation of the rotary drum.

According to this structure, it is possible to bring about the operation and the effect of the third fundamental structure with the same facility as in the second fundamental structure.

In the first and third fundamental structure, the accurate speed can be estimated by using an observer in accordance with the modern control theory as the speed estimating means. A identify and a minimal-order observers are typical of such an observer. A identify observer, which is suitable for the present invention, is composed of the following elements:

A) a model block for electrically simulating the behavior of the magnetic head moving means (or the actuator) and outputting the estimated values of the position of the magnetic head in a predetermined direction (e.g., in the axial direction of the rotary drum) and the speed of the movable head; and B) an estimated speed outputting means for multiplying the estimated value of the speed which is output from the model block by a predetermined coefficient and outputting the product.

In order to stabilize the operation, the co-dimensional observer preferably includes the following elements:

C) an estimated error outputting means for subtracting the estimated value of the magnetic head position which is output from the model block from the position deflection signal and outputting the difference as an estimated error; and D) a means for feeding back the estimated error to the model block.

In the first and the third fundamental structure, the identify observer may adopt the following structure:

A) the magnetic head moving means (or the actuator) includes a fixed portion for supplying a constant magnetic field and a movable portion for generating a magnetic field in accordance with the driving signal and being moved in a predetermined direction (e.g., in the axial direction of the rotary drum) by the interlinkage between the generated magnetic field and the constant magnetic field; and B) the position detecting means includes a magnet fixed to the movable portion, a Hall sensor for detecting the magnetic field generated by the magnet fixed to the fixed portion, and a means for outputting the position deflection signal which indicates the position of the magnetic head in the predetermined direction on the basis of the magnetic field detected by the Hall sensor.

In this case, if the position detecting means further includes a means for magnetically shielding the magnet and the magnetic head, good magnetic recording and reproducing operations are maintained.

The position detecting means may also have the following optical structure. That is, the position detecting means may be composed of:

A) a light emitting portion fixed to the fixed portion so as to emit light; and

B) a light receiving portion fixed to the movable portions so as to receive the light emitted from the light emitting portion, detect the degree of unbalance of the amount of light received, and output the position deflection signal which indicates the position of the magnetic head.

This type of optical structure can produce a similar effect to the effect obtained by magnetic position detection.

The following modification is also possible. That is, the position detecting means may be composed of:

A) a light emitting portion fixed to the fixed portion so as to emit light;

B) a reflecting portion fixed to the movable portion so as to reflect the light emitted from the light emitting portion; and C) a light receiving portion for receiving the light reflected by the reflecting portion, detecting the degree of unbalance of the amount of light received, and outputting the position deflection signal which indicates the position of the magnetic head.

This type of optical structure can again produce a similar effect to the effect obtained by magnetic position detection.

In the case of such optical position detection, a structure in which the light receiving portion is divided into a plurality of light receiving pieces in the predetermined direction, and each difference between these light receiving pieces is detected as the degree of unbalance of the amount of light received is preferably simple.

In such a structure, it is possible to separate the actuator from the driver (i.e., circuit portion). Both the structure in which the driver and the speed estimating means are fixed to the rotary drum and the structure in which the speed estimating means, the feedback and damping means and the driver are disposed outside of the rotary drum are possible. In the latter case, slip rings for connecting the actuator to the driver, and the position detecting means to the speed estimating means, respectively, may be preferably provided.

In the second fundamental structure of the present invention, a structure in which an equivalent resistor having an approximately equal resistance to that of the magnetic head moving means is provided and the counter electromotive force produced in the equivalent coil is detected through the equivalent resistor is more preferable. It is thereby possible to estimate the speed and carry out the damping operation with comparative accuracy.

If a current feedback means is provided in the second fundamental structure, it is possible to use what is called current driving and voltage driving for proper in its proper way by setting the frequency characteristic of the feedback gain. In this case, a driving current detecting means for detecting and outputting the driving signal which is supplied to the magnetic head moving means as a driving current, and a first band limiting means for limiting the detected driving current to a predetermined frequency band are necessary. The current feedback means subtracts the driving current with the frequency band thereof limited from the driving signal which is being supplied to the magnetic head moving means, and supplies the thus-obtained difference signal to the magnetic head moving means as the driving signal.

If a difference current feedback means is provided in the second fundamental structure, it is possible to enlarge the damping band. In this case, a driving current estimating means for converting the counter electromotive force which is detected by the speed estimating means into a current, a driving current error detecting means for obtaining the difference between the converted current and the driving current detected by the driving current detecting means and outputting the difference as the difference signal, and a second band limiting means for limiting the difference signal to a predetermined frequency band are necessary. The difference current feedback means subtracts the difference signal with the frequency band thereof limited from the signal which is supplied from another circuit and supplies the thus-obtained difference signal to the current feedback means.

In the third fundamental structure, it is preferable that a position detecting means for detecting the position of the magnetic head in the axial direction of the rotary drum and outputting the detected position as the deflection position signal is provided and the actuator controller includes a position control loop. The position control loop corrects the driving signal in accordance with the position deflection signal.

It is also preferable that a speed estimating means for estimating the speed of the magnetic head in the axial direction of the rotary drum on the basis of with the position detection signal and the driving signal is provided and that the actuator controller includes a damping loop. The damping loop damps the driving signal in accordance with the speed estimated by the speed estimating means.

It is desirable that the open loop gain of the position control loop is increased in the high-frequency band by a position control compensator while the open loop gain of the absolute height correction loop is increased in the low-frequency band by a low frequency compensator.

These three feedback loops, namely, damping, position control and absolute height correction feedback loops can be realized by using a software. In this case, the speed estimating means is a processor for executing a main routine including observer routine, position control routine, absolute height correction routine, subtraction routine and output routine every time a clock pulse is received.

Each of the routines will be explained in detail in the following.

In the observer routine, first, the behavior of the actuator in accordance with the driving signal is simulated and the estimated value of the speed of the magnetic head in the axial direction of the rotary drum is multiplied by a predetermined coefficient, the product being stored at a variable $O_1$.

In the position control routine, next, the driving signal is filtered such that the gain in the high frequency band is increased and the result is stored at a variable $O_2$.

In the absolute height correction routine, the driving signal is filtered such that the gain in the low frequency band is increased and the result is stored at a variable $O_3$.

In the subtraction routine, $O_3-O_2-O_1$ is calculated.

Finally, in the output routine, the result of $O_3-O_2-O_1$ is output to the actuator.

By realizing these feedback loops by using a software, the structure of the movable head position controlling device is simplified.

The above and other objects, features and advantages of the present invention will become clear from the following description of preferred embodiments thereof, taken in conjunction with the accompanying drawings.

Figure 20:
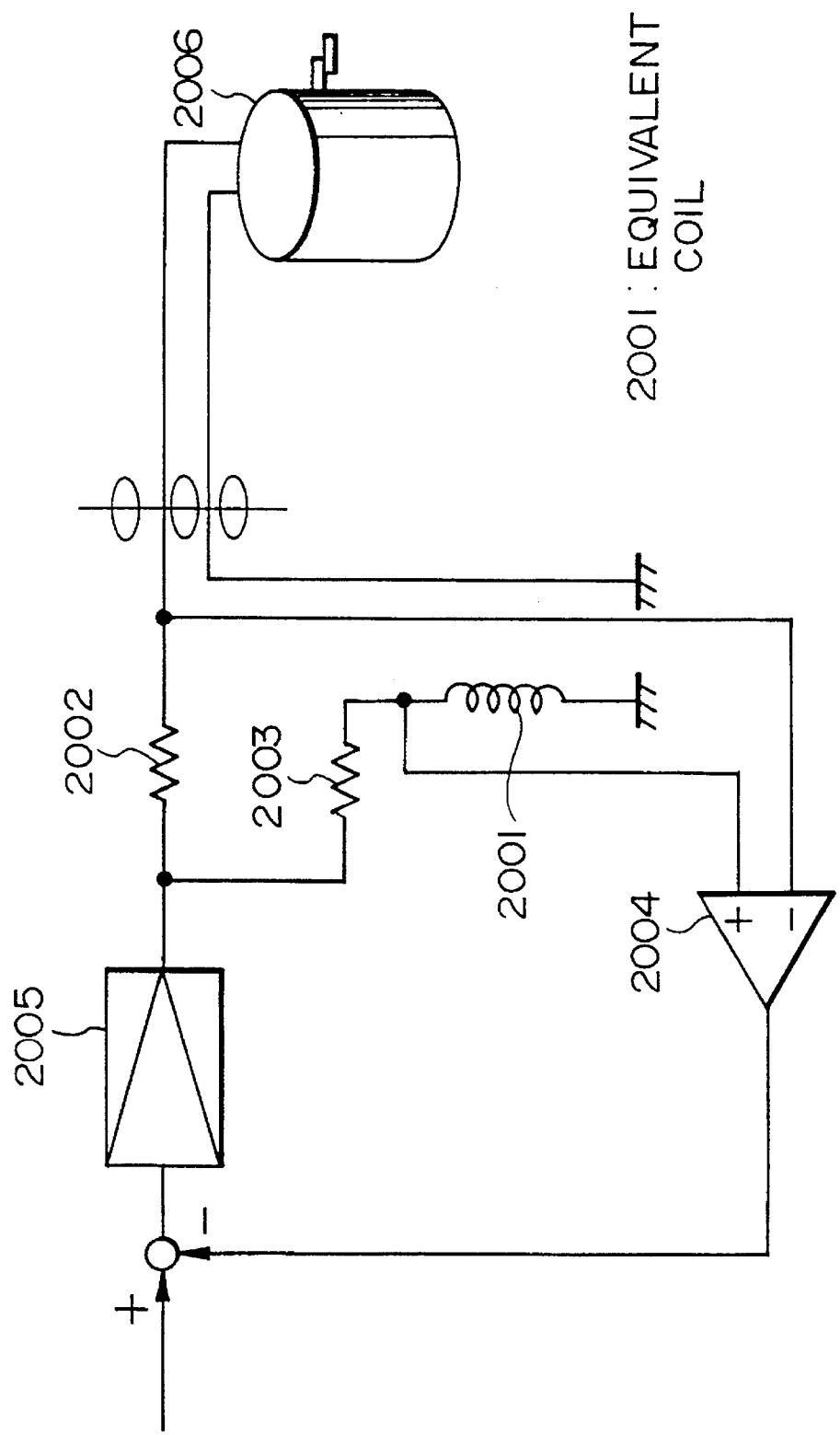
FIG. 20 shows the structure of a damping controller for executing a damping system by feeding back a counter electromotive force.
Figure 22:
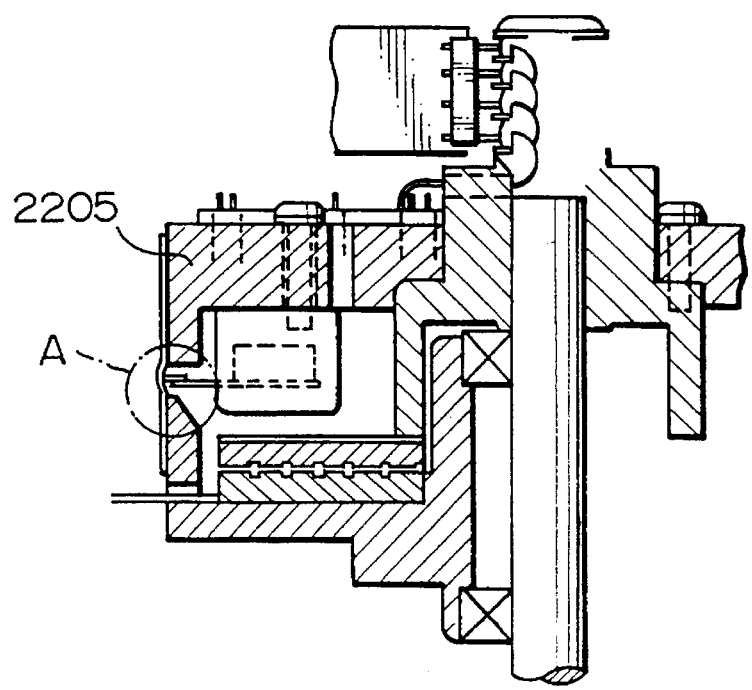
Figure 23:
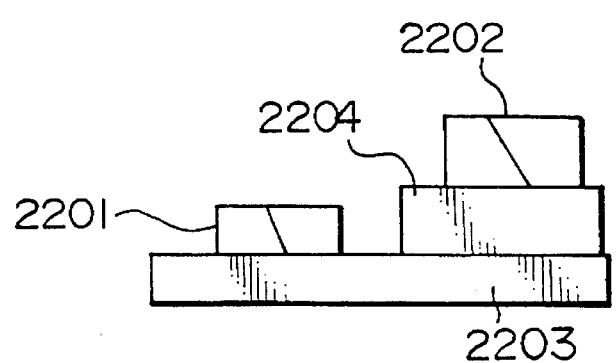
Figure 24:
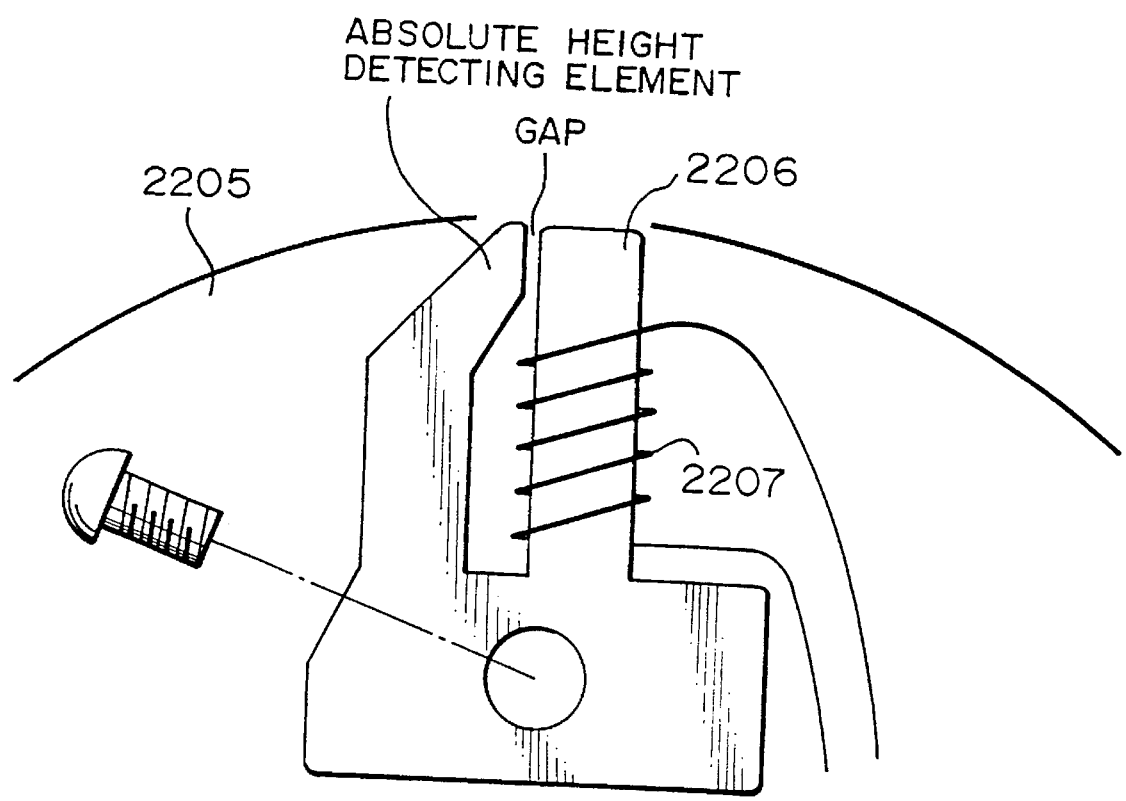
Figure 25:
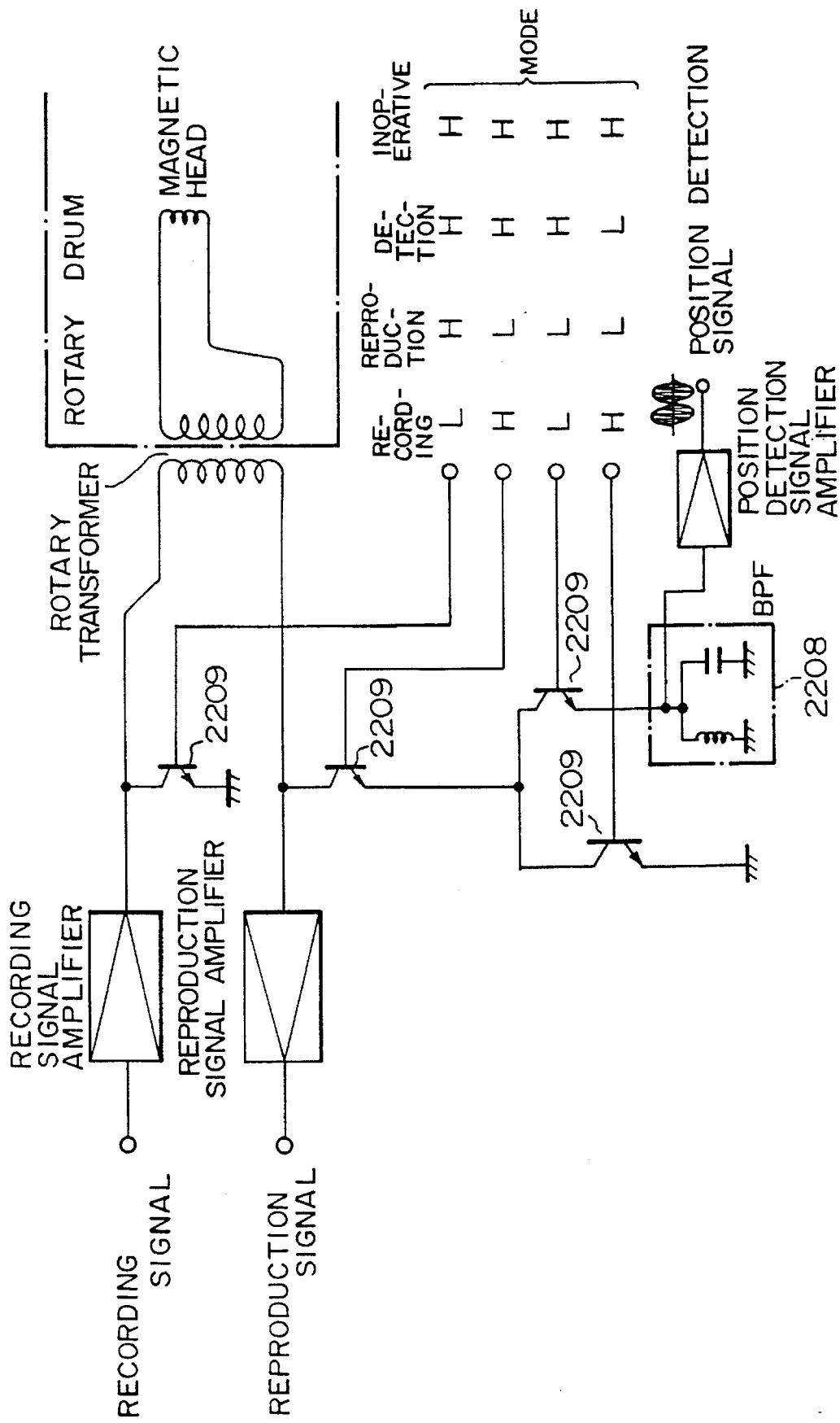
Figure 26:
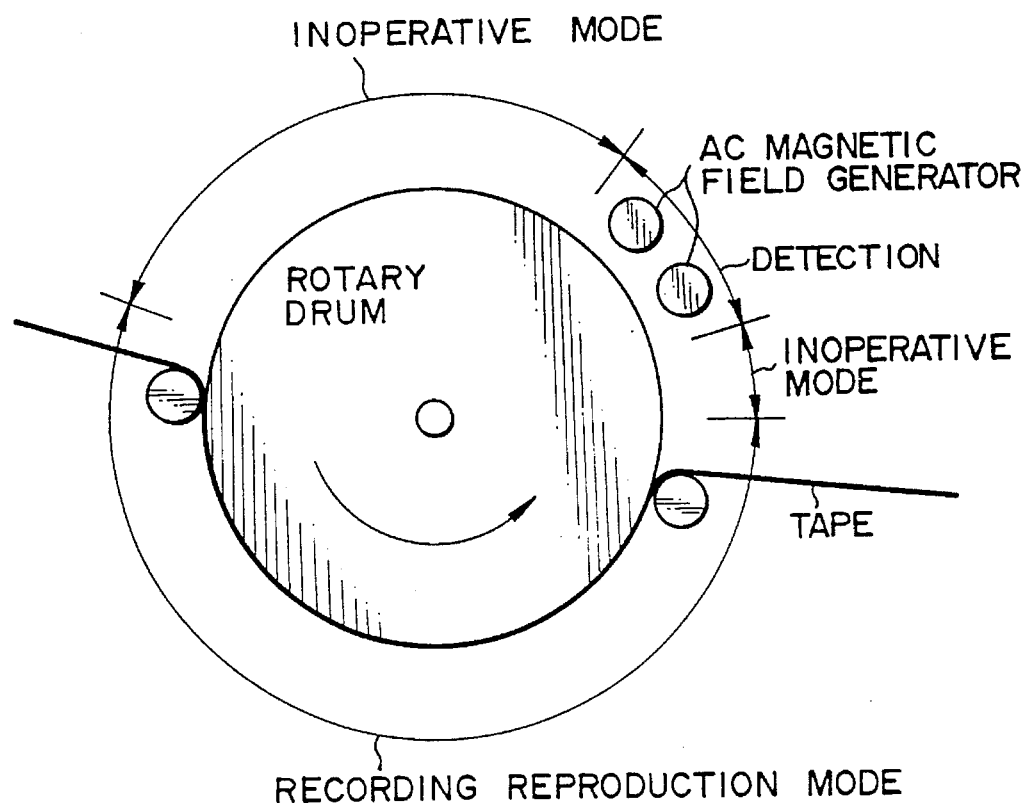
Figure 27:
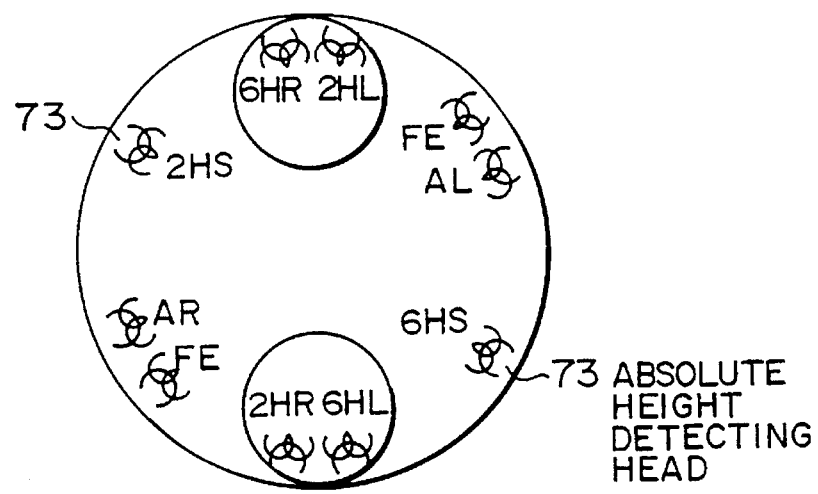
Figure 28:
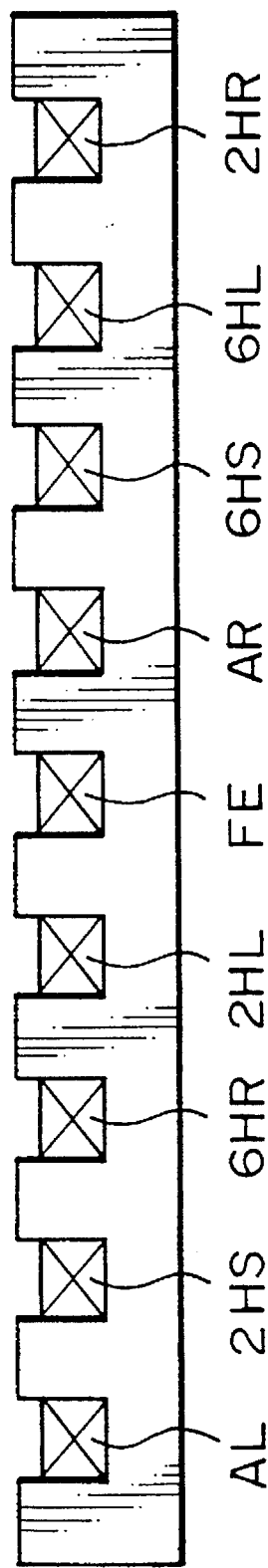
Figure 29:
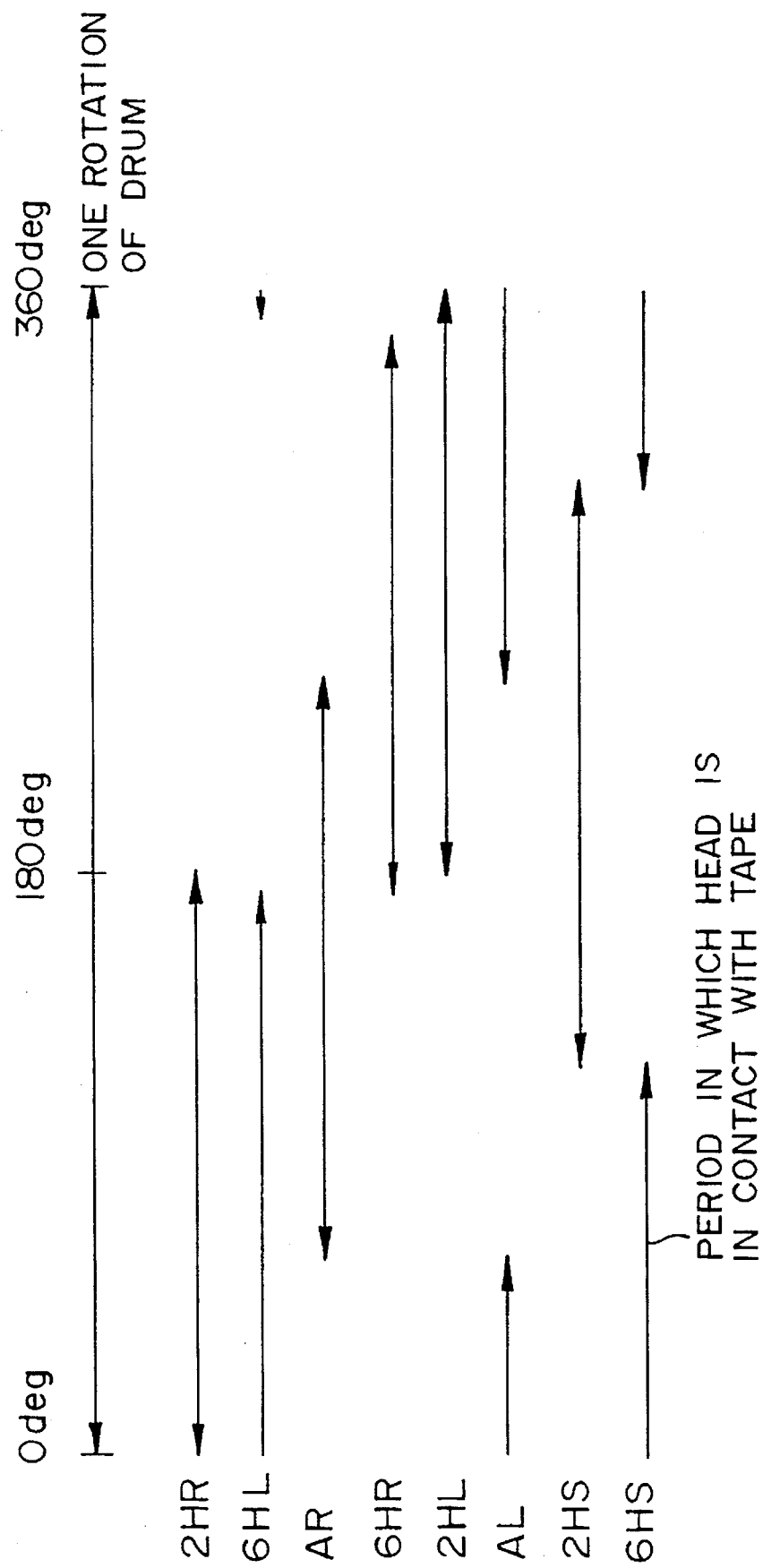
Figure 30:
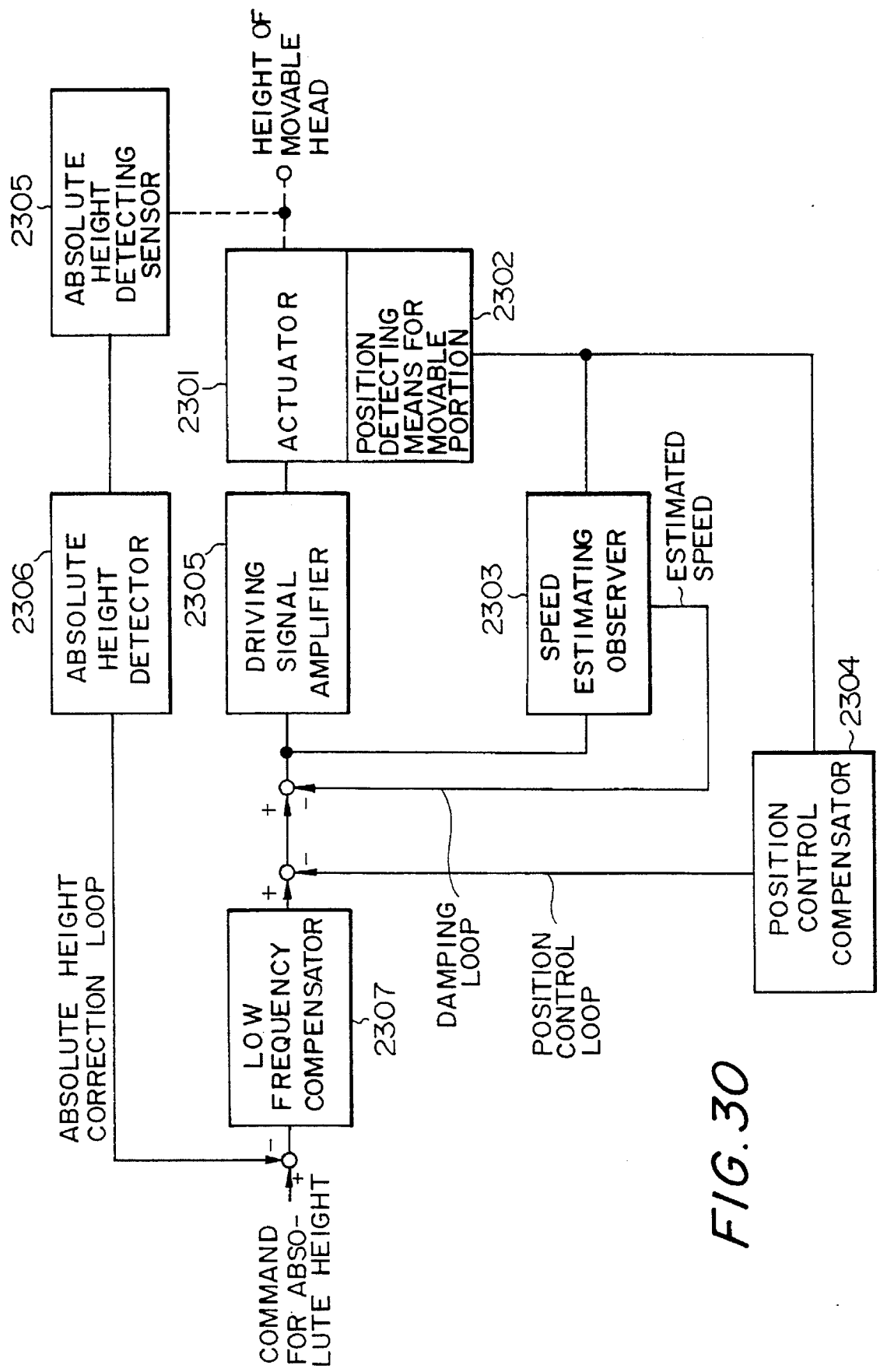
Figure 31:
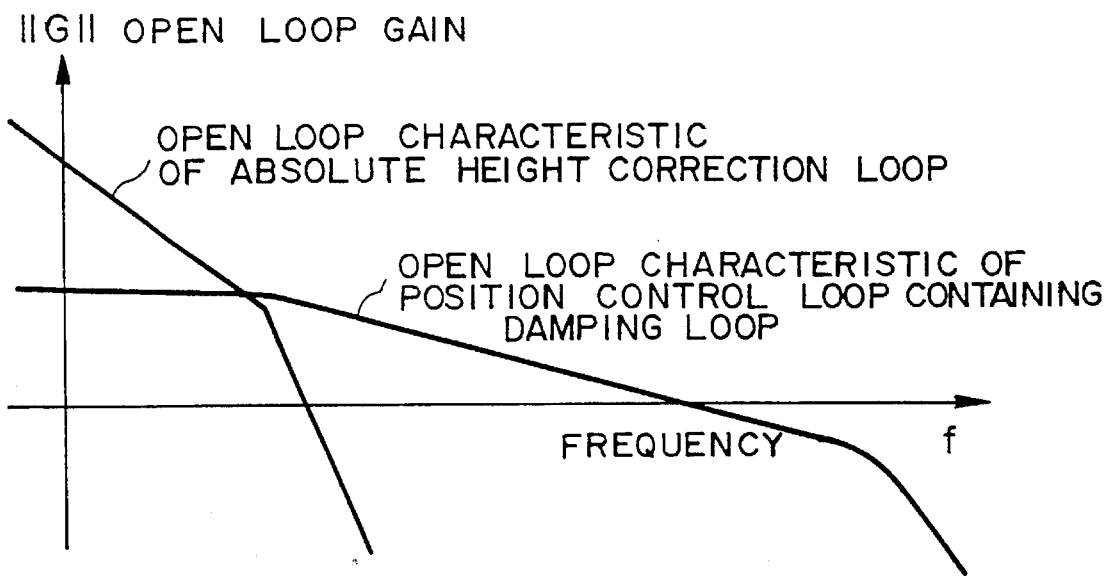
Figure 32:
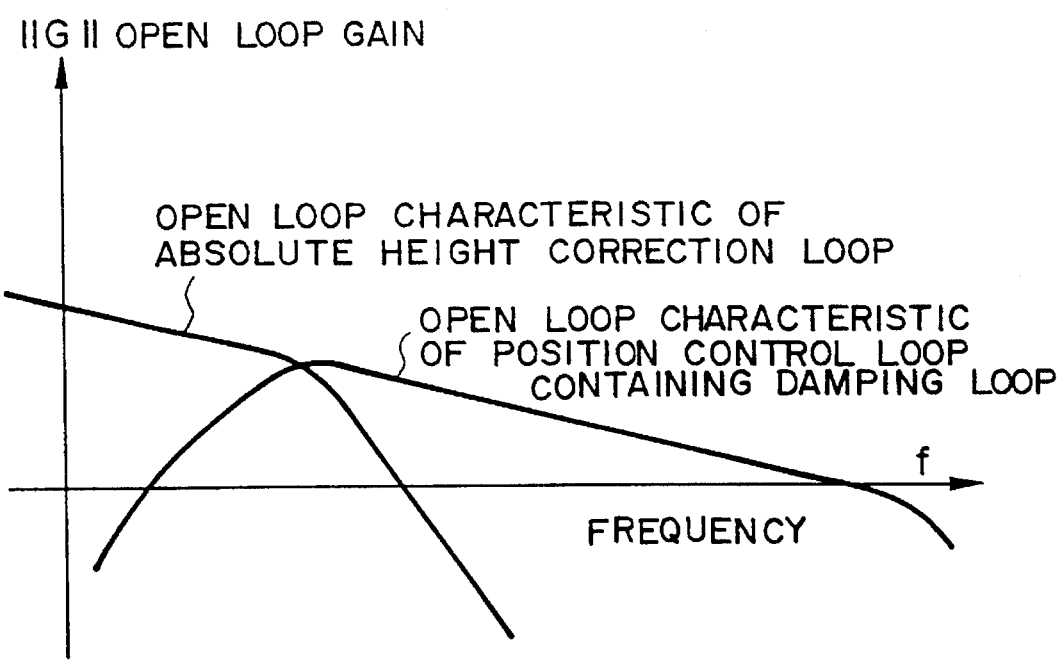
Figure 33:
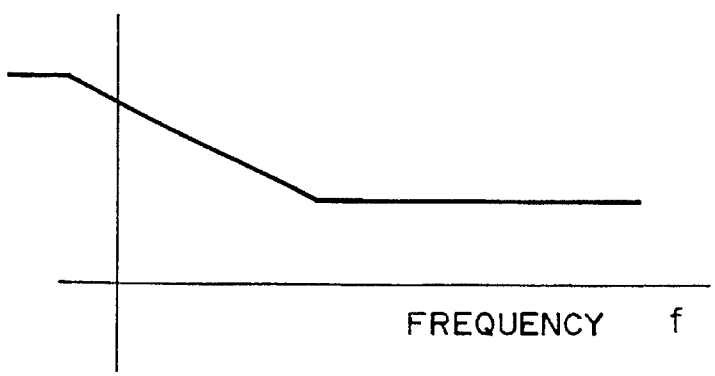
Figure 34:
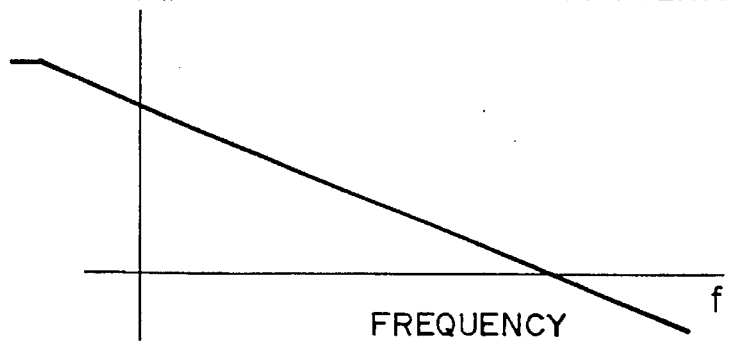
Figure 35:
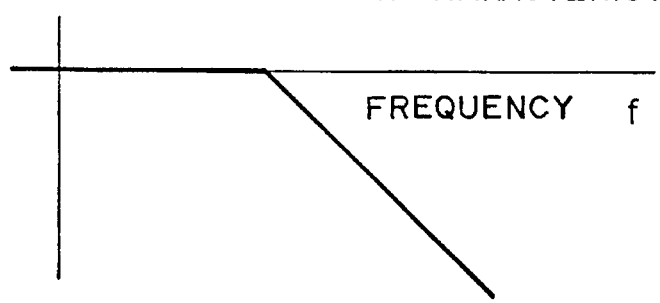
Figure 36:
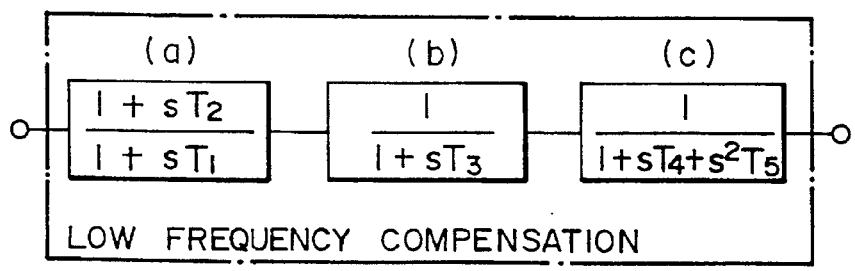
Figure 37:
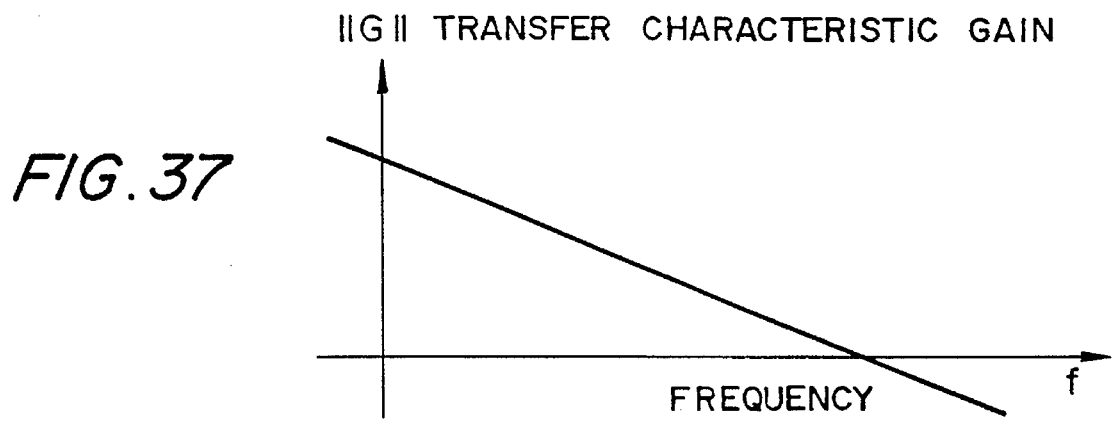
Figure 38:
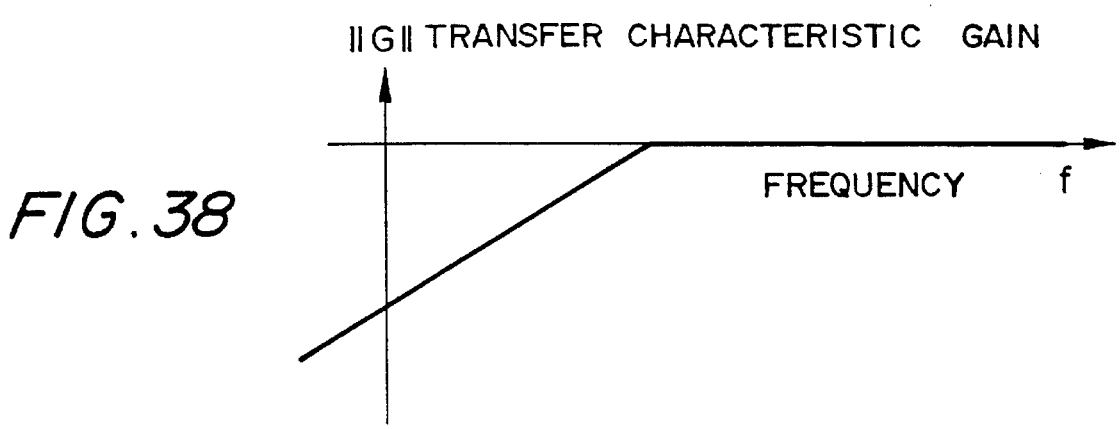
Figure 39:
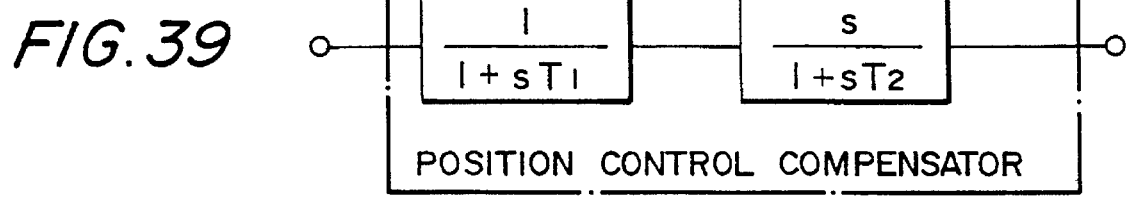
Figure 40:
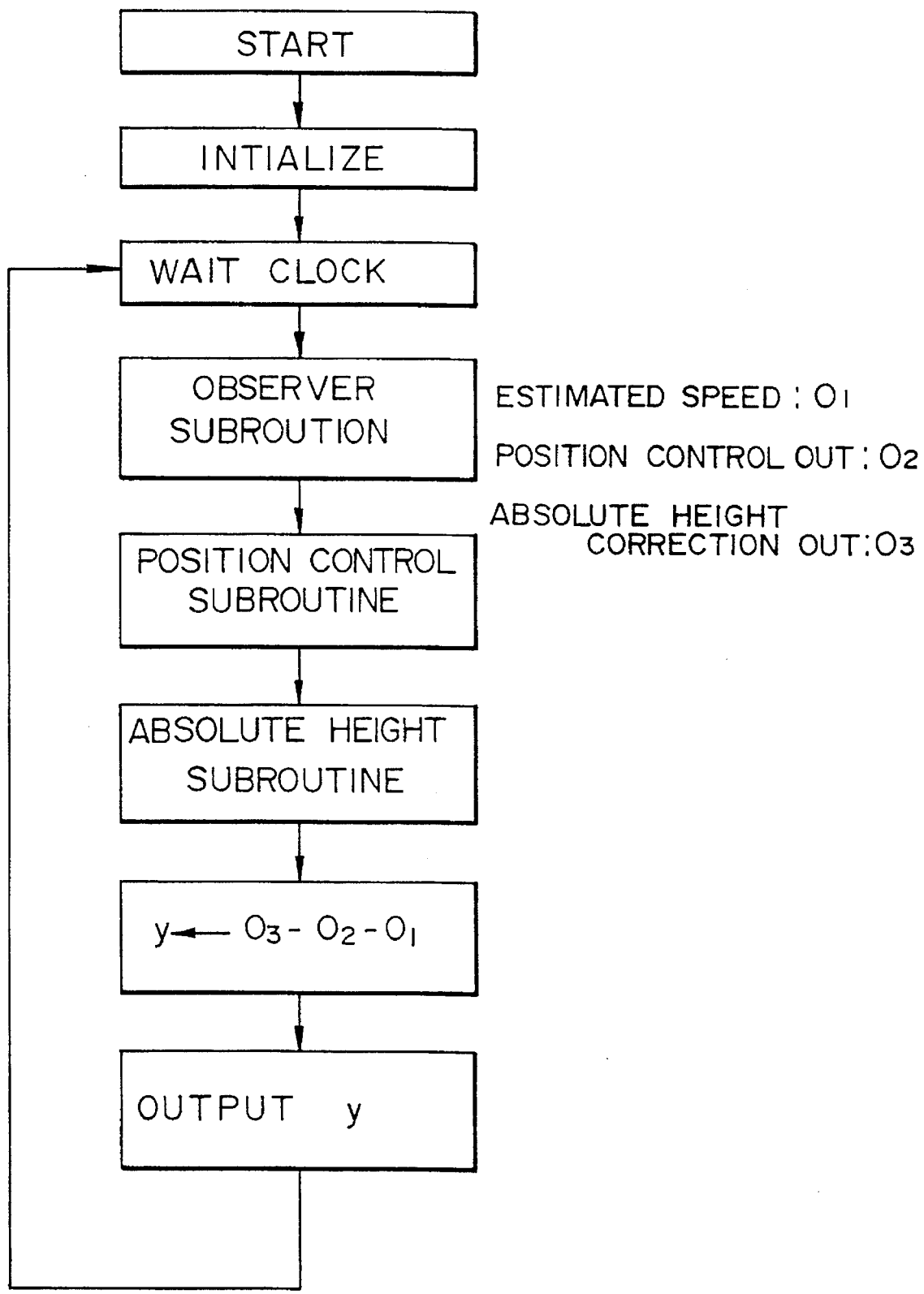
Figure 41:
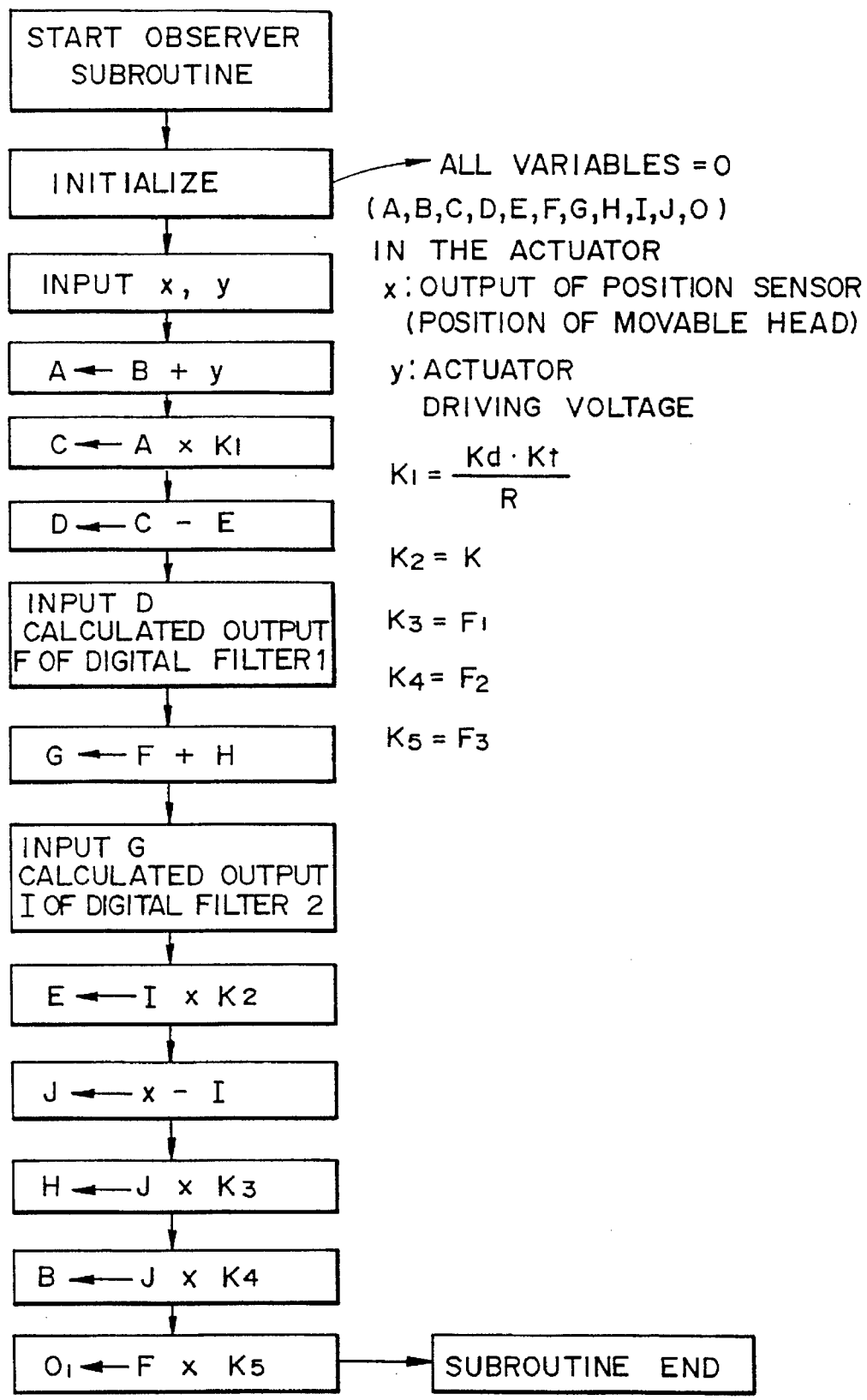
Figure 42:
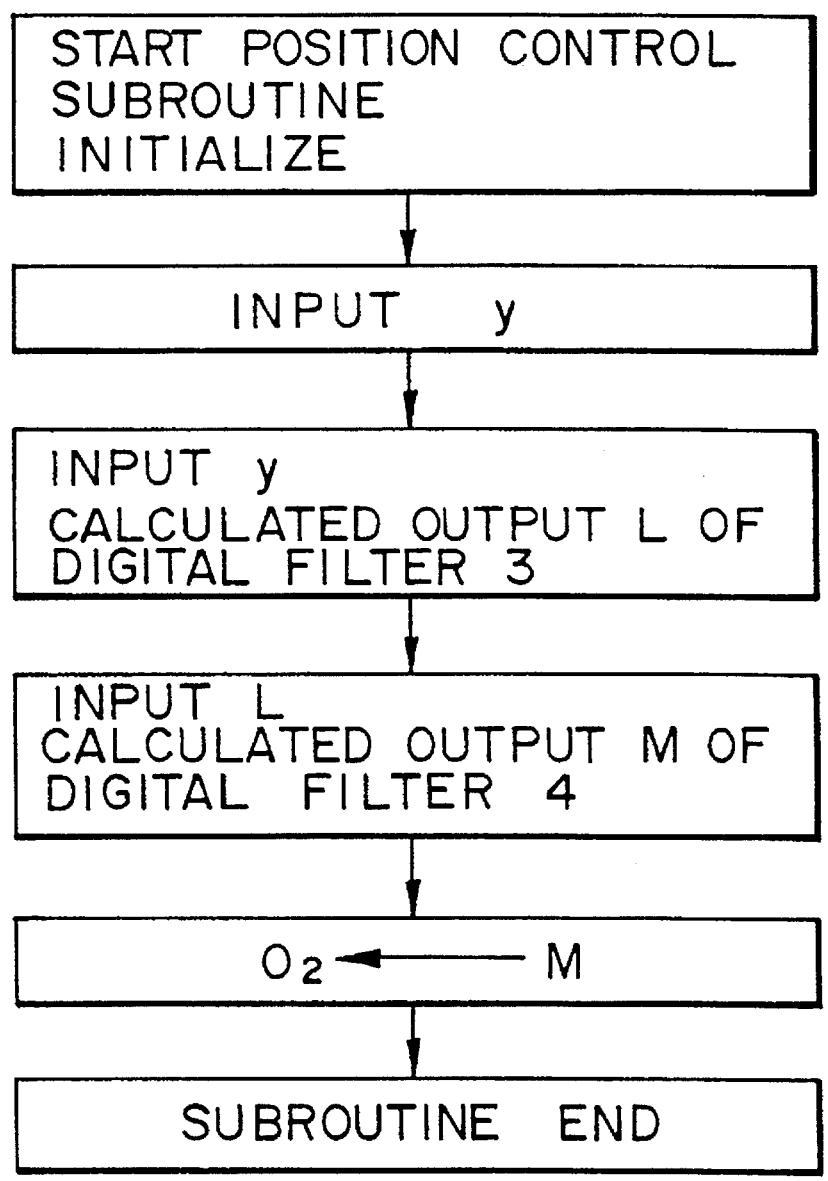
Figure 43:
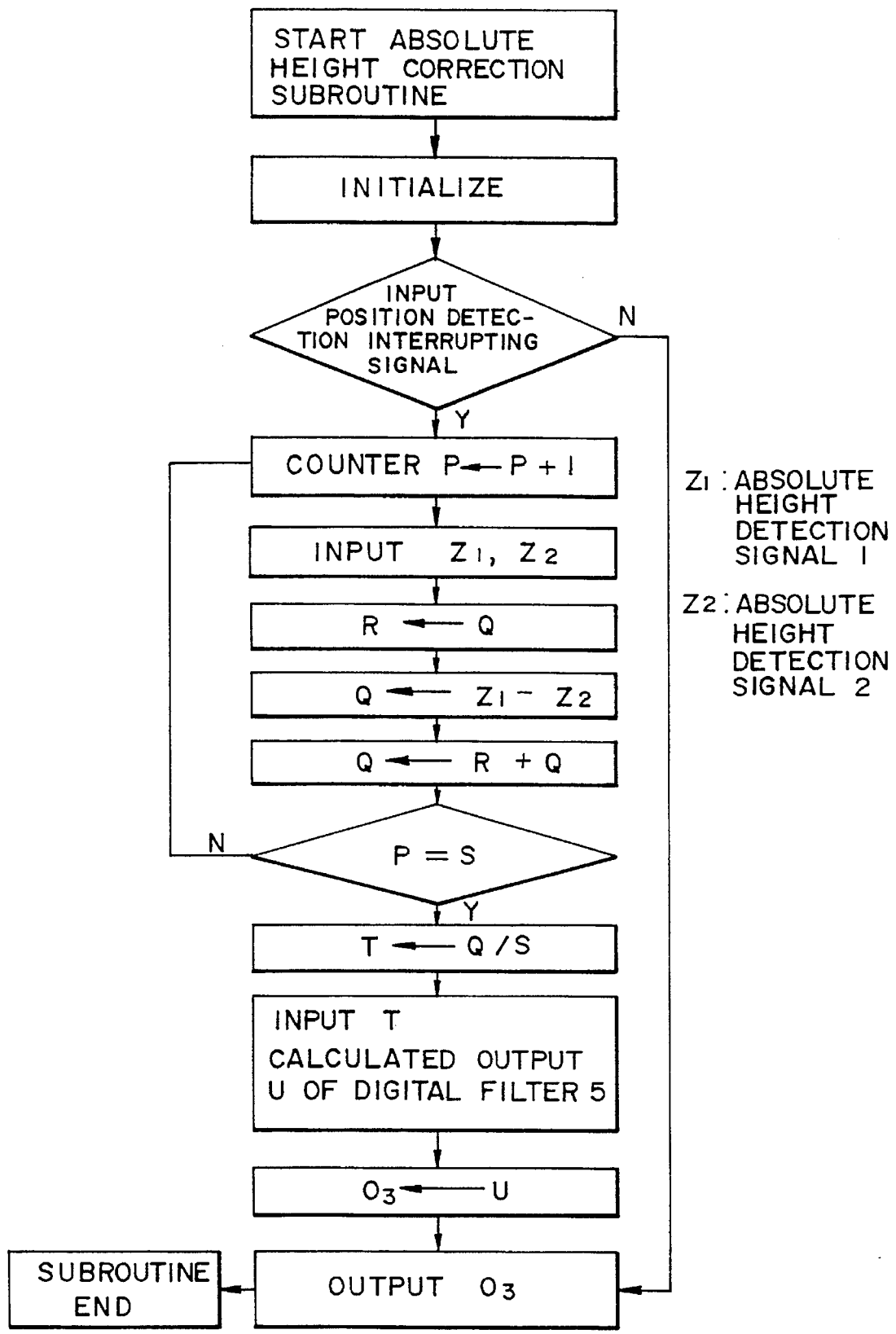
Figure 44:
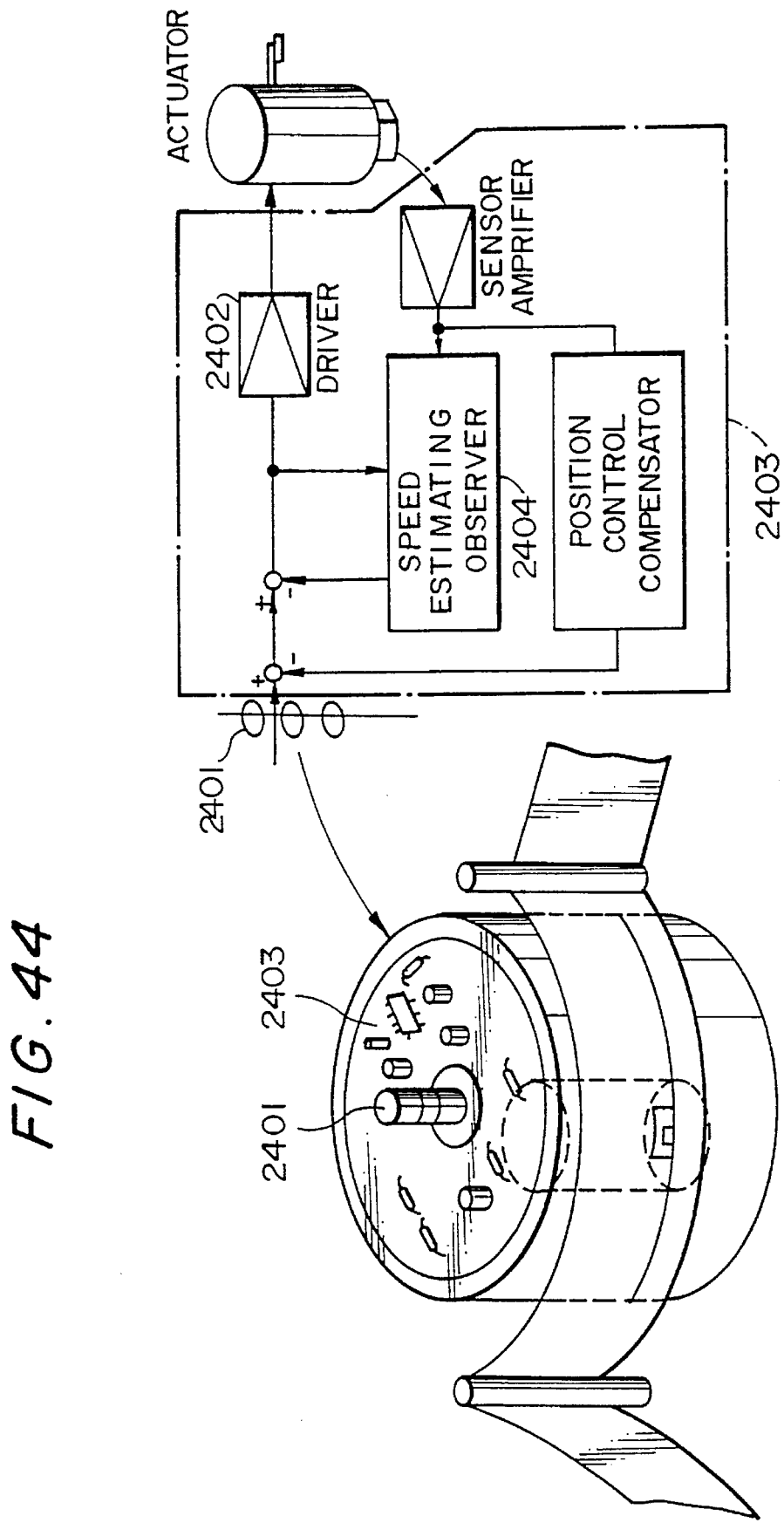
Figure 45:
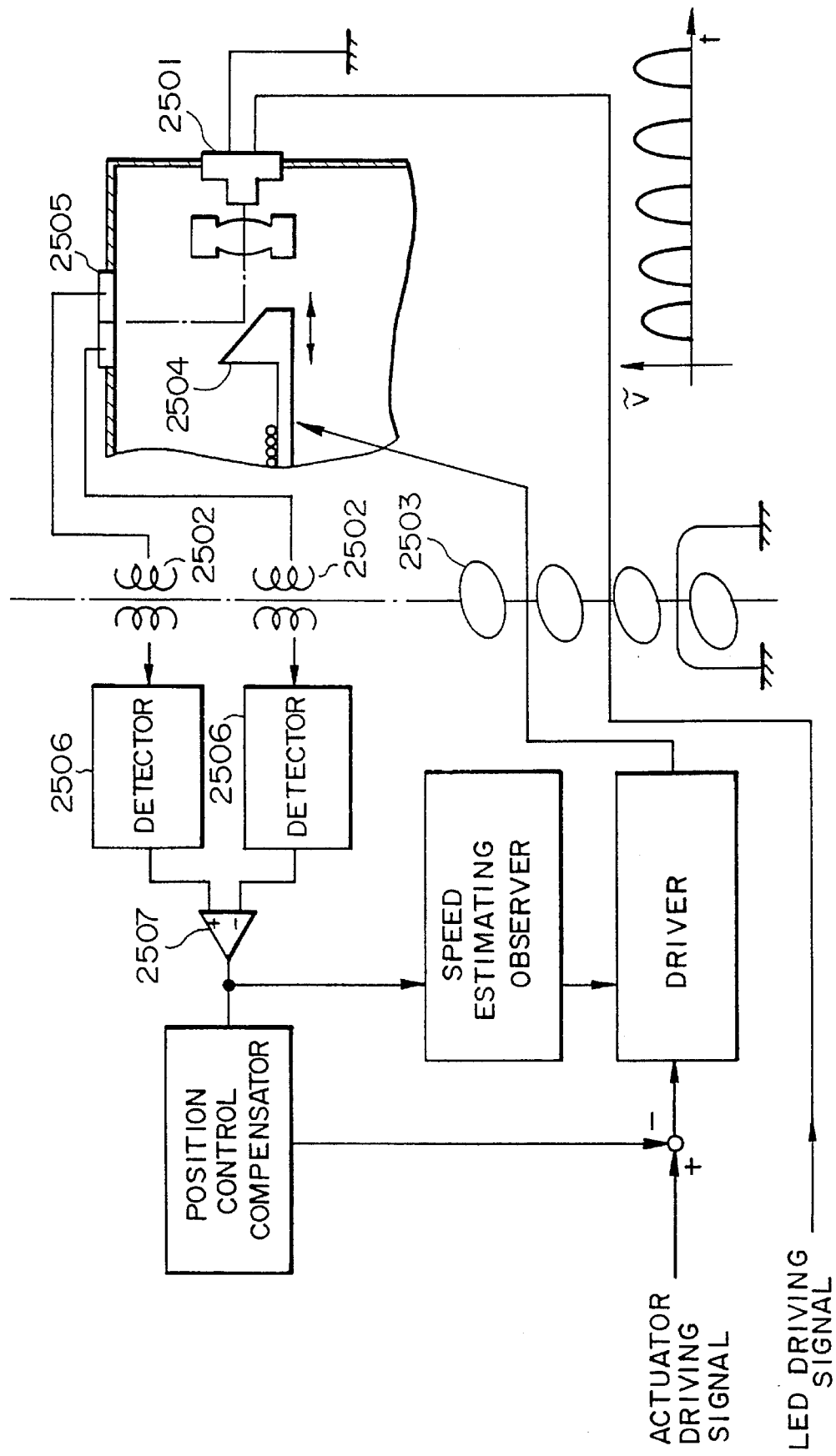
Figure 46:
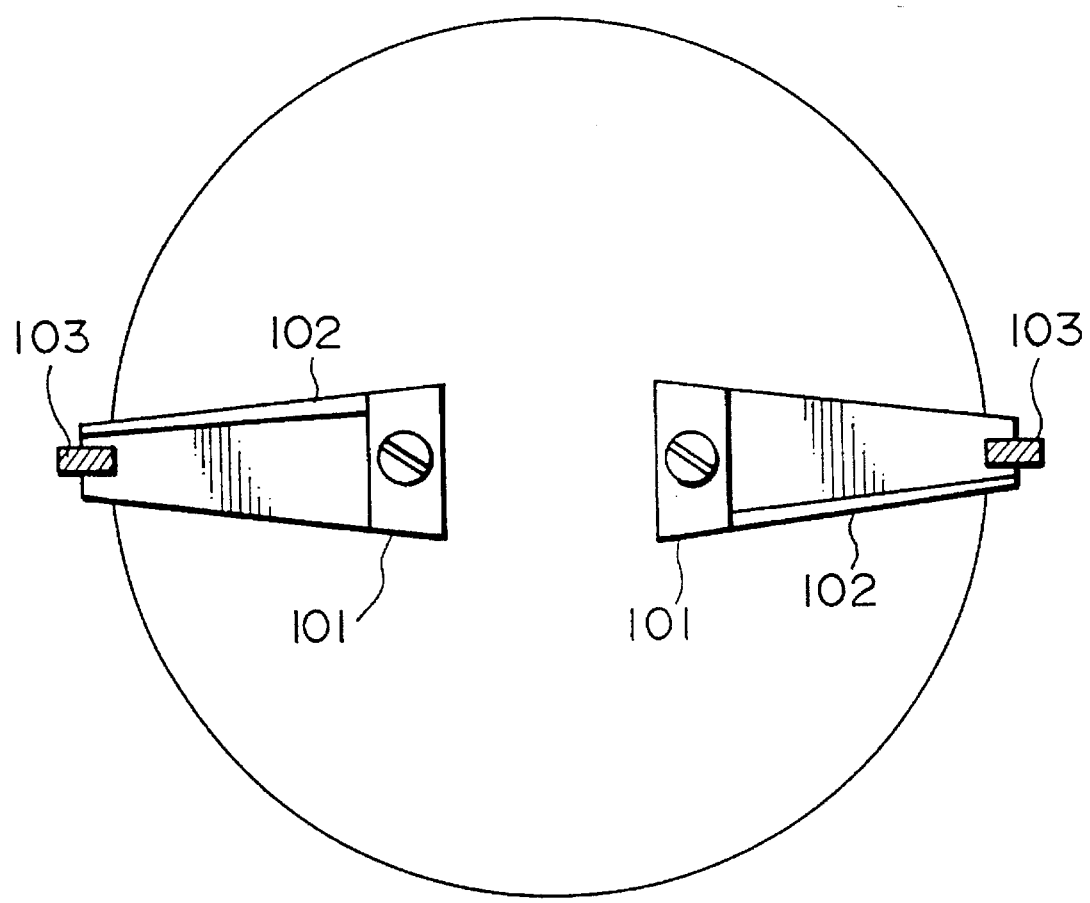
Figure 47:
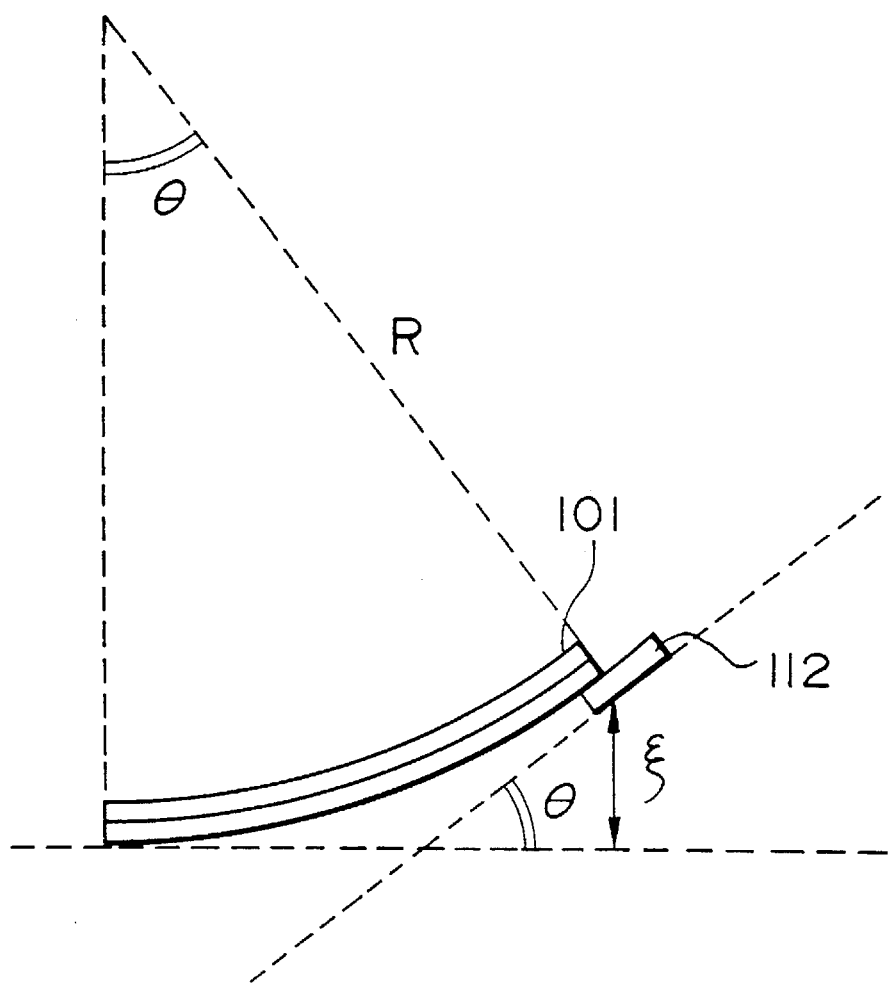
Figure 48:
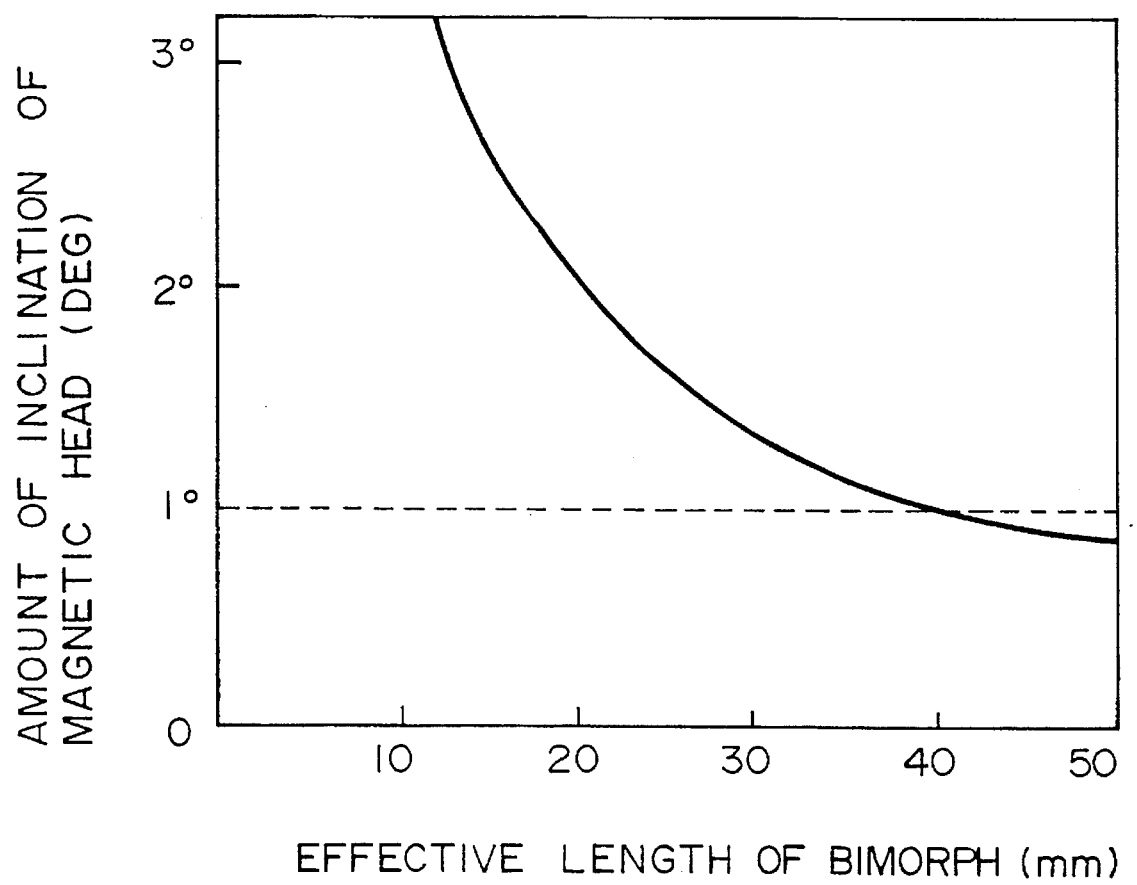
Figure 49:
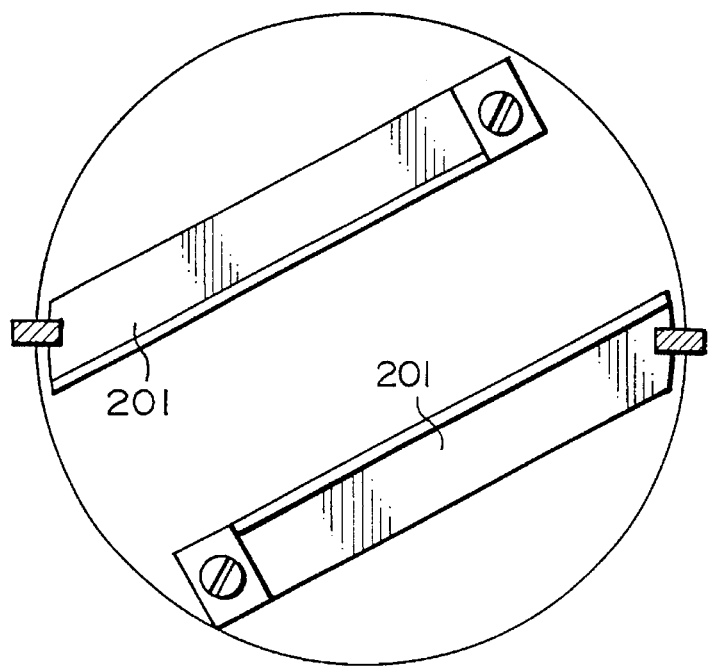
Figure 50:
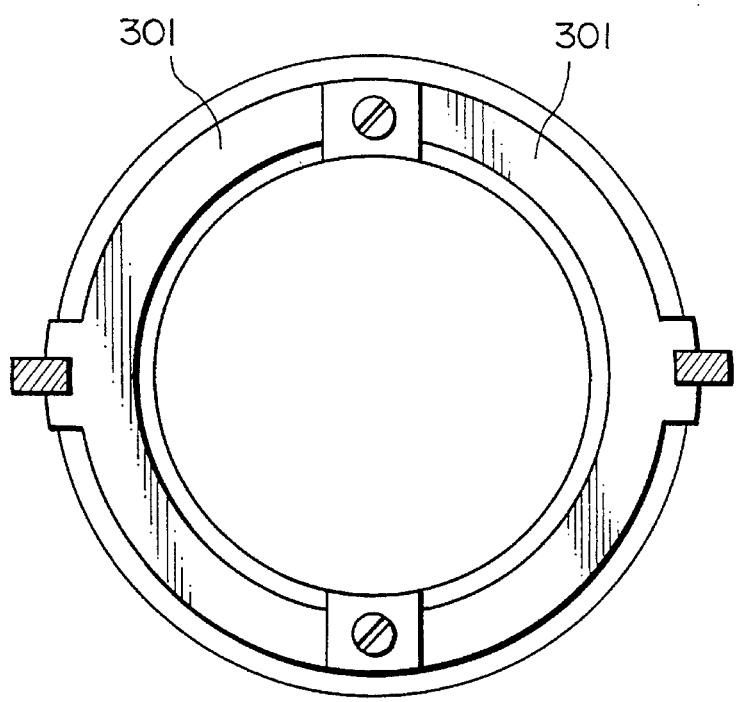
Figure 51:
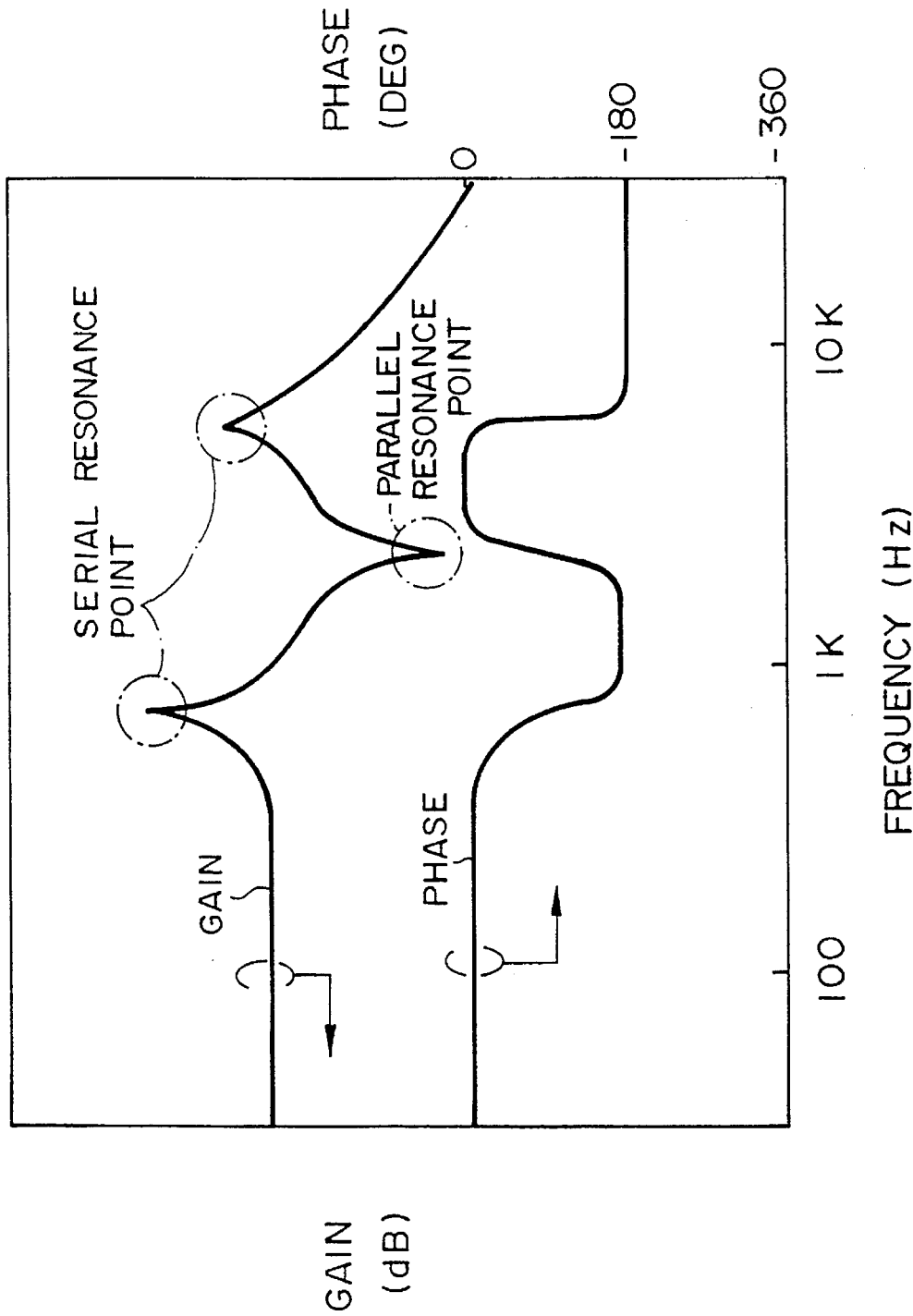
Figure 52:
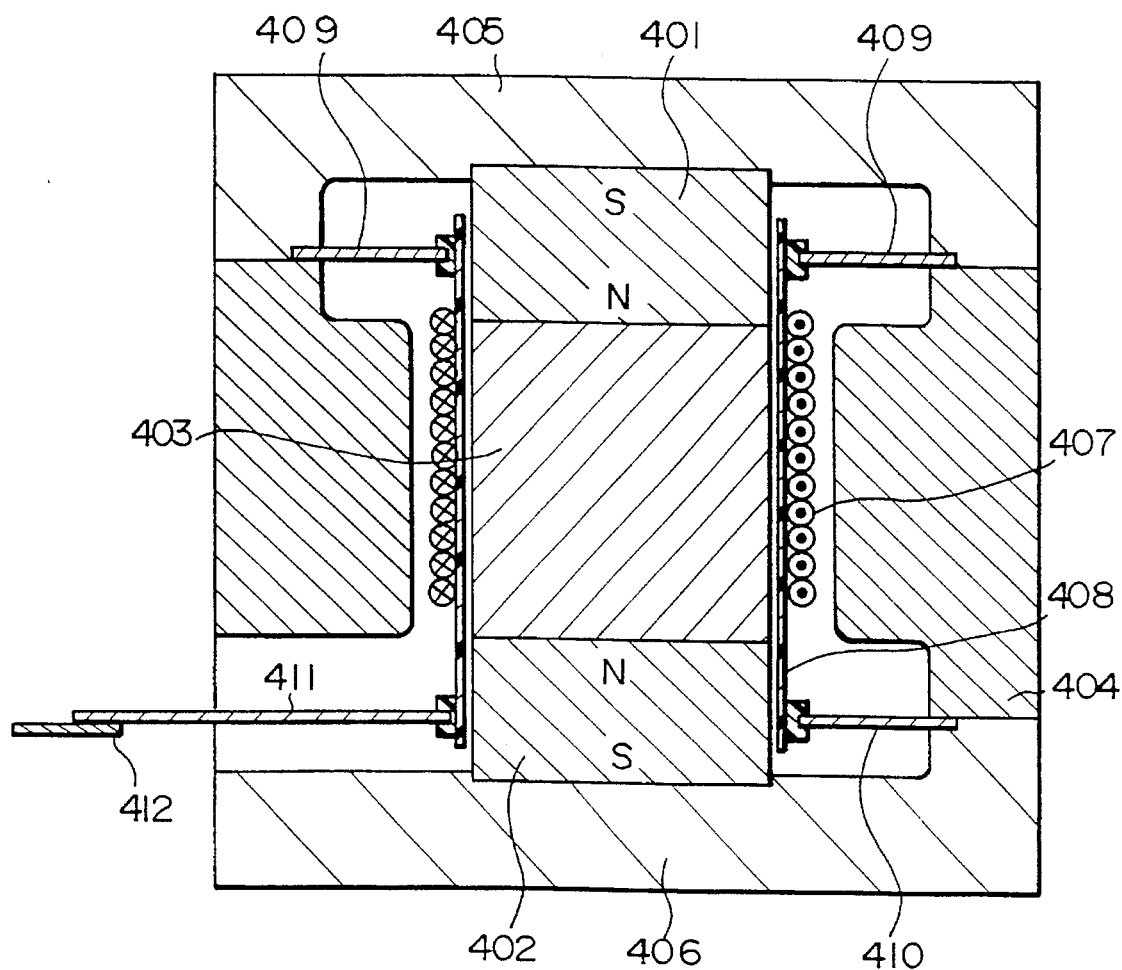
Figure 53:
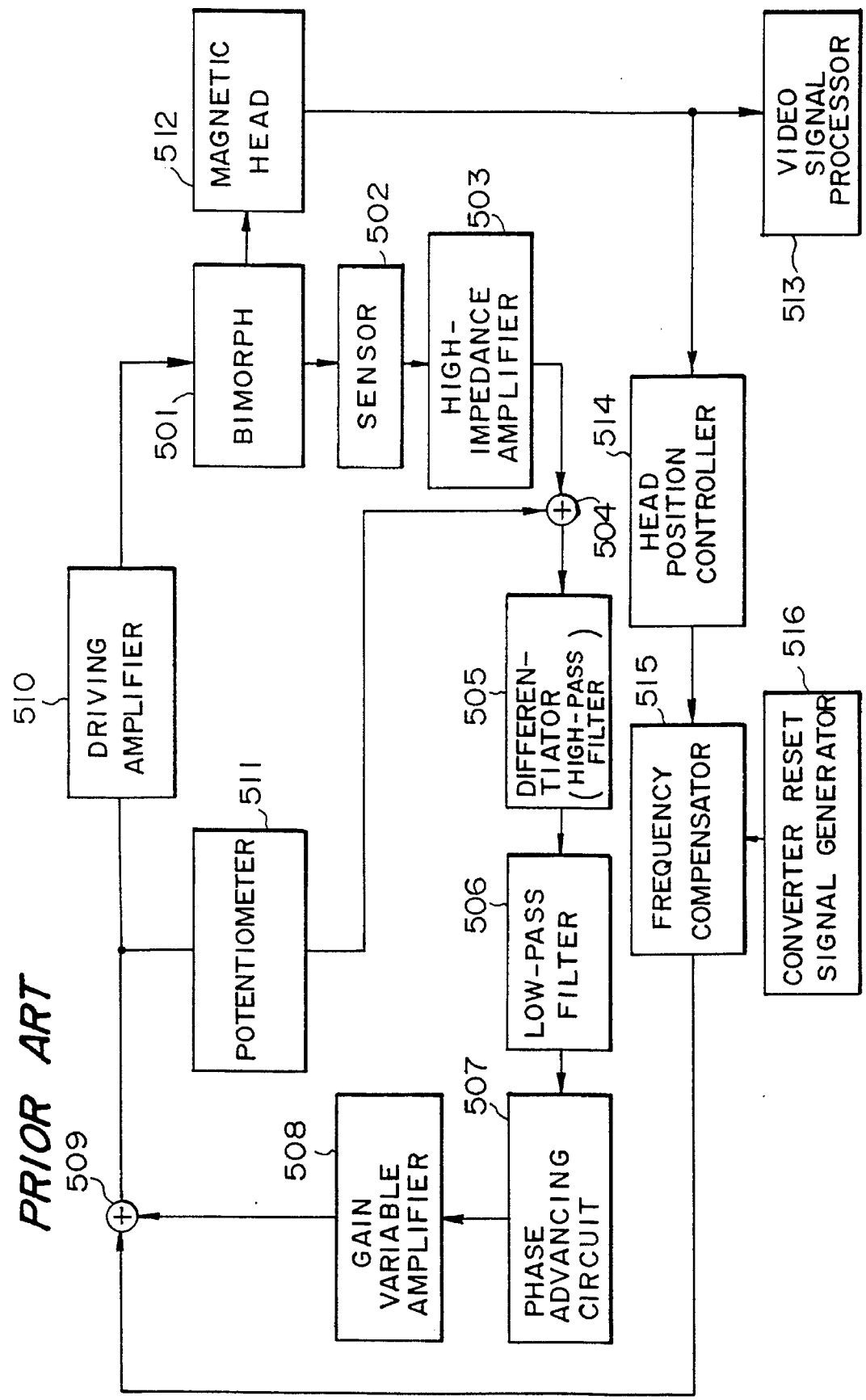
Figure 54:
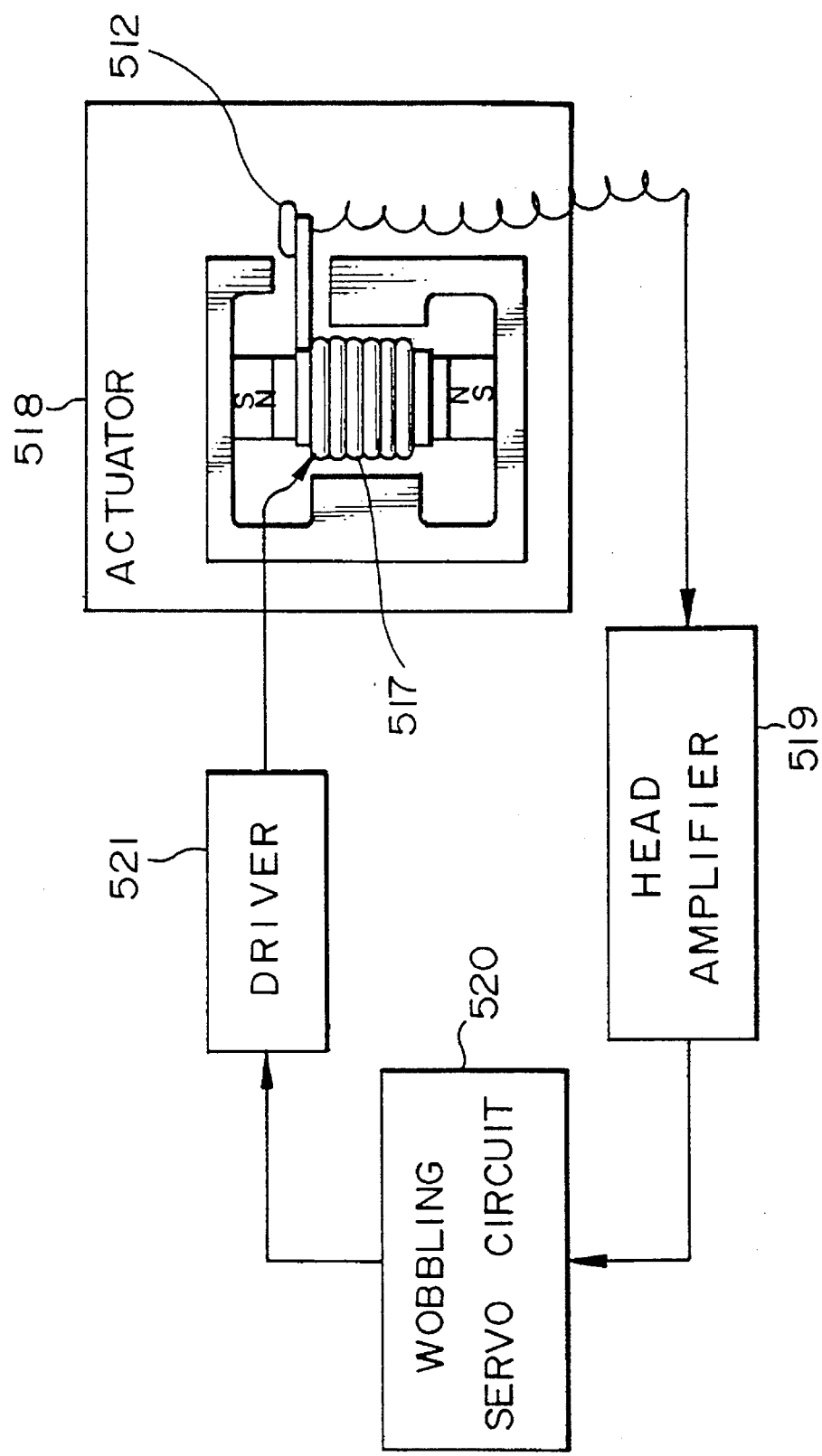
Figure 55:
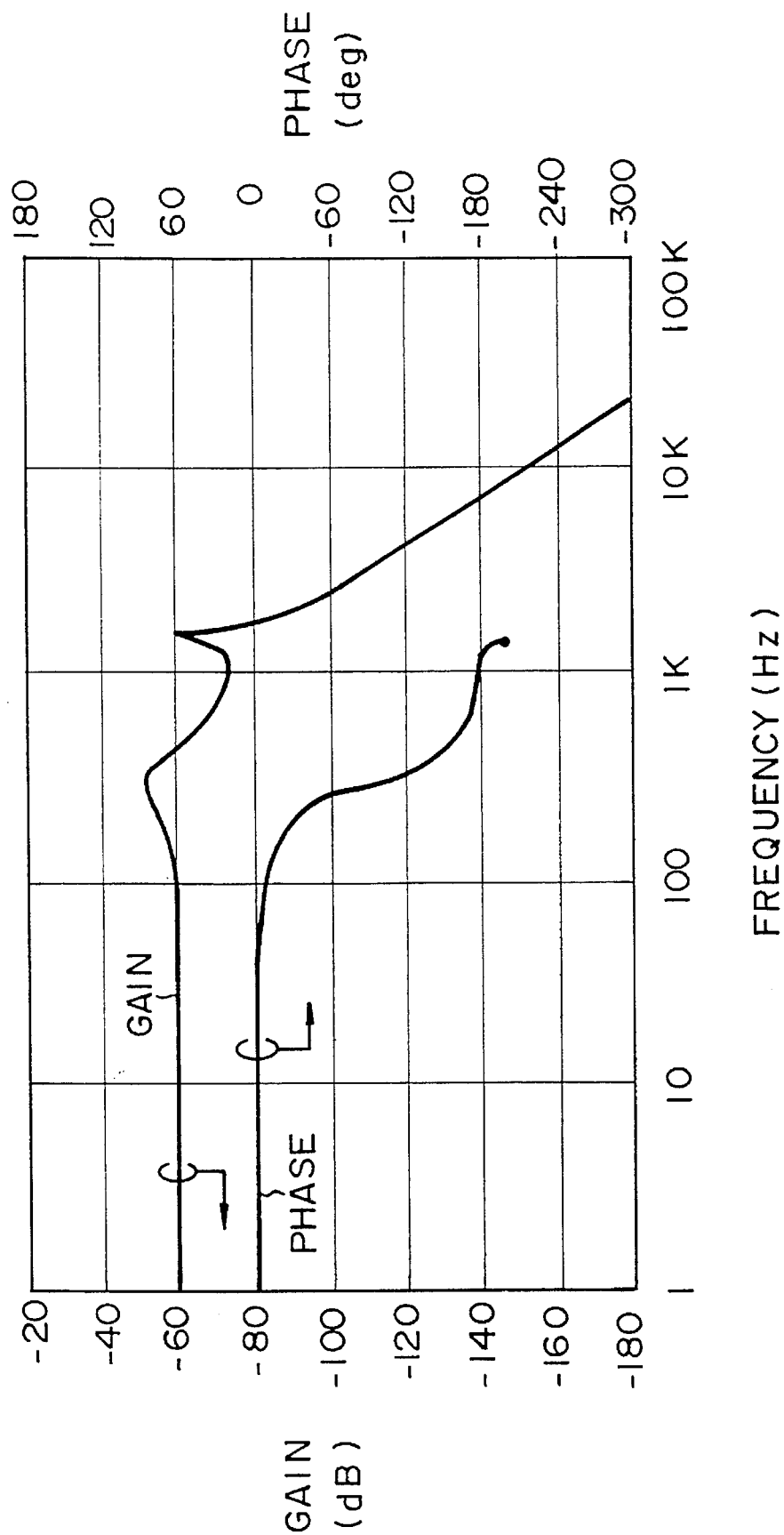
Figure 56:
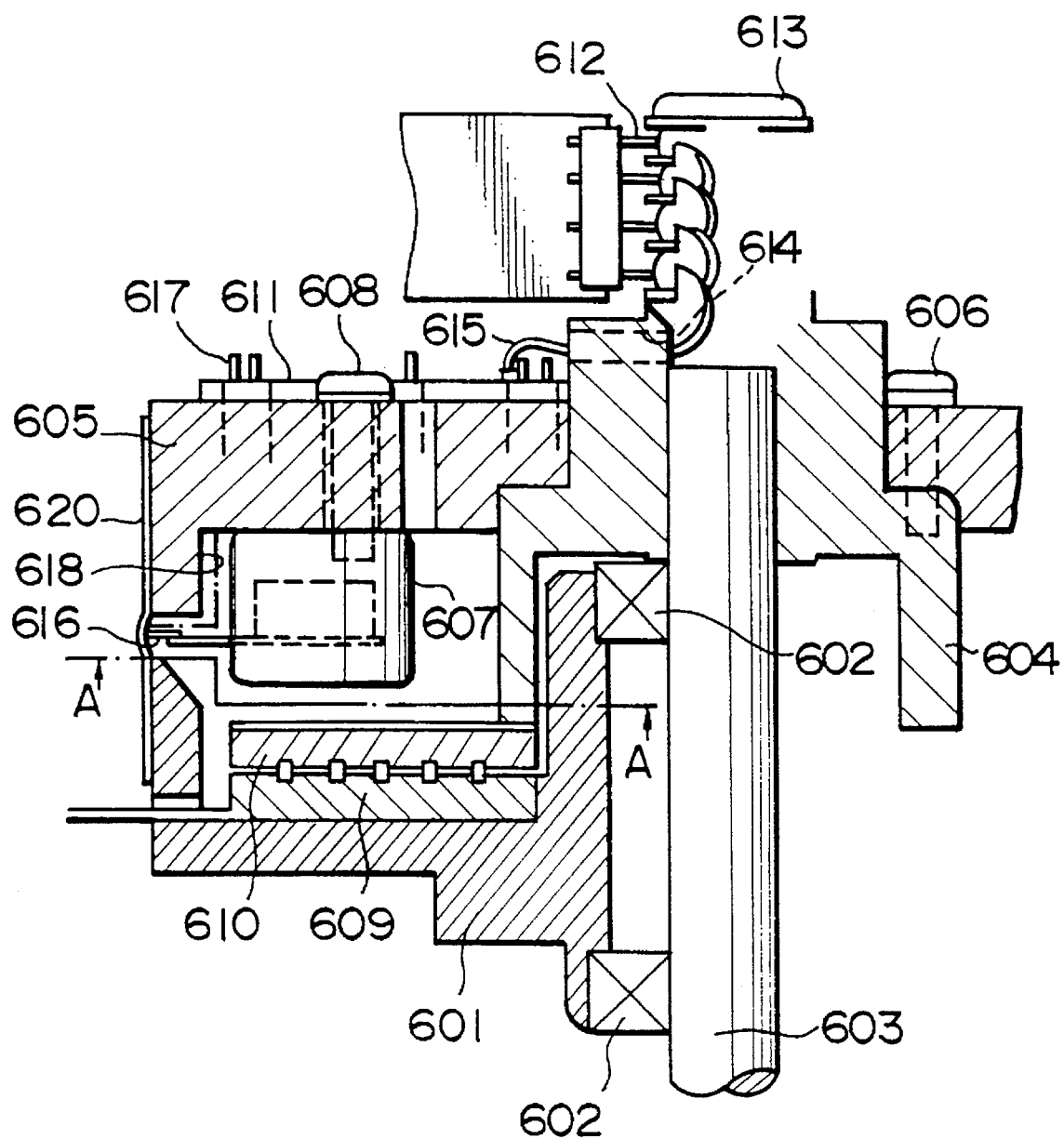
Figure 57:
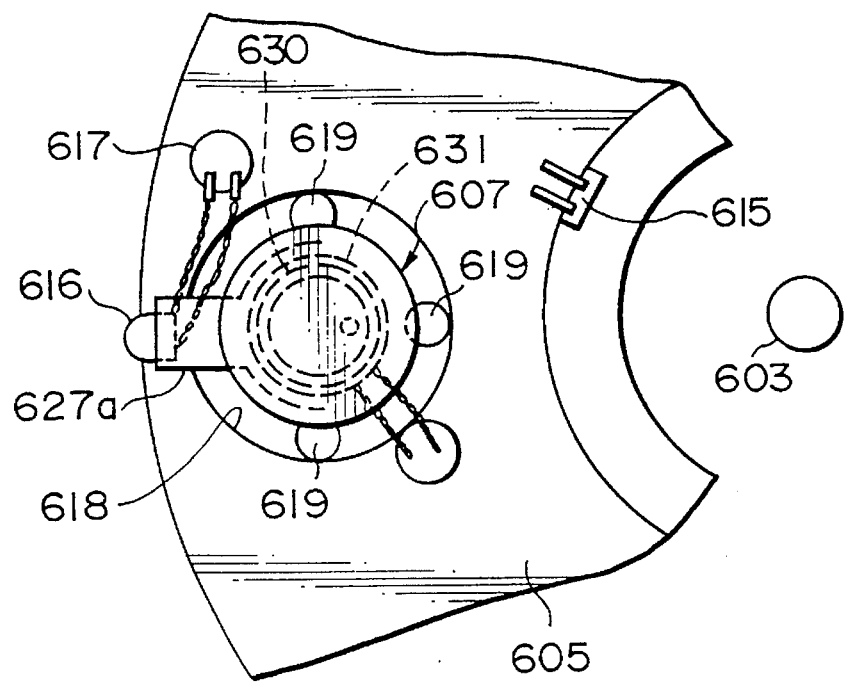
Figure 58:
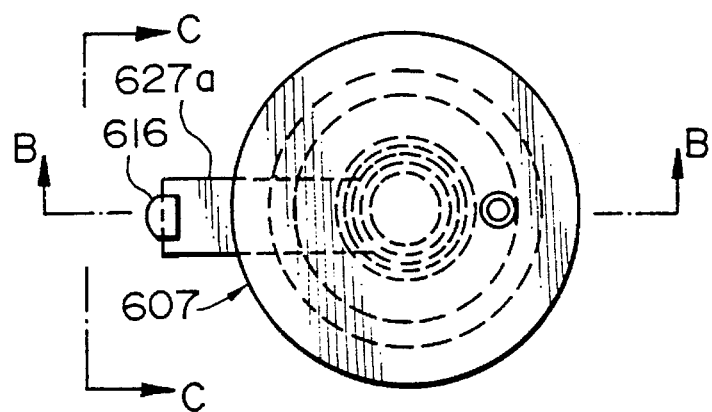
Figure 59:
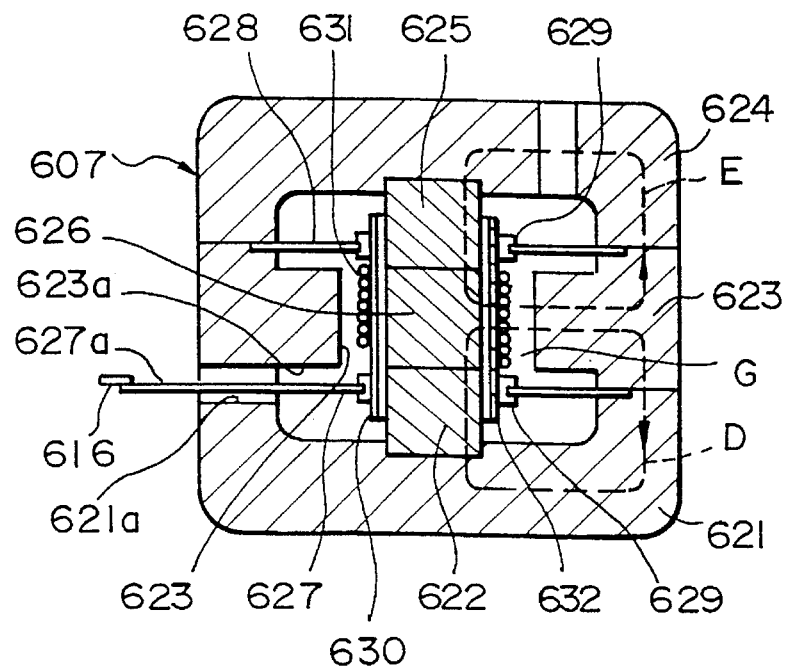
Figure 60:
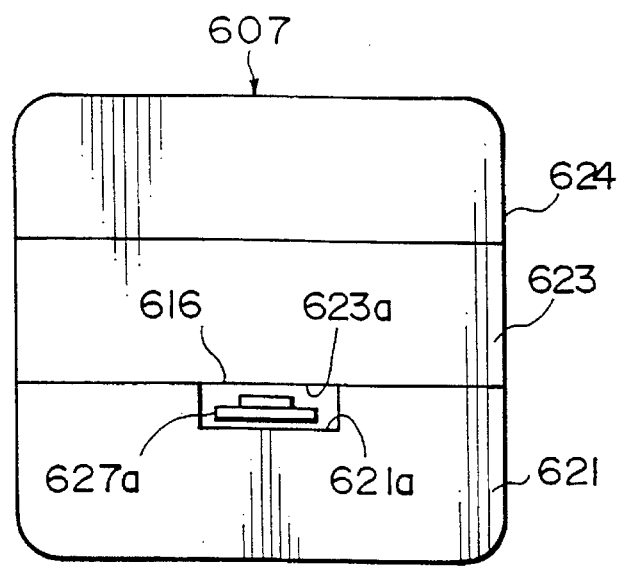
Figure 61:
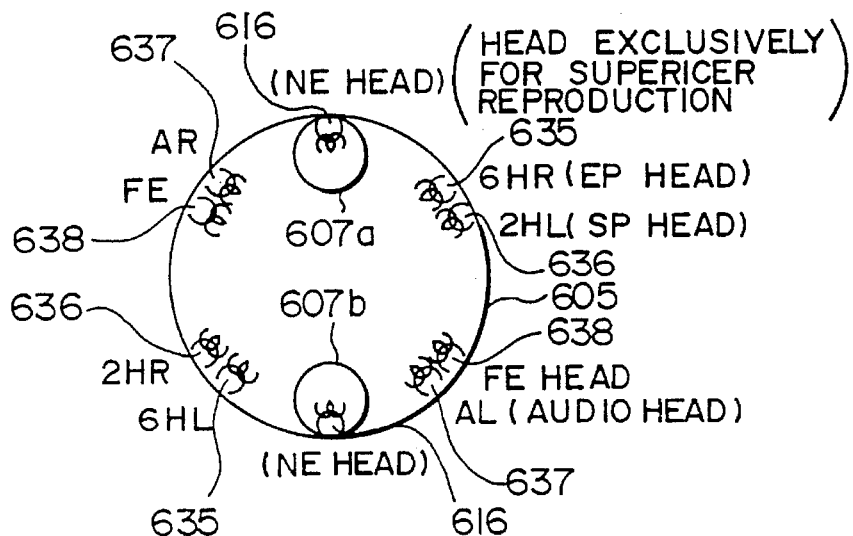
Figure 62:
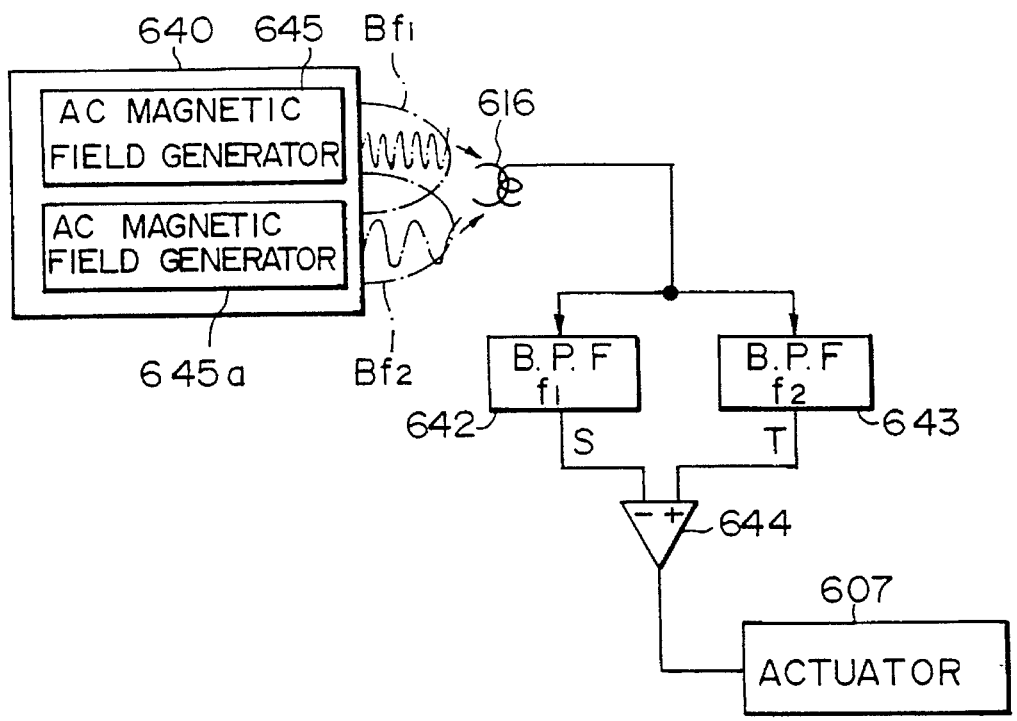
Figure 63:
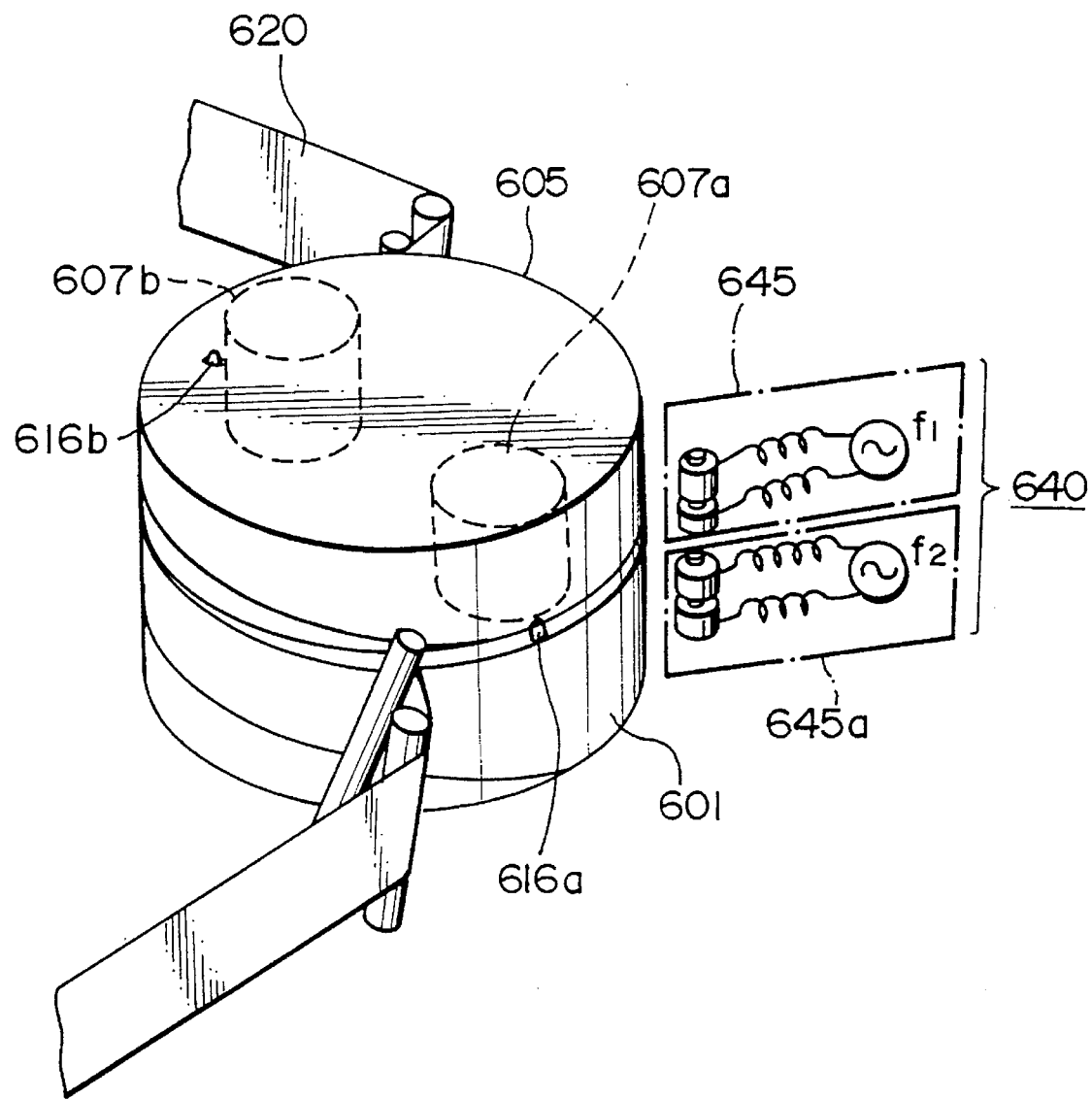
Figure 64:
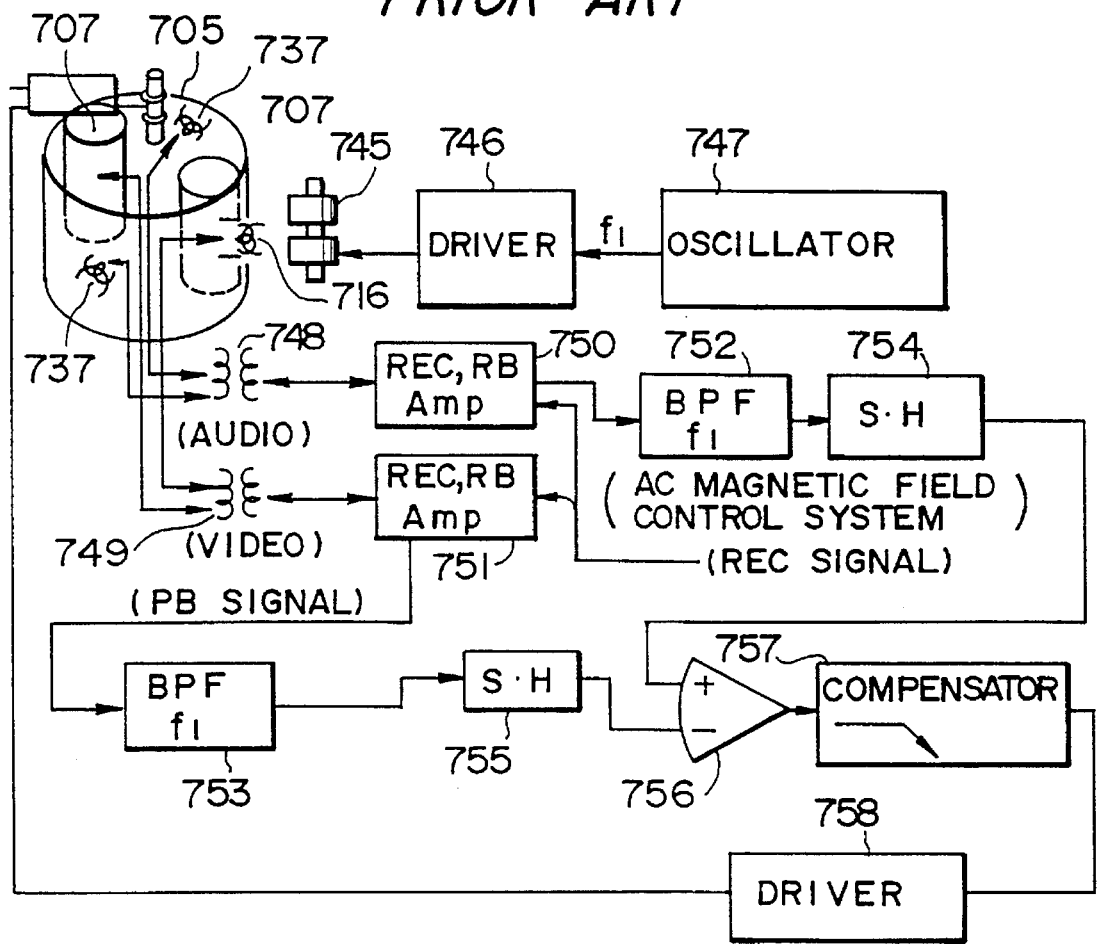
Figure 65:
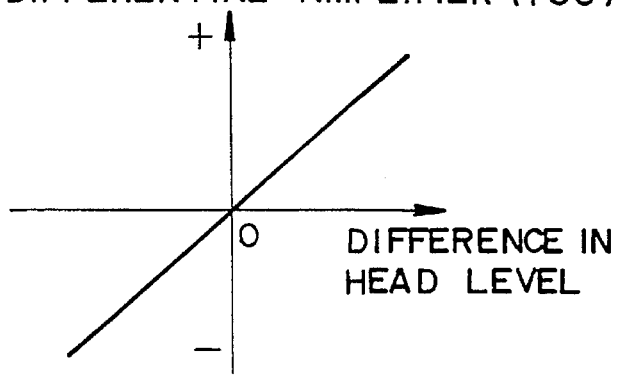
Figure 66:
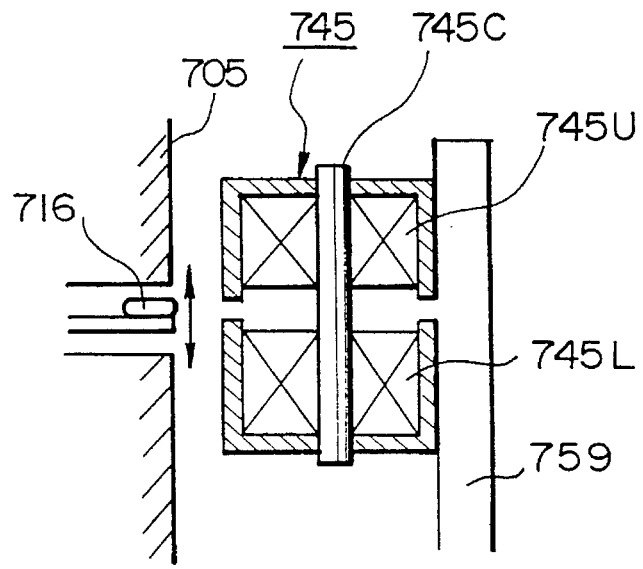
Figure 67:
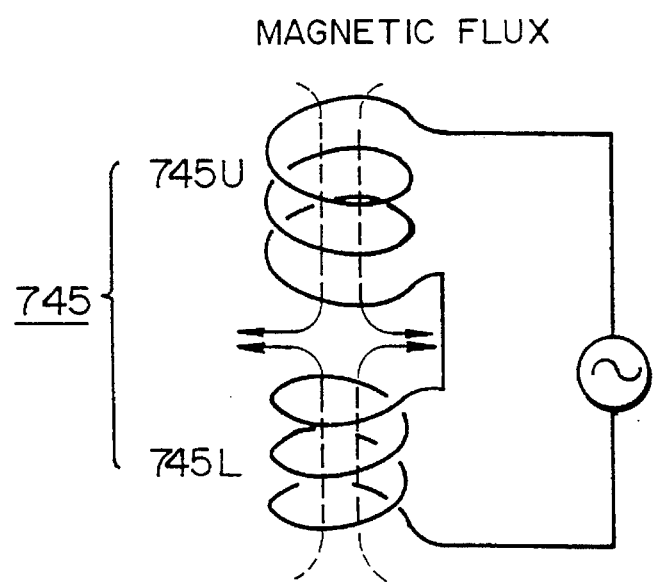
Figure 68:
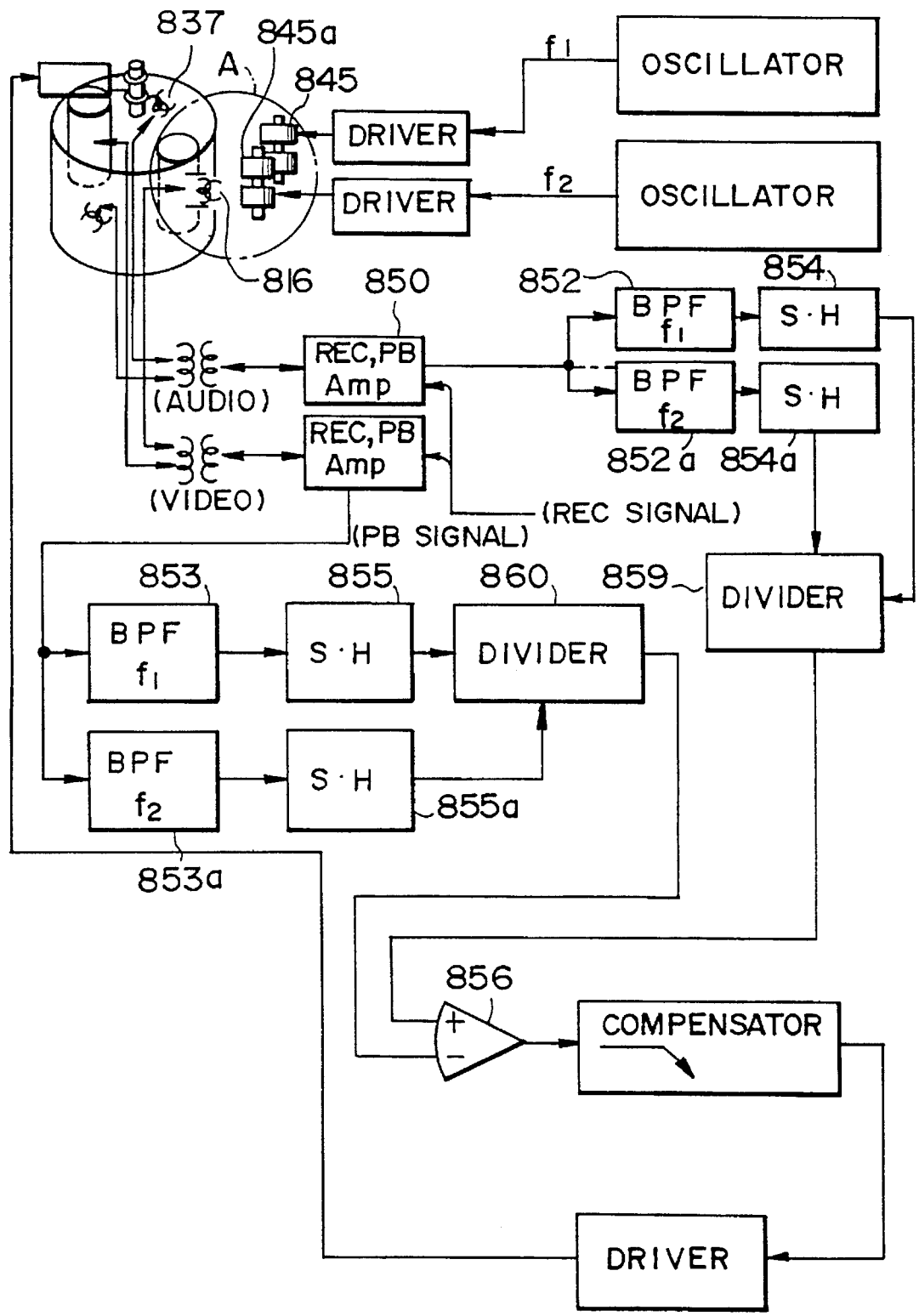
Figure 69:
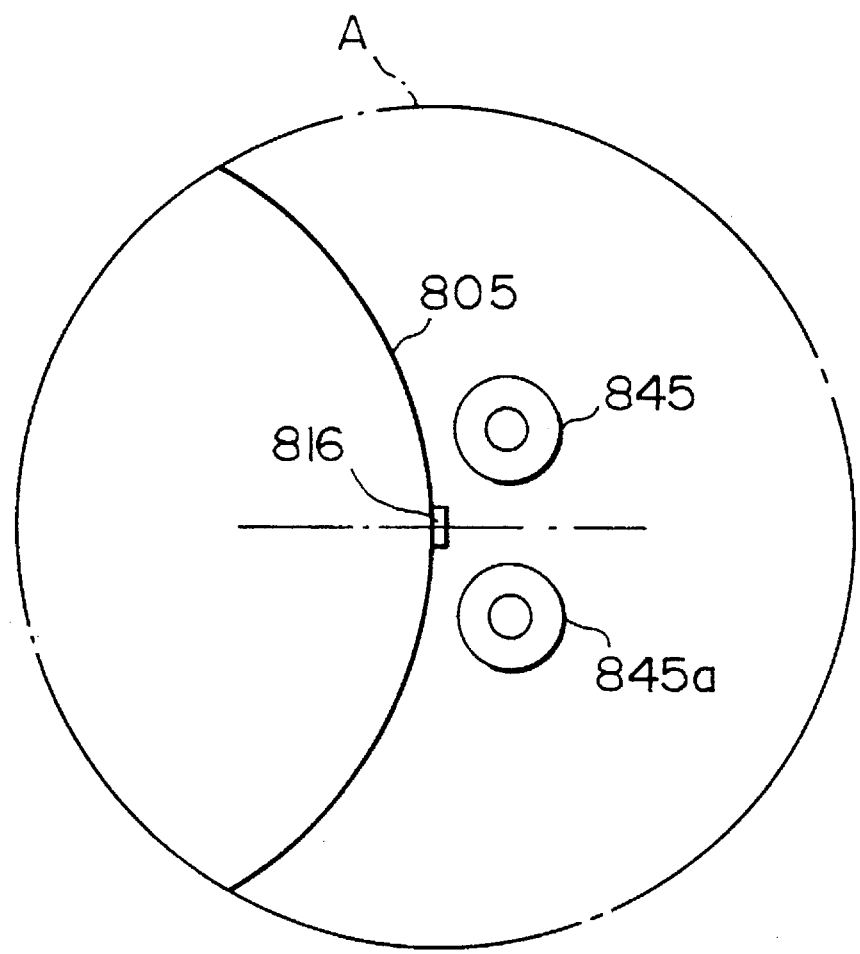
Figure 70:
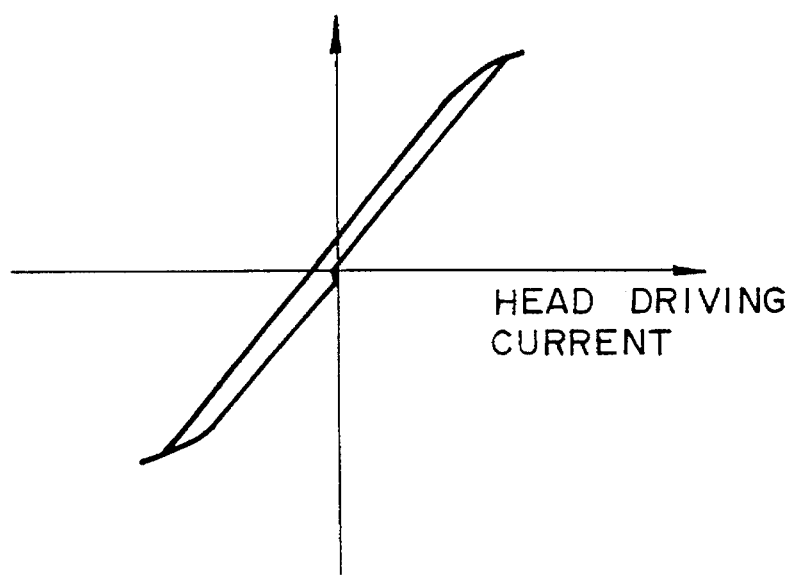
Figure 71:
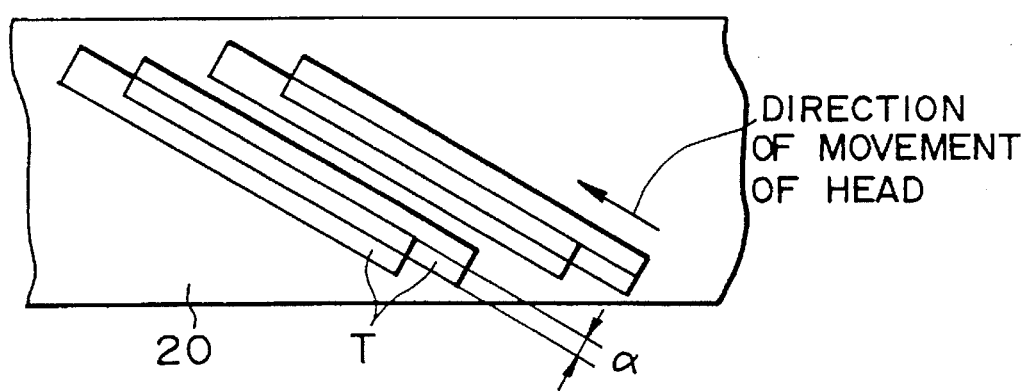
Figure 72:
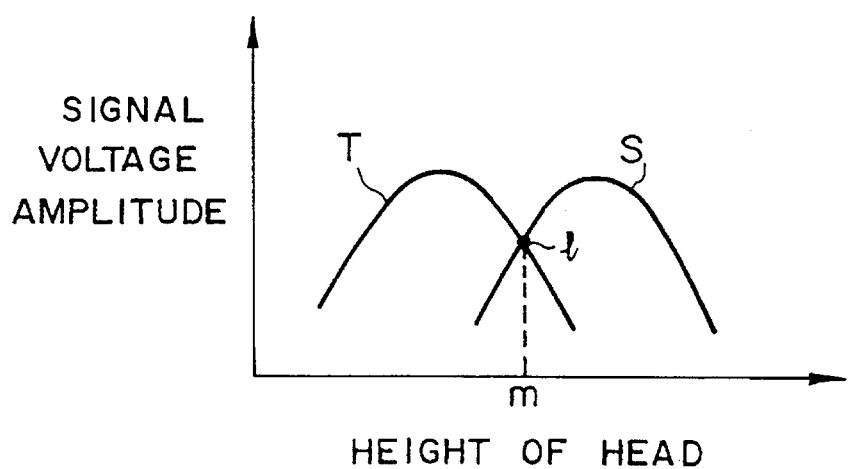
Figure 73:
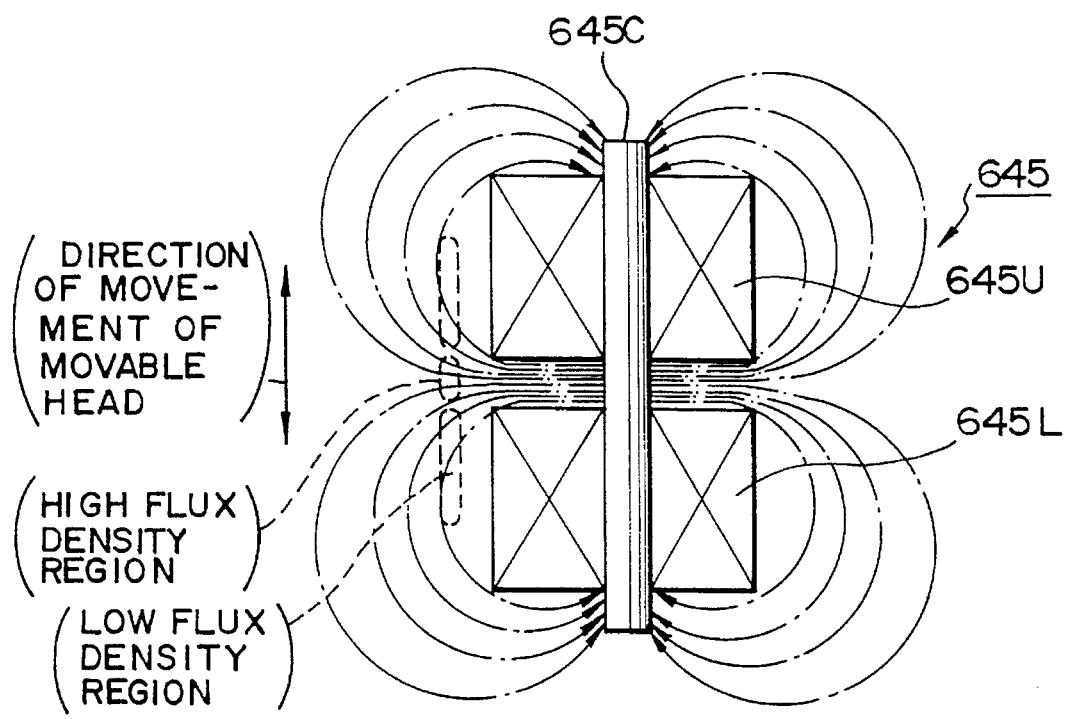
Figure 74:
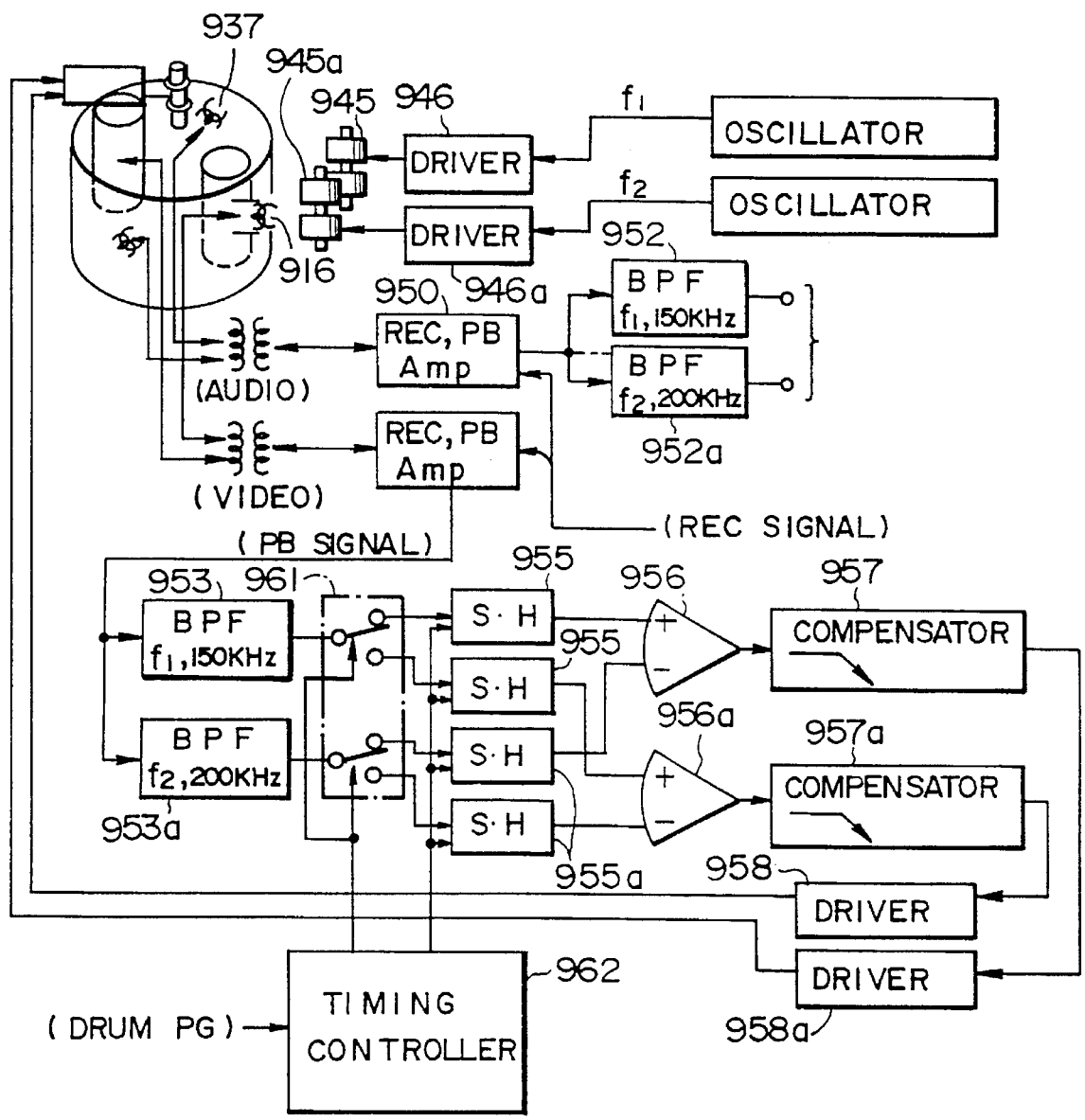
Figure 75:
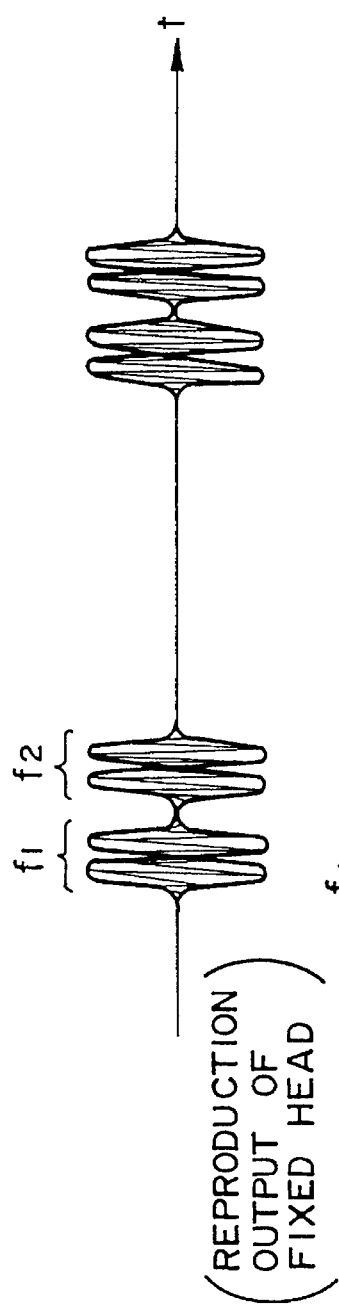
Figure 76:
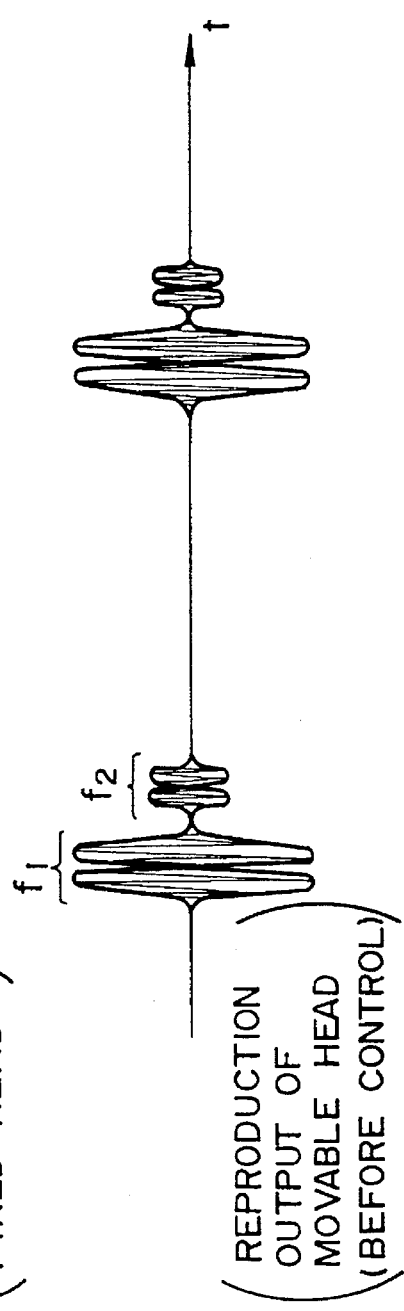
Figure 77:
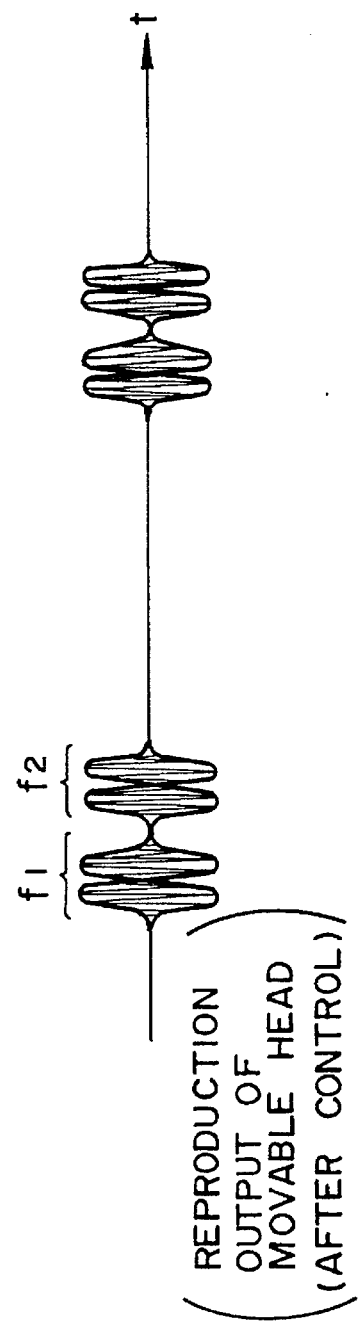
Figure 78:
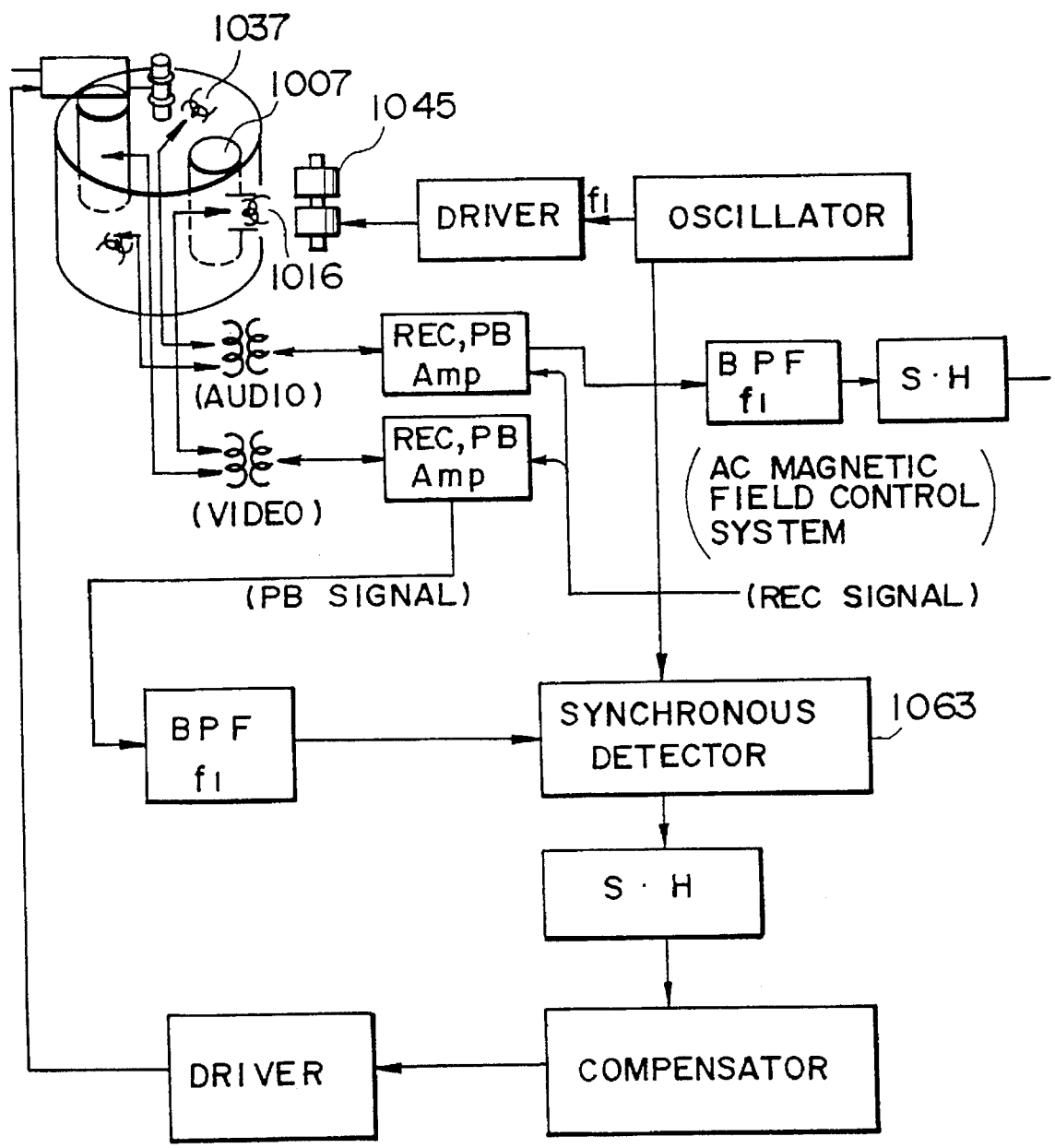
Figure 79:
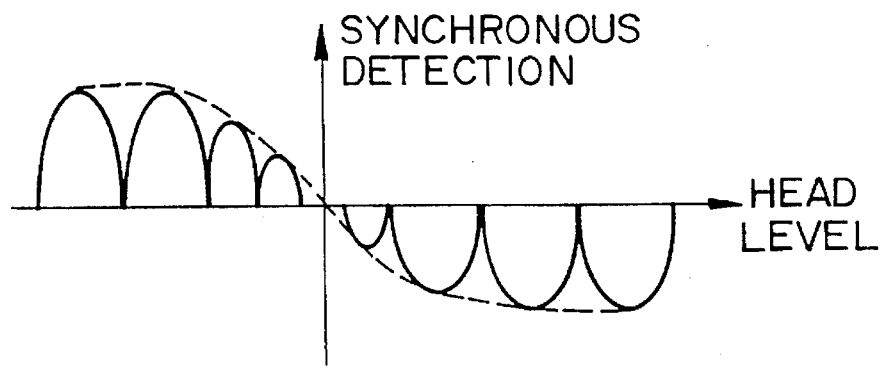
Figure 80:
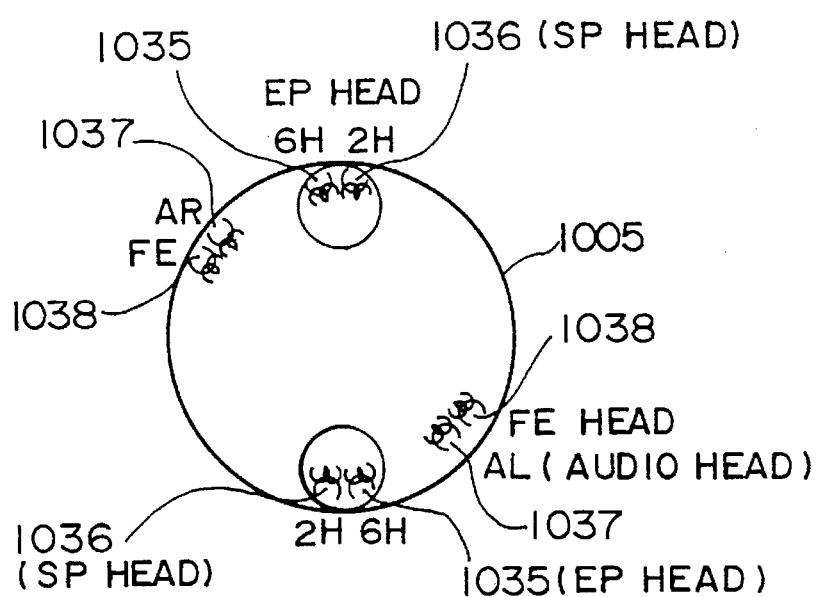
Figure 81:
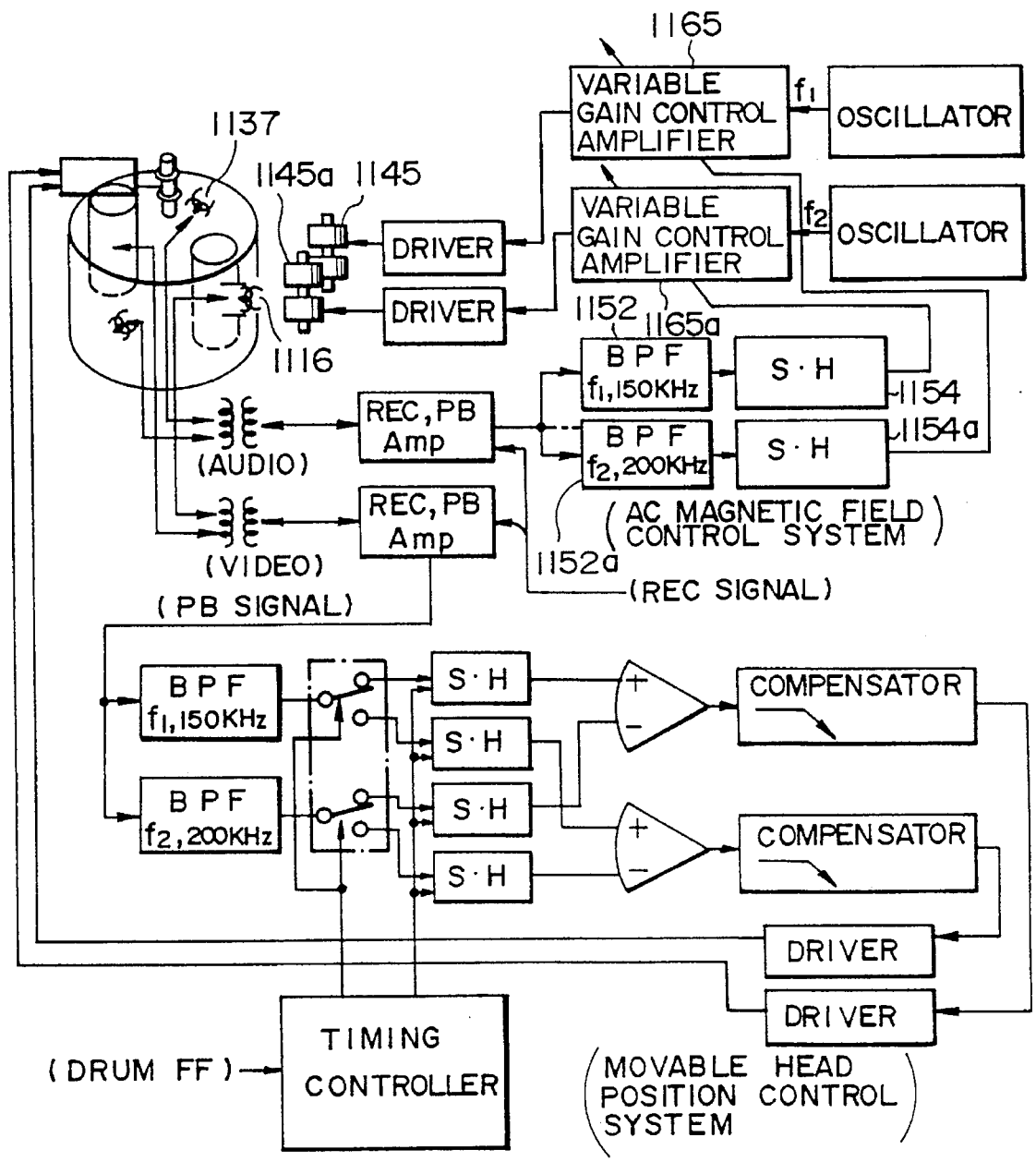
Figure 82:
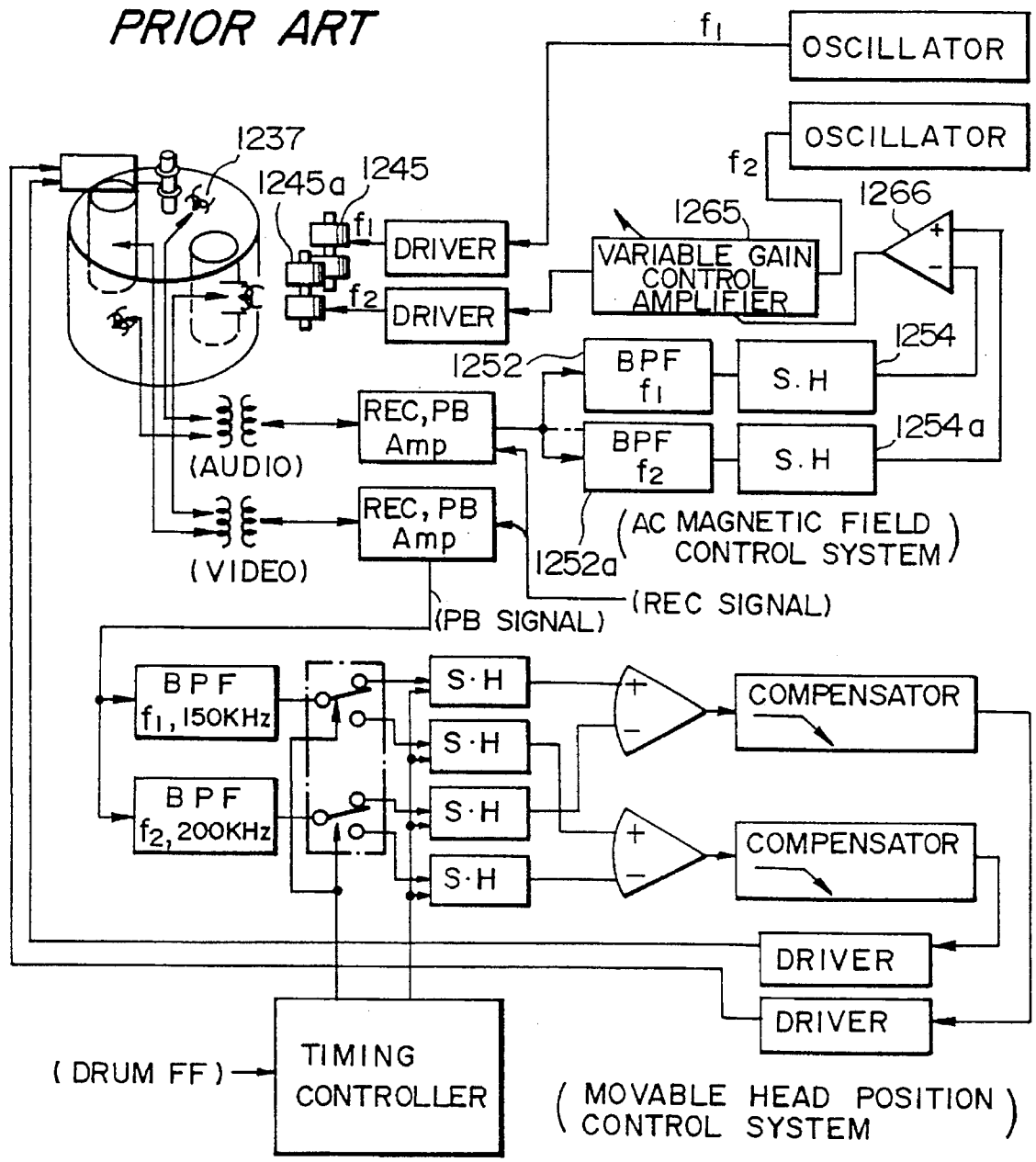
Figure 83:
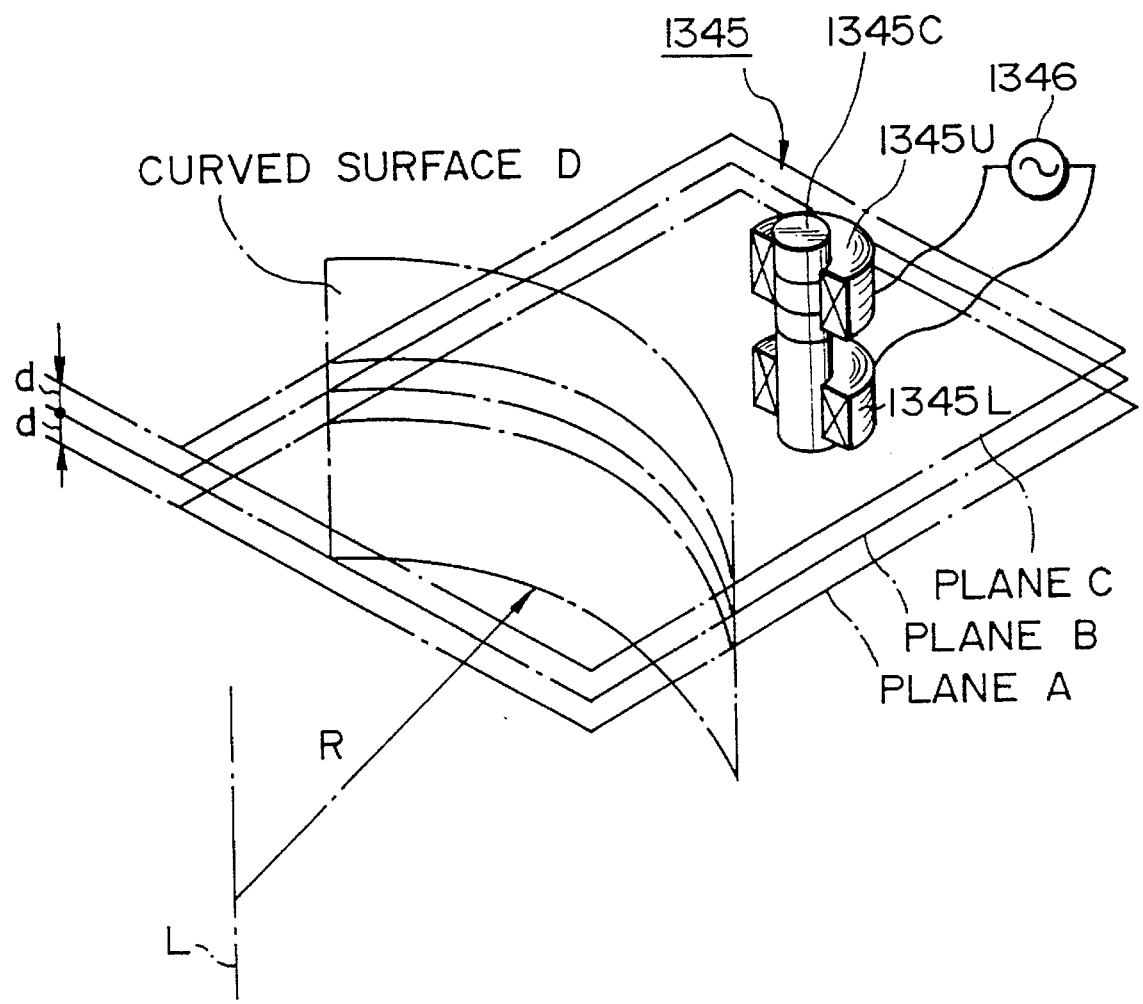
Figure 84:
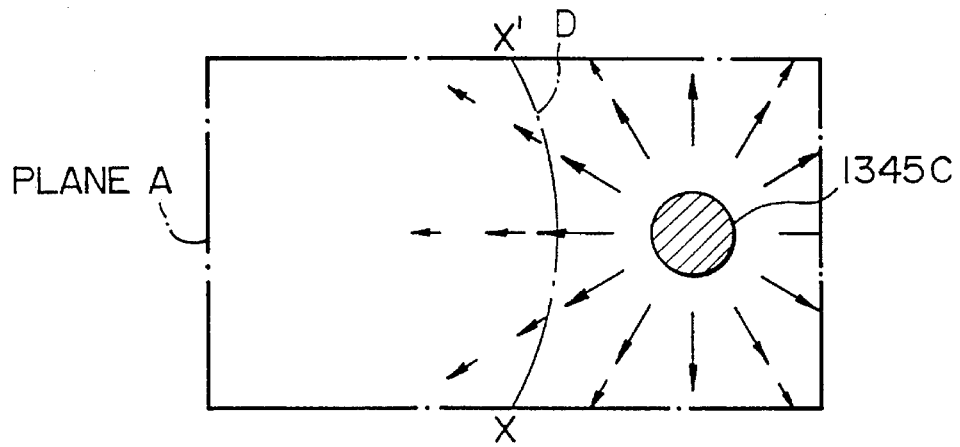
Figure 85:
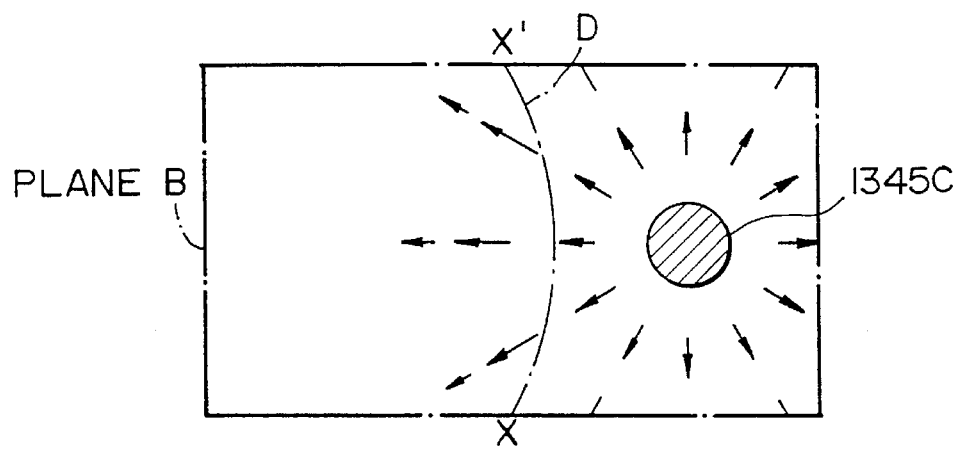
Figure 86:
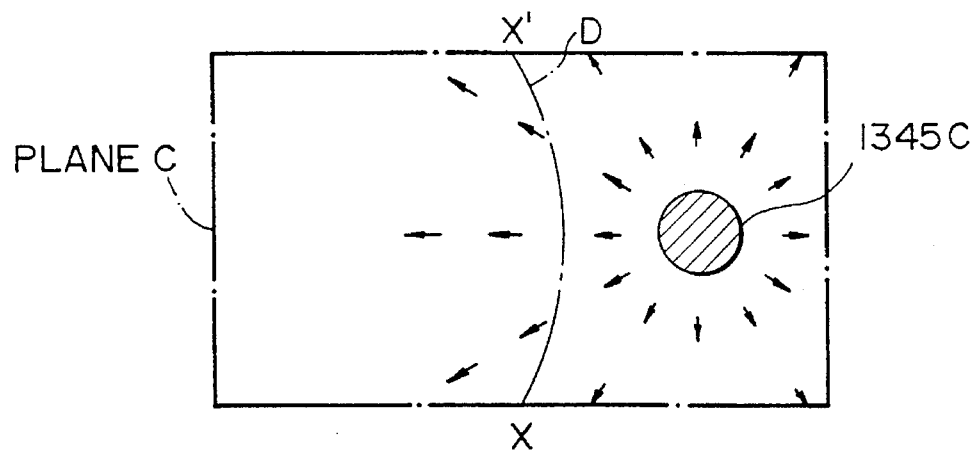
Figure 87:
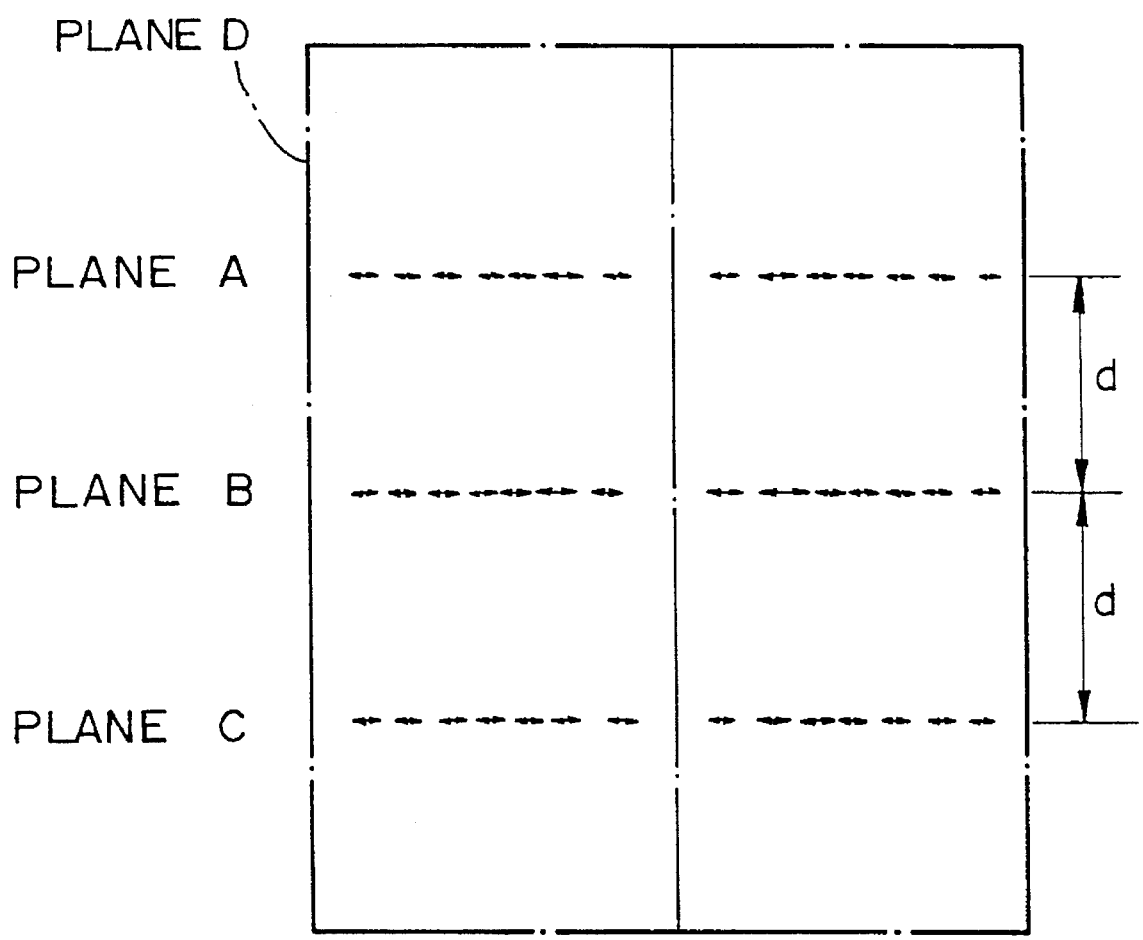
Figure 88:
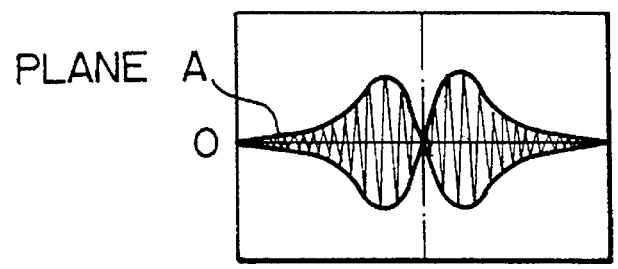
Figure 89:
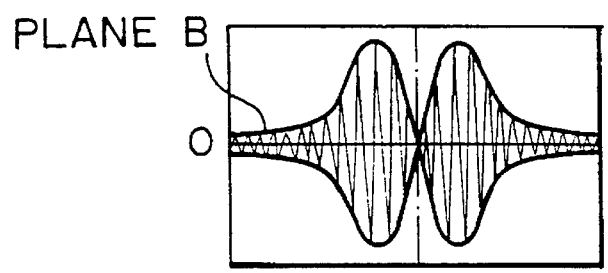
Figure 90:
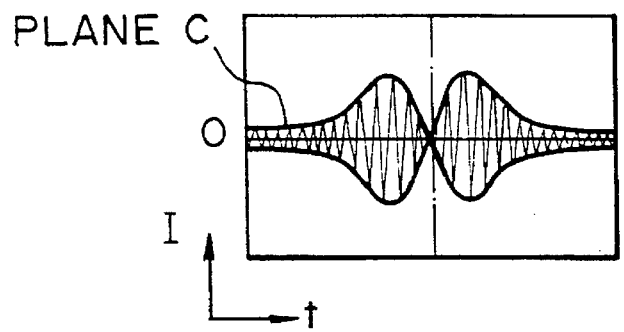
Figure 91:
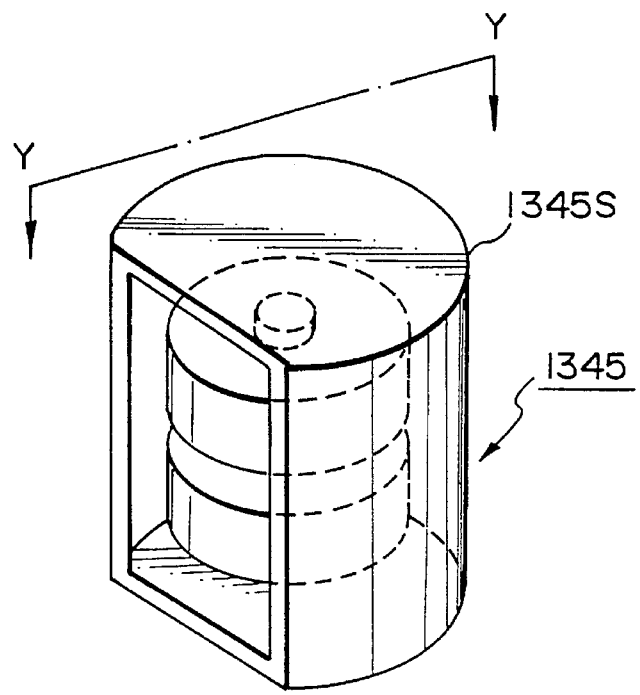
Figure 92:
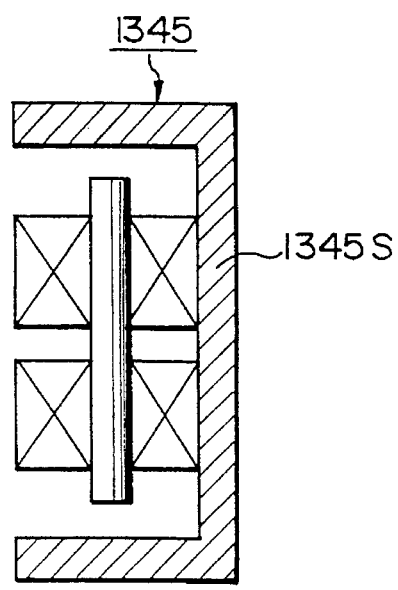
Figure 93:
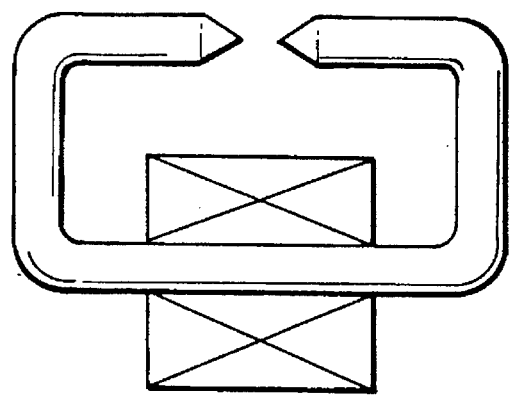
Figure 94:
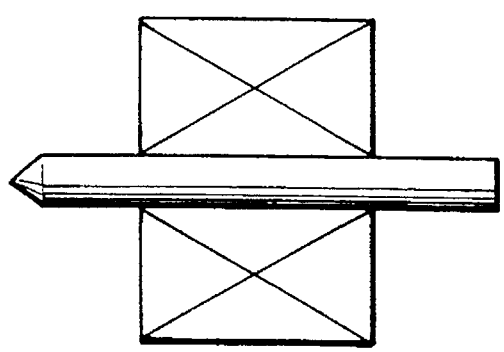

Fig, 21 is a circuit diagram of the improved damping controller shown in FIG. 20;

FIG. 22 is a partially sectional view of the structure of the interior of the drum in an eighth embodiment of the present invention;

FIG. 23 shows the arrangement of the heads on the gimbal spring in the eighth embodiment shown in FIG. 22;

FIG. 24 shows the structure of a magnetic field detector in a ninth embodiment of the present invention;

FIG. 25 is a circuit diagram of the structure of a detection signal amplifier of an absolute height detector in a tenth embodiment of the present invention;

FIG. 26 shows the operation mode for a switching transistor with respect to one rotation of the rotary drum;

FIG. 27 is a plan view of an example of the arrangement of heads in a VHS system or the like;

FIG. 28 shows the arrangement of channels of the rotary transformer in the case of adopting the head arrangement shown in FIG. 27;

FIG. 29 schematically shows the relationship between the channel for applying a recording current and a channel for detecting the height of a head in the case of adopting the head arrangement shown in FIG. 27;

FIG. 30 is a block diagram of the structure of a twelfth embodiment of the present invention having damping loop, position control loop and absolute height correction loop;

FIG. 31 shows the frequency characteristic of each loop shown in FIG. 30;

FIG. 32 shows the frequency characteristic of the open loop gain of each loop in a design different from that shown in FIG. 31;

FIG. 33 shows the gain-frequency characteristic of a lag-lead filter portion of a low frequency compensator;

FIG. 34 shows the gain-frequency characteristic of a primary low-pass filter portion of the low frequency compensator;

FIG. 35 shows the gain-frequency characteristic of a secondary low-pass filter portion of the low frequency compensator;

FIG. 36 shows the structure of a low frequency compensator which is composed of a cascade connection of the three different filters having the characteristics shown in FIGS. 33, 34 and 35, respectively;

FIG. 37 shows the gain-frequency characteristic of a low-pass filter portion of a position compensation controller;

FIG. 38 shows the gain-frequency characteristic of a high-pass filter portion of the position compensation controller;

FIG. 39 shows the structure of a position compensation controller which is composed of a cascade connection of the two different filters having the characteristics shown in FIGS. 37 and 38, respectively;

FIG. 40 is a flowchart of the processings in the main routine of a control program in the case of realizing an observer by using a software;

FIG. 41 is a flowchart of the observer subroutine in the flow shown in FIG. 40;

FIG. 42 is a flowchart of the position control subroutine in the flow shown in FIG. 40;

FIG. 43 is a flowchart of the absolute height correction subroutine in the flow shown in FIG. 40;

FIG. 44 is a perspective view of the arrangement on the printed circuit board in a thirteenth embodiment of the present invention, with a partially enlarged view in the form of a block diagram;

FIG. 45 shows the structure of a fourteenth embodiment of the present invention, in which a circuit structure such as an observer is disposed outside of a drum;

FIG. 46 is a plan view of the structure of an example of a movable head in a conventional device;

FIG. 47 shows the deformation of a bimorph when a deflection signal is applied thereto;

FIG. 48 shows the relationship between the effective length of a bimorph and the amount of inclination of a magnetic head;

FIG. 49 is a plan view of the structure of an example of a movable head in a conventional device, which is an improved structure shown in FIG. 46;

FIG. 50 is a plan view of the structure of an example of a movable head in a conventional device, which is an improved structure shown in FIG. 49;

FIG. 51 is an example of the frequency characteristics of a bimorph;

FIG. 52 is a plan view of the structure of an example of an actuator in a conventional device;

FIG. 53 is a block diagram of a first example of a conventional device;

FIG. 54 schematically shows a wobbling servo system;

FIG. 55 shows an example of the frequency characteristics of the actuator shown in FIG. 52;

FIG. 56 is a partially sectional view of a second example of a conventional device in the vicinity of a drum;

FIG. 57 is a sectional view of the second example shown in FIG. 56, taken along the line A—A;

FIG. 58 is a plan view of an actuator;

FIG. 59 is a sectional view of the actuator shown in FIG. 58, taken along the line B—B;

FIG. 60 is a sectional view of the actuator shown in FIG. 58, taken along the line C—C;

FIG. 61 shows an example of the arrangement of magnetic heads;

FIG. 62 is a block diagram of a control system;

FIG. 63 shows the location of a magnetic field generator;

FIG. 64 is a block diagram of a third example of a conventional device;

FIG. 65 shows the characteristic of a differential amplifier;

FIG. 66 is a sectional view of an AC magnetic field generating coil;

FIG. 67 shows the direction in which magnetic fluxes are generated by the AC magnetic field generating coil;

FIG. 68 is a block diagram of a fourth example of a conventional device;

FIG. 69 is an enlarged view of the part A in FIG. 68;

FIG. 70 shows the relationship between the driving current for the magnetic head actuator and the amount of displacement of the movable head, the relationship being a hysteresis characteristic;

FIG. 71 shows the recording tracking pattern in the case of the relationship shown in FIG. 70 holds in the fourth example;

FIG. 72 shows the relationship between the amplitude of a signal voltage and the height of a head;

FIG. 73 shows magnetic fluxes generated by the AC magnetic field generating coil;

FIG. 74 is a block diagram of a fifth example of a conventional device;

FIG. 75 shows the reproduction output of the fixed head in the fifth example shown in FIG. 74;

FIG. 76 shows the reproduction output of the movable head in the fifth example before control after control;

FIG. 77 shows the reproduction output of the movable head in the fifth example after control;

FIG. 78 is a block diagram of a sixth example of a conventional device;

FIG. 79 shows the synchronous detection output in the sixth example shown in FIG. 78;

FIG. 80 shows an example of the arrangement of heads;

FIG. 81 is a block diagram of a seventh example of a conventional device;

FIG. 82 is a block diagram of an eighth example of a conventional device;

FIG. 83 shows a coordinate plane for examining the magnetic field distribution of an AC magnetic field generating coil;

FIG. 84 shows the magnetic field distribution on the plane A in FIG. 83;

FIG. 85 shows the magnetic field distribution on the plane B in FIG. 83;

FIG. 86 shows the magnetic field distribution on the plane C in FIG. 83;

FIG. 87 shows the magnetic field distribution on the plane D in FIG. 83;

FIG. 88 show the waveform output by the induced electromotive force of the movable head which has passed the line where the plane A intersect the curved surface D shown in FIG. 83;

FIG. 89 show the waveform output by the induced electromotive force of the movable head which has passed the line where the plane B intersect the curved Surface D shown in FIG. 83;

FIG. 90 show the waveform output by the induced electromotive force of the movable head which has passed the line where the plane C intersect the curved surface D shown in FIG. 83;

FIG. 91 is a perspective view of magnetic shielding by means of a soft magnetic material;

FIG. 92 is a sectional view of the magnetic shielding shown in FIG. 91, taken along the line Y—Y;

FIG. 93 shows the structure of an example of an AC magnetic field generating coil; and FIG. 94 shows the structure of another example of an AC magnetic field generating coil.

DESCRIPTION OF THE PREFERRED EMBODIMENT

The structures and operations of the preferred embodiments of the present invention will be explained hereinunder.

(1) Speed estimating observer;

In order to realize high-density recording and execute superior reproduction at a high speed without producing noise, it is necessary to use an actuator which has a wide movable range and which allows the magnetic head to come into good contact with the magnetic tape. By using such an actuator, the displacement of the magnetic head is realized with such a large amplitude as to enable the magnetic head to follow a non-linearity of track which is formed on the magnetic tape and, hence, good reproduction is realized.

On the basis of this prerequisite, in the present invention, a speed estimating means (hereinunder referred to as "observer") is used in place of the differentiator in the first example of a conventional device. By using an observer, the increase of noise, which is inevitable in the first example of a conventional device, is prevented and the influence of higher-order mechanical resonance is excluded.

Figure 1:
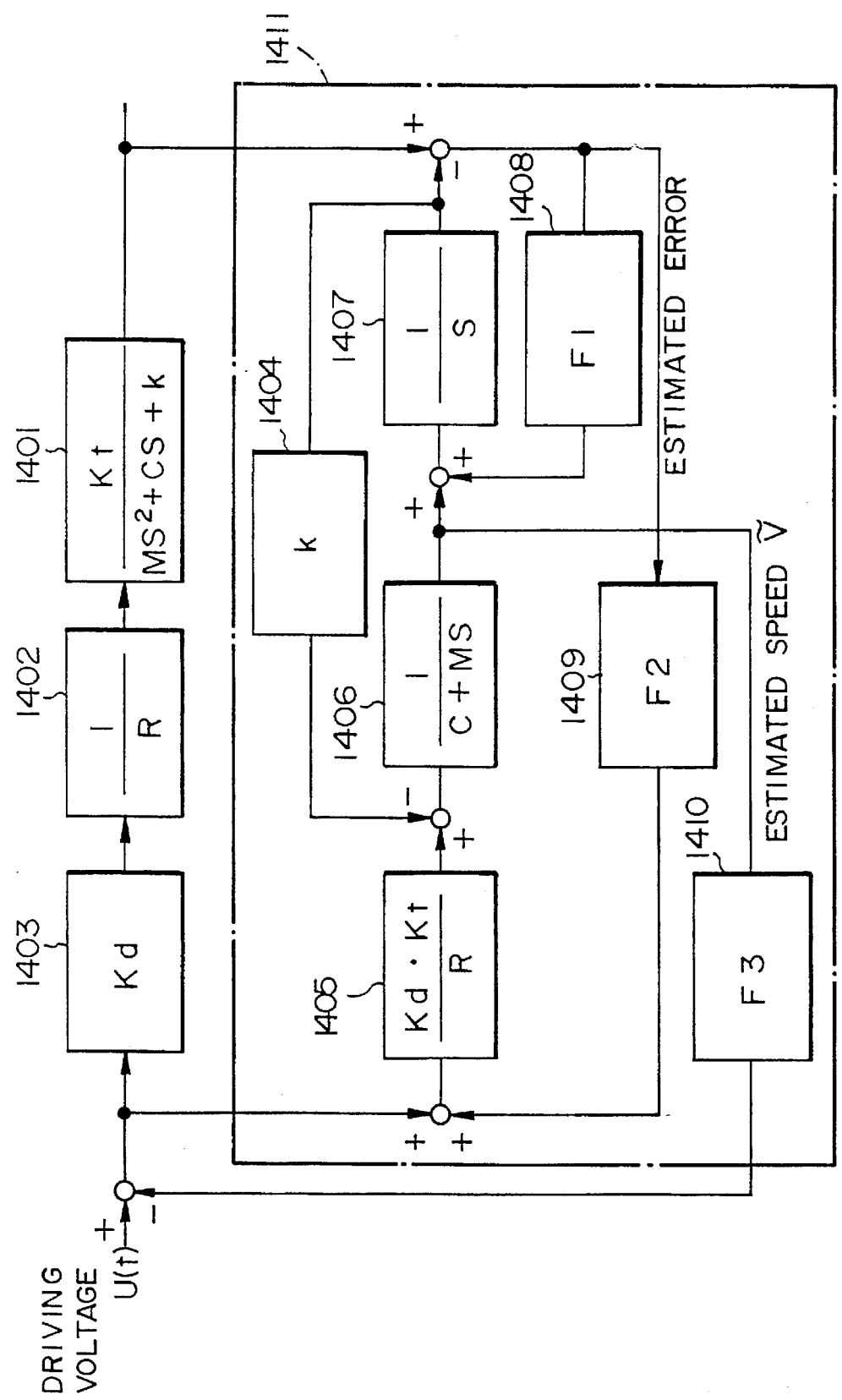
FIG. 1 shows an example of a speed estimating observer having a hardware structure.

FIG. 1 shows an example of the structure of an observer. An observer is a device which can be realized by the application of what is called modern control theory. The observer shown in FIG. 1 is such an observer in the form of a identify observer.

In FIG. 1, an actuator is represented by blocks 1401, 1402 and 1403. The block 1401 represents the mechanical part of the actuator, 1402 an actuator coil and 1403 a driving signal amplifier. The driving voltage U(t) is amplified by the driving signal amplifier 1403, converted into a current by the actuator coil 1402, and the current drives the mechanical part 1401 of the actuator. From the mechanical part 1401 is supplied the output of a sensor, which is the amount indicating the position of the magnetic head. The symbol Kd represents a drive amp gain, and R the resistance of the actuator coil 1402. The symbol Kt represents the torque constant of the mechanical part 1401 of the actuator, C a viscosity constant, M the mass of the movable portion and k a spring constant.

The observer is represented by a block 1411. The observer 1411 is composed of blocks 1404 to 1410. The block 1405 has a drive amp gain of Kd, a force constant of Kt and a conversion gain Kd.Kt/R which is determined by the resistance R and it is a block simulating the operation from the output of the driving voltage U (t) to the conversion of the driving voltage U (t) into the driving torque of the operations of the actuator. The block 1406 is a block in which the conversion gain is expressed by 1/(C+Ms) and the output of the block 1406 has a dimension of speed. The block 1407 is a block in which the conversion function is 1/s, in other words, an integration block, and the output thereof has a dimension of displacement. The block 1404 is a block in which the conversion gain is k and the output of the block 1407 is converted into a torque and fed back to the block 1406.

Therefore, the conversion gain from the output of the block 1405 to the block 1407 is $1/(Ms^2+Cs+k)$, if an error (the output of the block 1408) is disregarded. As is obvious from this fact, the observer is so designed that the conversion gain from the output of the block 1405 to the block 1407 is equal to the transfer function of the actuator. As a result of this design, the output of the block 1406 turns to be equal to an estimated value of the speed of the magnetic head which is actually obtained by the actuator. This estimated value will here be referred to as "estimated value V~").

The block 1408 is a block for feeding back an estimated error to the block 1407 so that the loop relating to the block 1404 is stabilized. The symbol F1 represents what is called an observer gain, and the estimated error is a difference between the transfer function of the actuator and the conversion gain of the block 1405 to the block 1407. The block 1409 is a block for feeding back the estimated error to the block 1405. The symbol F2 represents an observer loop gain.

The two feedback loops composed of the blocks 1408 and 1409 are loops provided in view of the fact that there is actually a limitation to the simulation of the actuator by the observer. For example, since the transfer function of the observer 1411, in particular, the transfer function of the system of the block 1405 to the block 1407 has a second-order integral characteristic, these blocks do not simulate the integral characteristic of the actual actuator including the integral characteristic in the initial state. For example, although an external disturbance is applied to the actual actuator before integration, these blocks 1405 to 1407 cannot simulate even the external disturbance. In other words, the blocks 1405 to 1407 are the same as the actual actuator with respect to the frequency characteristic but they are not the same with respect to the dynamic characteristic (variation of the output value with time).

The blocks 1408 and 1409 are blocks for feeding back the estimated error so that the estimated error is converged to zero. A predetermined time after starting the observer 1411, the estimated error is converged to zero, so that the transfer function of the observer 1411 becomes equal to the transfer function of the simulated actuator. In other words, the estimated speed V~ is made coincident with the actual speed of the magnetic head. The estimated speed V~ is fed back to the driving voltage U(t) for the actuator. The symbol F3 represents a damping loop gain. In this way, the mechanical resonance characteristic is damped on the basis of the estimated speed V~, and the driving characteristic of the magnetic head is also damped.

Figure 2:
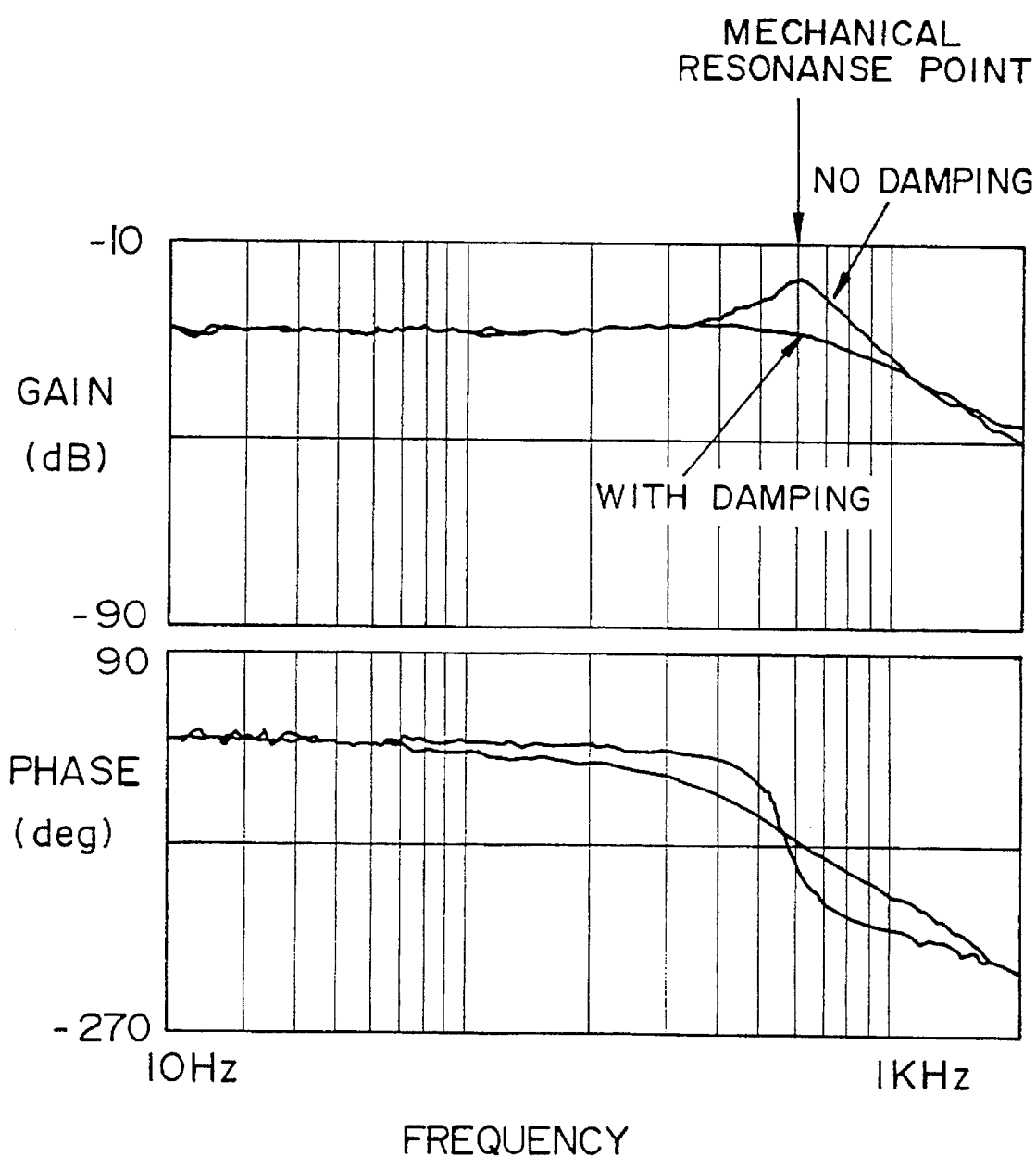
FIG. 2 shows the frequency characteristic of an actuator, in particular, the difference in characteristic depending upon the presence or absence of the observer shown in FIG. 1.

FIG. 2 shows the measured value of the frequency characteristic of the actuator. In FIG. 2, "No damping" represents the mechanical resonance characteristic of the actuator which does not adopt an observer having the structure shown in FIG. 1, and "With damping" represents the mechanical resonance characteristic of the actuator which adopts an observer having the structure shown in FIG. 1. As is obvious from FIG. 2, the peak of the gain which is caused at the mechanical resonance point is lower in "With damping".

In this way, it is clear that the damping action is prominent when the observer is used. The design for obtaining such a damping action will now be explained. How to determine the gains F1, F2 in the structure shown in FIG. 1 will first be explained.

If it is assumed that $\tilde{X}_1$ is the estimated position of the actuator, $\tilde{X}_2$ the estimated speed of the actuator, $\mu$ an input, $C_e$ an estimated error and $\tilde{y}$ the output of the observer, the state of the actuator is represented by the following equation:

$$\frac{d}{dt}\begin{bmatrix} \tilde{x}_1 \\ \tilde{x}_2 \end{bmatrix} = \begin{bmatrix} 0 & 1 \\ -k/M & -C/M \end{bmatrix} \cdot \begin{bmatrix} \tilde{x}_1 \\ \tilde{x}_2 \end{bmatrix} + \begin{bmatrix} 0 \\ 1/M \end{bmatrix} u - \begin{bmatrix} F1 \\ F2 \end{bmatrix} c_e \quad (1)$$

If it is assumed that the poles of the observer 1411 are $-\alpha_1$, $-\alpha_2$ in accordance with the definition of an arbitrary pole-positioning in the modern control theory, the equation (1) is solved by obtaining F1, F2 which satisfy the following equation (2):

$$\begin{bmatrix} F1 \\ F2 \end{bmatrix} = \begin{bmatrix} \alpha_1 + \alpha_2 - C/M \\ \alpha_1 \alpha_2 - k/M - (\alpha_1 + \alpha_2) \\ C/M - C^2/M^2 \end{bmatrix} \quad (2)$$

Figure 3:
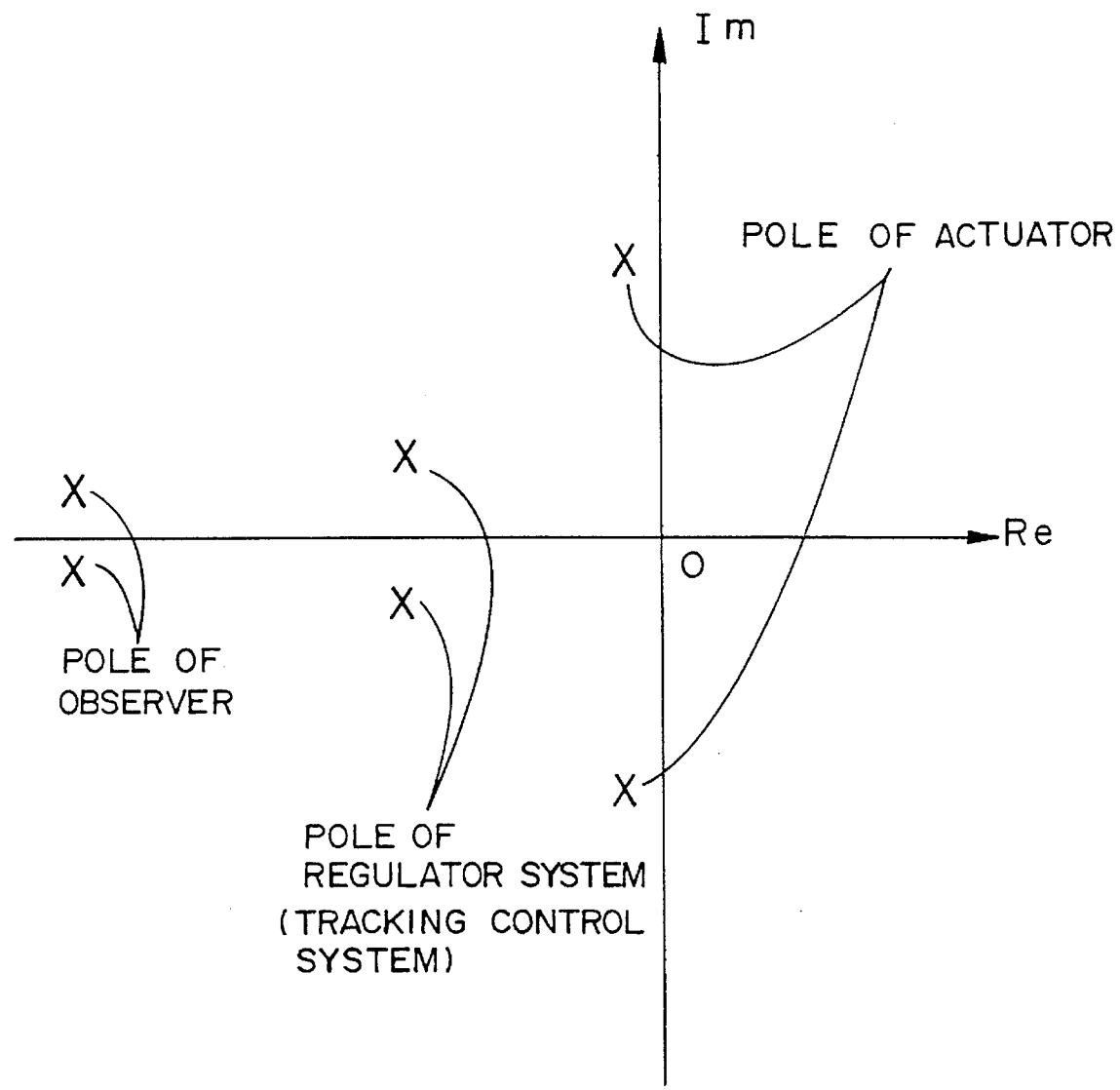
FIG. 3 shows a complex plan of the pole-positioning of an actuator, pole-positioning of an observer and pole-positioning of a regulator system.

However, since it is necessary that the loops including the blocks 1409 and 1410 are respectively converged adequately in advance of the whole tracking control system, it is necessary that the values $\alpha_1$, $\alpha_2$ in the equation (2) are so determined that the coordinates $\alpha_1$, $\alpha_2$ are set adequately on the left-hand side (early convergence side) of the poles of the regulator system (tracking control system) in the pole-positioning shown in FIG. 3. The characteristics of the actuator mechanical part is simplified in the form of a second-order system in FIG. 1, but in some of the actual actuators having a leaf-spring configuration, there is a large amount of higher-order serial resonance and parallel resonance, which exerts deleterious influence such as the deterioration of the gain merge. In this case, it is also possible to suppress the influence of such higher-order resonance by setting the frequency band (the frequency band in which the open loop gain is 0 dB) of the feedback loop (block 1409) in the observer as follows.

The characteristics of the actuator mechanical part is represented by the following equation (3):

$$Kt.Gm/(MS^2+CS+k) \quad (3)$$

wherein Kt represents the torque constant of the actuator and Gm a higher-order resonance characteristic.

The equation (3) is rearranged as equation (3)=B(s).Gm

In FIG. 1, if it is assumed for simplifying the explanation that R=1, Kd=1 and F2=0, the transfer function from the input terminal for the driving voltage to the output terminal for the estimated speed $\tilde{V}$ is represented by the following equation (5):

$$\tilde{V}=u(t).B(s).S.\{(1+(F1).B(s).Gm)/(1+(F1).B(s))\} \quad (5),$$

and the transfer function from the input terminal for the driving voltage to the output terminal for the real actuator speed is represented by the following equation (6):

$$V=u(t).B(s).S.Gm \quad (6)$$

By comparing the equation (5) and the equation (6), it is observed that the Gm in the equation (5) of $\tilde{V}$ is obtained by multiplying the Gm in the equation (6) of V by the coefficient represented by the following equation:

$$(F1).B(s)/\{1+(F1).B(s)\} \quad (7)$$

In the equation (7), F1.B(s) is equal to the open loop characteristic of the observer. In other words, since the equation (7) has a closed characteristic, if the frequency band is set as the tracking control frequency band<observer band<high-frequency mechanical resonance frequency=fm, the gain in the frequency band which is higher than the control frequency band in the closed characteristic is not more than 0 dB. That is, the following equation holds:

$$(F1).|B(fm)|/(1+(F1).|B(fm)|)<1 \quad (8)$$

Since the coefficient of Gm in the equation (5) is smaller than the coefficient of Gm in the equation (6), it is possible to reduce the influence of high-frequency mechanical resonance in the frequency band to which the speed is fed back by the observer in FIG. 1.

(2) First embodiment

Figure 4:
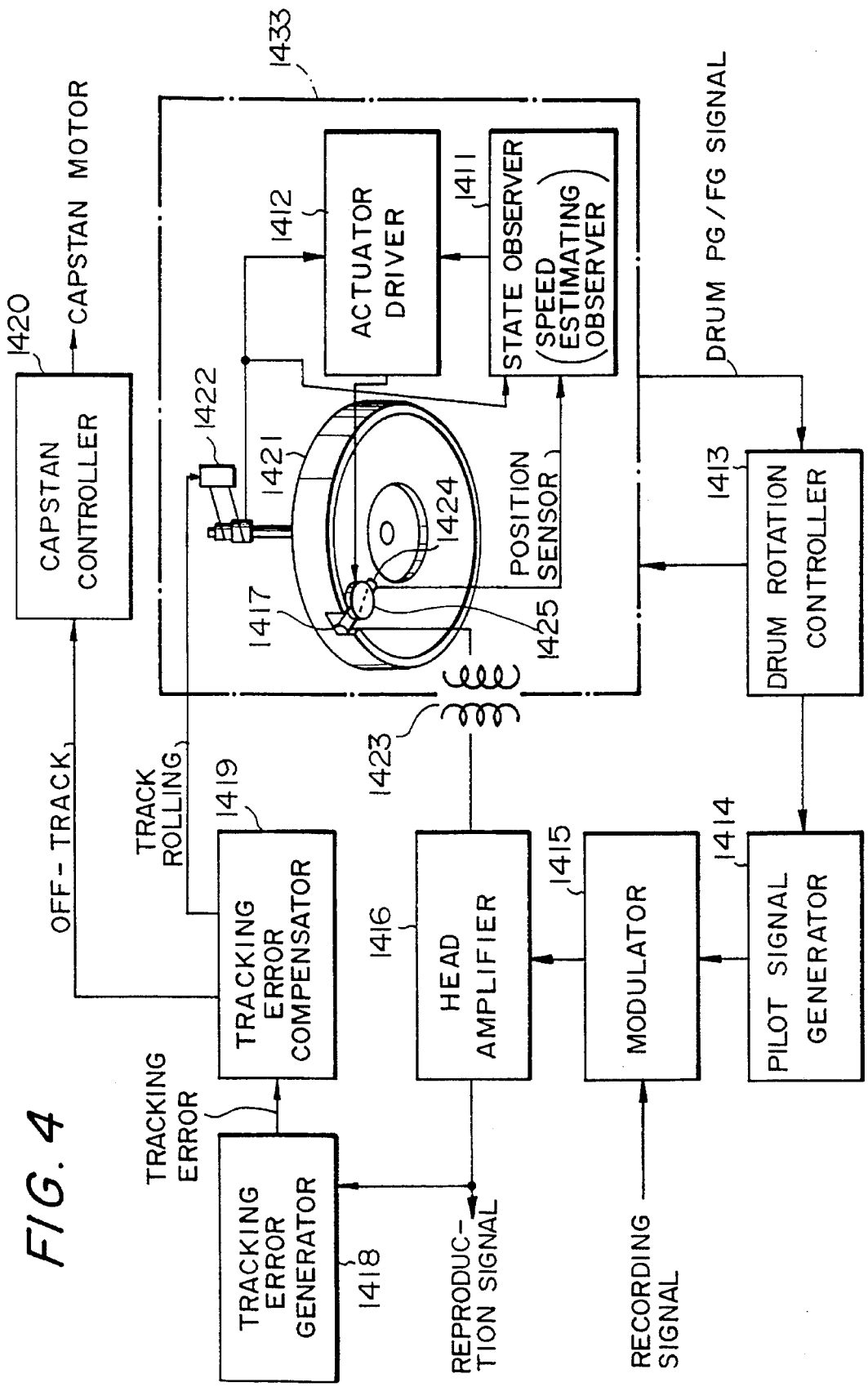
FIG. 4 is a block diagram of the structure of a first embodiment of the present invention which incorporates the observer shown in FIG. 1, with a perspective view of a rotary drum and the vicinity thereof added thereto.

A first embodiment of the present invention which is a tracking control system adopting the observer shown in FIG. 1 is shown in FIG. 4. In FIG. 4, the reference numeral 1412 represents an actuator driver provided in a drum, 1411 a state observer (speed estimating observer) which is represented by the transfer function shown in FIG. 1, 1413 a drum rotation controller for rotating a rotary drum, 1414 a pilot signal generator for generating a pilot signal for executing tracking control in synchronism with the rotation of the drum at the time of reproduction, 1415 a modulator for modulating a signal so that multiple pilot signals are superimposed on recorded data, for example, at the time of recording digital information, and 1416 a head amplifier for applying a current to a magnetic head 1417 at the time of recording and amplifying a minute reproduction signal at the time of reproduction. The reference numeral 1418 denotes a tracking error generator for generating a signal which indicates the direction and amount of off-track from the pilot signal contained in the reproduction signal, 1419 a tracking control compensator for operating the tracking control loop stably and safely, and 1420 a capstan controller for controlling a capstan motor on the basis of a low-frequency off-track component of the tracking error signal. The reference numeral 1421 represents a rotary drum, 1422 a slip ring for supplying an electric signal (including power source) from an external system to the rotary drum 1421, 1423 a rotary transformer for transmitting and receiving a signal between the rotary drum 1421 and the external system, and 1424 a position sensor attached to an actuator 1425 so as to detect the displacement of the movable portion 1430 of the actuator 1425.

Figure 5:
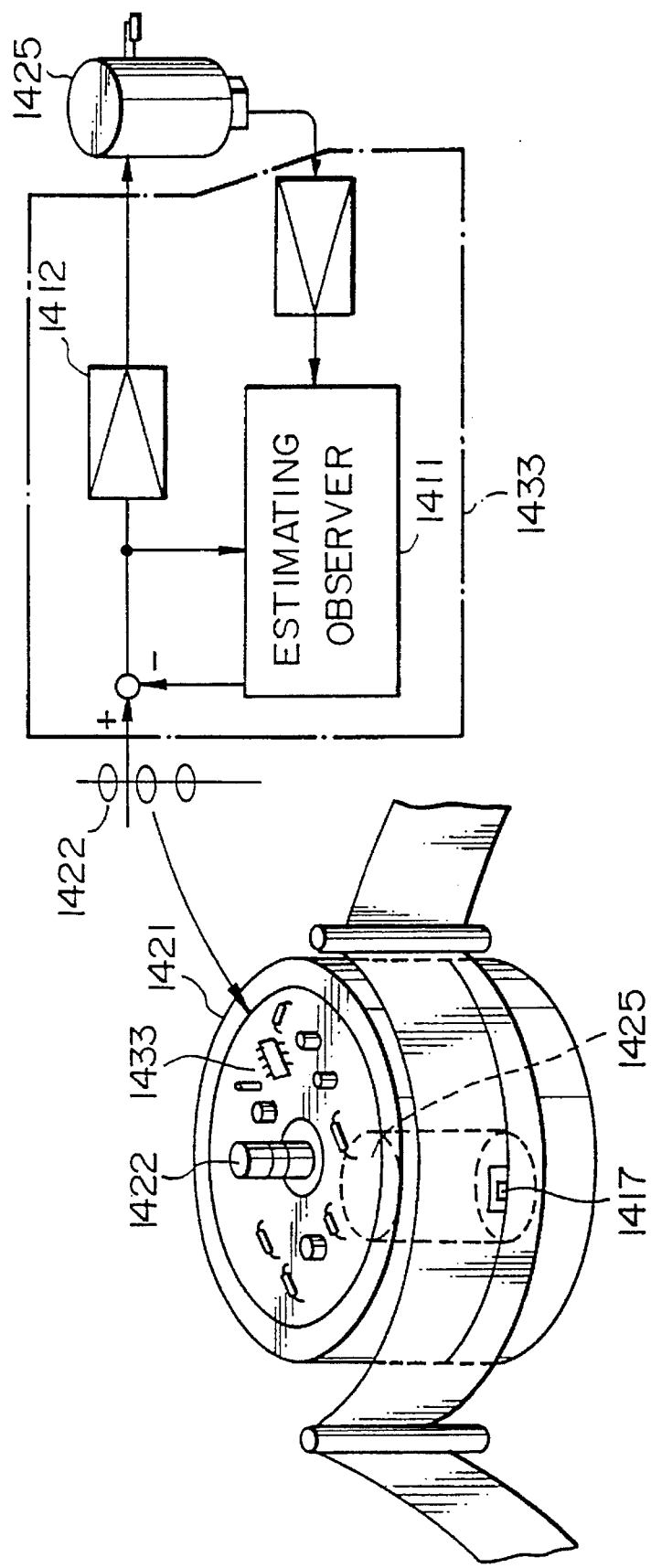
FIG. 5 is a perspective view of the arrangement on the printed circuit board in the first embodiment, with a partially enlarged view in the form of a block diagram.

In the case of detecting the position of the head 1417 by the position sensor 1424, it may sometimes be impossible to take out the detection signal to the outside of the drum 1421 which is output from the position sensor 1424 due to the limitation of the number of channels of the rotary transformer 1423 or the influence of noise caused by the sliding action of the slip ring 1422. These problems are solved in this embodiment by disposing the driver 401 for the actuator 1425 and the speed estimating observer 1411 on a printed circuit board 1433 provided within the drum, as shown in FIG. 5. In other words, the actuator 1425 together with its electric damping function is controlled from the outside of the drum 1421 through the slip ring 1422. This embodiment is an example of tracking control system of a digital recording VTR which is required to carry out higher-density recording by narrow-track recording and into which an observer is incorporated. A pilot signal which is necessary for detecting a tracking error is generated by the tracking error generator 1418. In this embodiment, the DC component (CDS value) in each digital block data is varied in accordance with the pilot signal and the pilot signal is superimposed on the digital data (recording signal) by the modulator 1415 at the time of recording. At the time of reproduction, a signal indicating a tracking error is generated by the tracking error generator 1418 for tracking operation.

At this time, by adding a pilot signal by an analog adder in place of varying the CDS value of the digital data, the recording operation is also carried out without any trouble so long as the level of the pilot signal is sufficiently lower than the level of the recording information signal. In the case of analog recording (FM recording VTR), a multiplicity of pilot signals are recorded in the gaps between frequency allocation.

The phase and the gain of the tracking error obtained in this way are compensated for by the tracking error compensator 1419 and a component having a comparatively high frequency such as non-linearity of track is fed back to the printed circuit board 1433, while a component having a comparatively low frequency such as off-track is fed back to the capstan motor, thereby preventing the control by the control system on the printed circuit board 1433 from exceeding the dynamic range.

In order to obtain the observer having the above structure, the position sensor 1424 for detecting the position of the movable head is essential.

Figure 6:
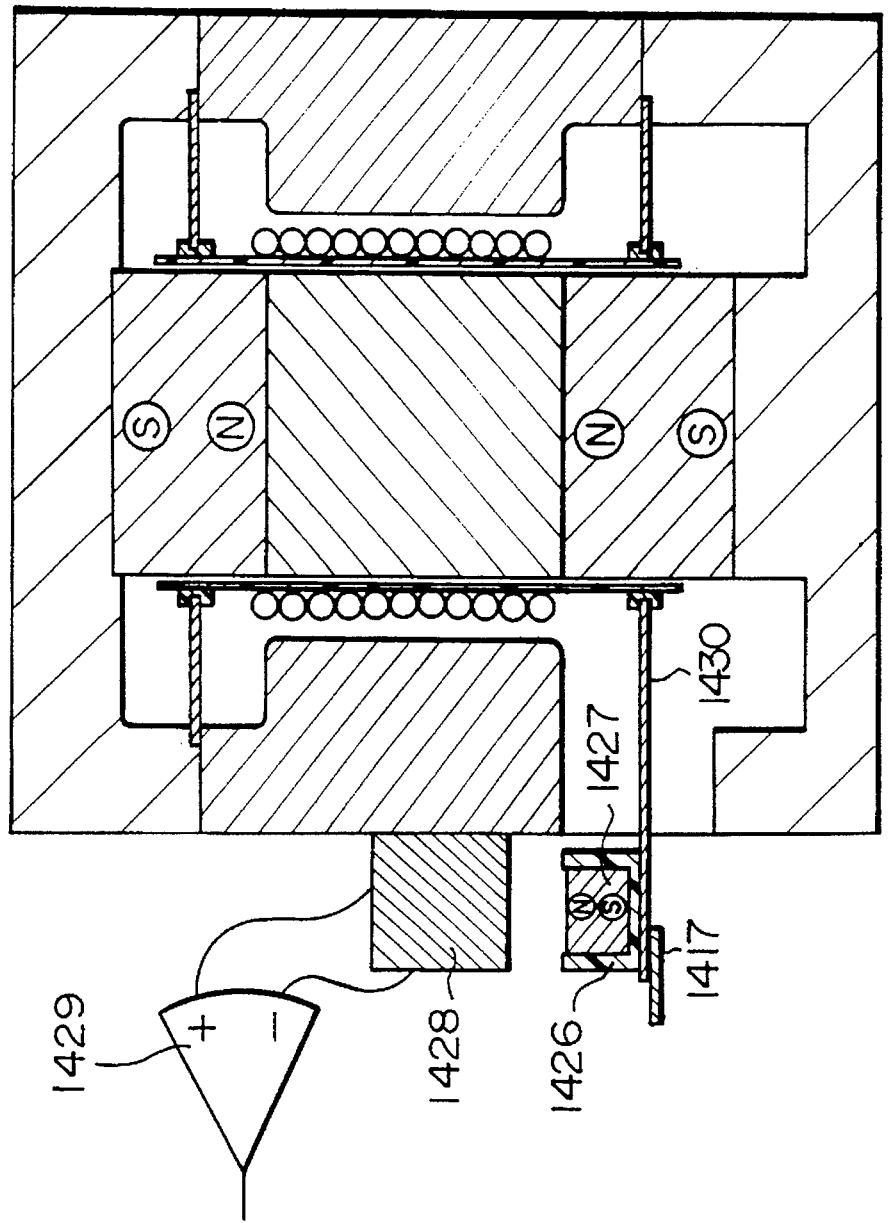
FIG. 6 is a sectional view of an actuator including a Hall sensor which is used in the first embodiment.

FIG. 6 shows an example of the structure of the actuator 1425 which adopts a Hall sensor as the position sensor 1424. In FIG. 6, the reference numeral 1426 represents a magnet holder for reducing the magnetic fluxes which leak out to the magnetic head 1417, 1427 a magnet for generating magnetic fluxes, 1428 a Hall sensor for detecting the intensity of the magnetic flux of the magnet 1427, and 1429 a differential amplifier for amplifying the minute signal output from the Hall sensor 1428 so as to obtain a position signal.

In the structure shown in FIG. 6, in order to detect the movement of the magnetic head 1417, the magnet 1427 is disposed on the movable portion 1430 and the flux density is detected by the Hall sensor 1428. When the magnet 1427 comes close to or away from the Hall sensor 1428 with the rocking movement of the movable portion 1430, the value of flux density varies, The output of the differential amplifier 1429 represents the flux density. In this way, the position of the movable portion is detected.

The magnet 1427 is surrounded by the magnet holder 1426 which is composed of a material having a high magnetic permeability so as to prevent the influence of leaked magnetic field on the magnetic head 1417.

(3) Second embodiment

Figure 7:
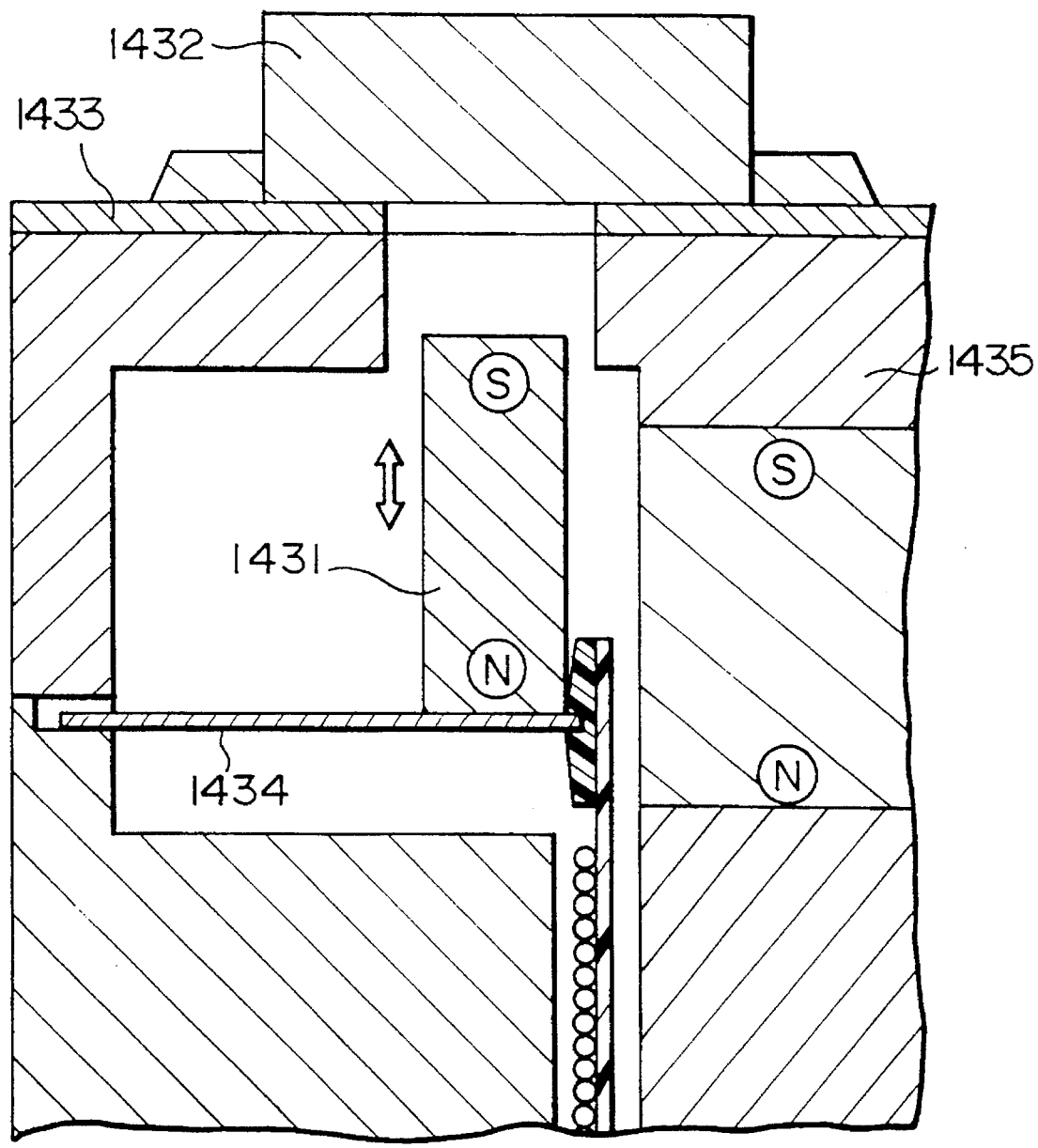
FIG. 7 is a partially sectional view of an actuator including a Hall sensor which is used in a second embodiment of the present invention.

FIG. 7 shows a modification of the first embodiment shown in FIG. 6. In FIG. 7, the reference numeral 1431 represents a magnet, 1432 a Hall sensor, and 1433 a substrate for fixing the Hall sensor 1432.

In this structure, the magnet 1431 is fixed to a gimbal spring 1434 of the movable portion of the actuator on the opposite side of the magnetic head. The magnetic flux of the magnet 1431 which leaks out to the outside of the actuator from the hole formed in a yoke 1435 is detected by the Hall sensor 1432 fixed on the substrate 1433. The intensity of the magnetic flux of the magnet 1431 represents the position of the movable portion in the same way as in the embodiment shown in FIG. 6. In the second embodiment, it is unnecessary to take the influence of the leaked magnetic field of the magnet 1431 on the magnetic head into consideration.

(4) Third embodiment

The first and second embodiment, the position of the magnetic head is magnetically detected. In a third embodiment, the position of the magnetic head is detected by an optical position detecting means.

Figure 8:
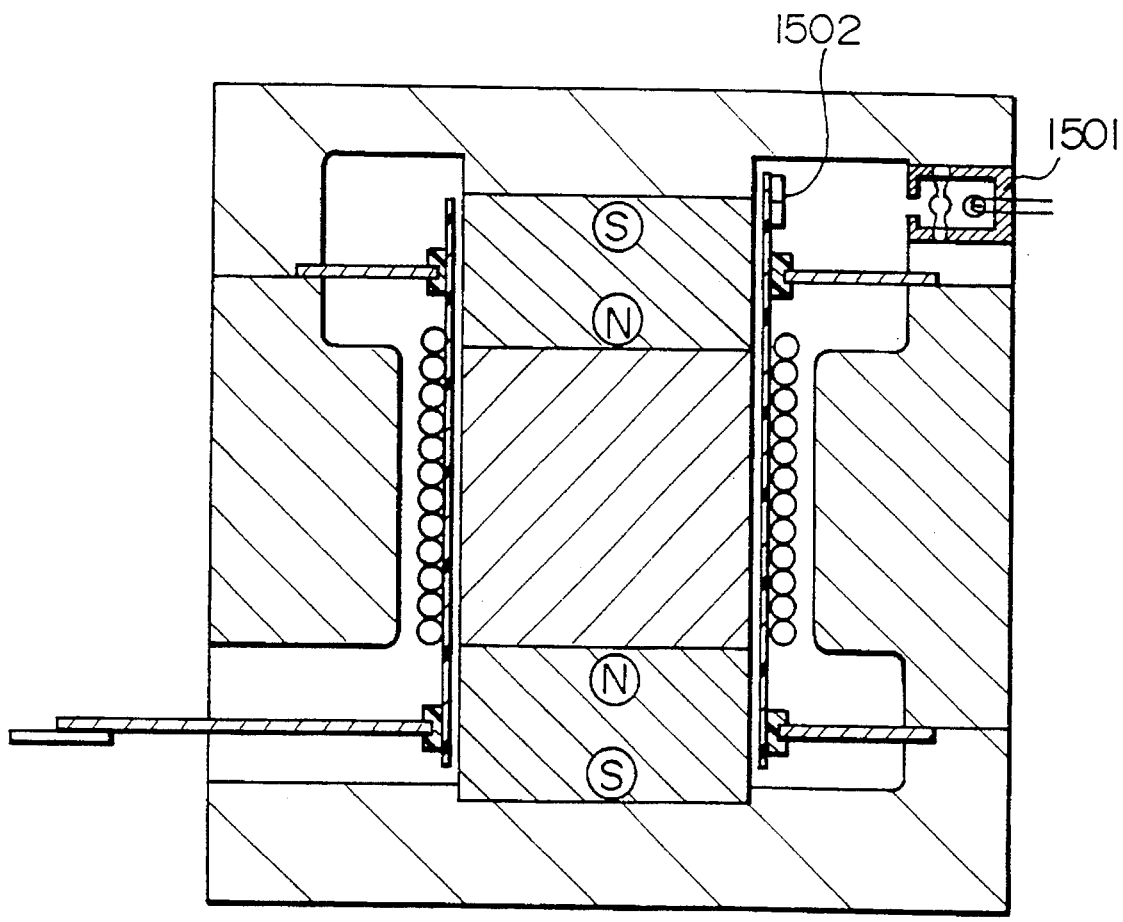
FIG. 8 is a sectional view of an actuator including an optical position detecting means which is used in a third embodiment of the present invention.

FIG. 8 is an example of an optical position detecting means using an optical sensor which is attached to the actuator. In FIG. 8, the reference numeral 1501 represents a light emitting portion for emitting parallel rays, and 1502 a two-piece detector (light receiving portion) composed of a photodiode or the like.

In this embodiment, the light (in this case, the light is converted into parallel rays by a lens) from the light emitting portion 1501 which is attached to the fixed portion of the actuator is detected by the light receiving portion 1502 which is composed of a two-piece photodiode or the like and fixed to the movable portion. When the movable portion moves, the amount of light received on one side of the two-piece diode becomes larger than that on the other side. It is therefore possible to detect the position of the movable portion by obtaining the difference between the photocurrents flowing on both sides of the photodiode.

(5) Fourth embodiment

Figure 9:
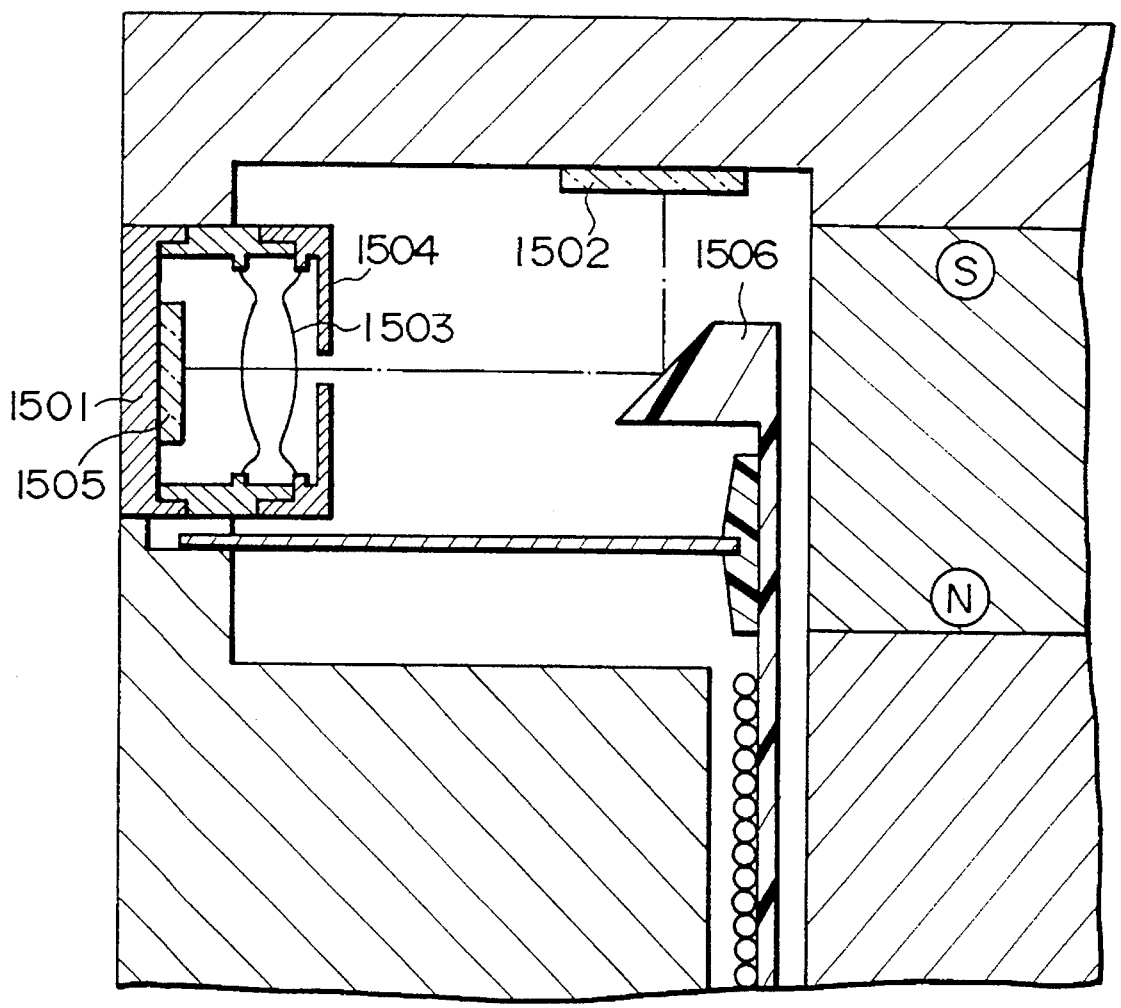
FIG. 9 is a partially sectional view of an actuator including an optical position detecting means which is used in a fourth embodiment of the present invention and which is a modification of the actuator shown in FIG. 8.

FIG. 9 shows a modification of the embodiment shown in FIG. 8. In FIG. 9, the reference numeral 1503 represents a lens for converting the light from a light emitting element 1505 which is composed of an LED or the like into parallel rays, 1504 a light emitting aperture (stop), and 1506 a mirror for reflecting the parallel rays from the lens 1503. Only the mirror 1506 for reflecting light is mounted on the movable portion, and the light emitting portion 1501 and the light receiving portion 1502 composed of a photodiode or the like are mounted on the fixed portion. In this case, the light from the light emitting element 1505 which is composed of an LED, a semiconductor laser or the like is converted into parallel rays by the lens 1503. At this time, in order to obtain parallel rays, it is necessary that the light emitting element 1505 is disposed at the rear focus point of the lens 1503. The position of the magnetic head is detected by the optical sensor shown in FIG. 9 on the principle shown in FIG. 10.

Figure 10:
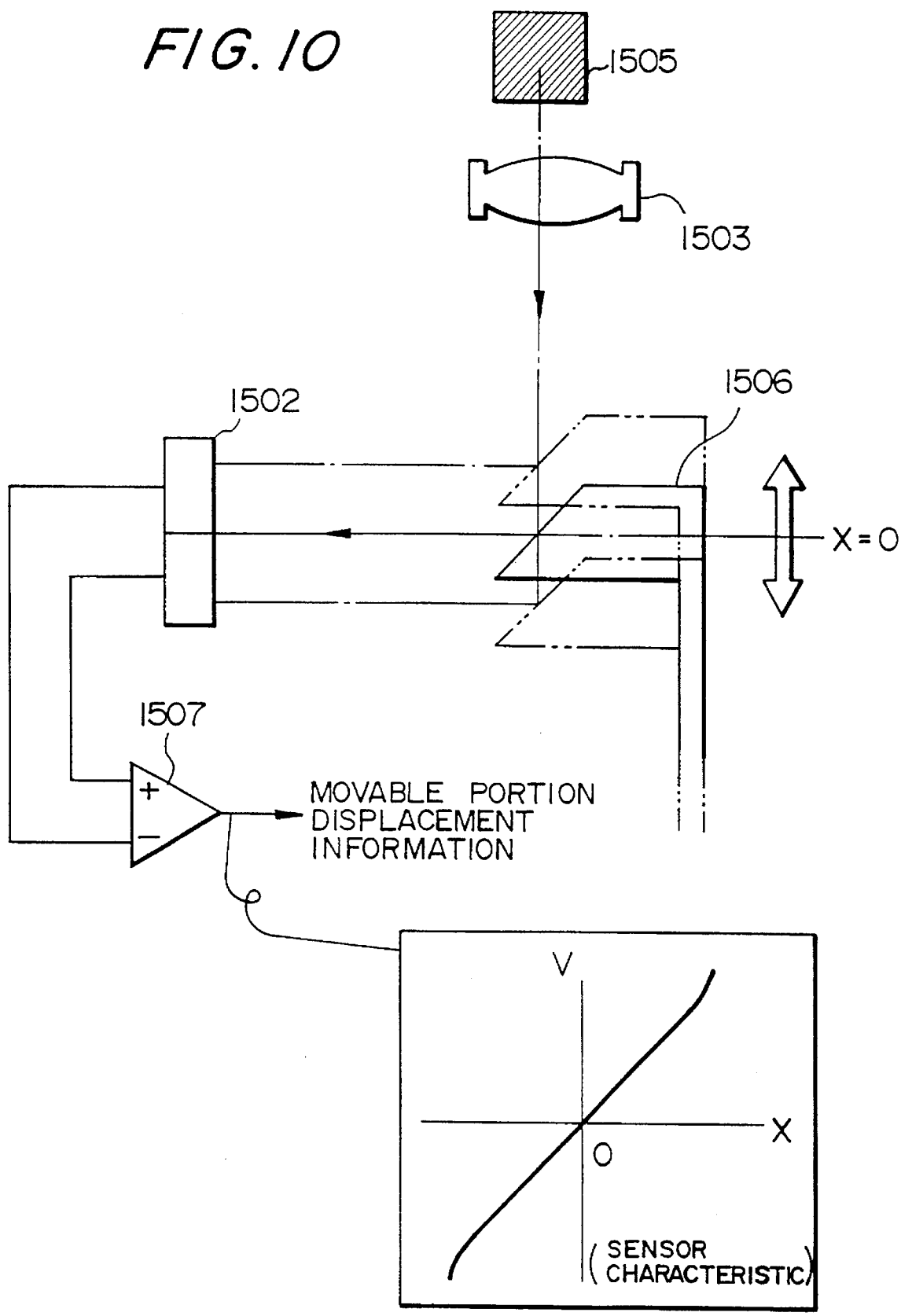
FIG. 10 shows the principle of position detection by means of the actuator shown in FIG. 9.

FIG. 10 shows the principle of detecting the amount of displacement of the movable portion by the optical sensor shown in FIG. 9. The reference numeral 1507 represents a differential amplifier for obtaining the difference in photocurrent on the two-piece detector 1502 and amplifying the difference obtained.

In FIG. 10, when the mirror 1506 which is integrally provided with the movable portion moves horizontally (in this case, the direction of movement of the mirror is regulated to a uniaxial direction by a gimbal spring or the like), the parallel rays emitted from the light emitting element 1505 also move on the light receiving element 1505 in parallel with the movable portion. As a result, a difference arises between the amounts of light on both sides of the two-piece photodiode, for example, in the same way as in FIG. 8, and the output of the differential amplifier 1507 is obtained as a position detection signal.

It goes without saying that an optical position detecting means composed of the light emitting portion which is mounted on the movable portion and the light receiving portion which is mounted on the fixed portion produces a similar effect.

It is also possible to detect the position of the movable portion by other position detecting means than the above-described magnetic or optical position detecting means. For example, an element which is generally called a strain gauge and the magnetic resistance of which changes when it is bent may be attached to the leaf spring or gimbal spring of the movable head actuator so that the deformation of the leaf spring or the gimbal spring is detected as a change in the magnetic resistance. A constant current is applied to the strain gauge and a change in voltage is read or a resistor for current detection is connected in series to the strain gauge, and the voltages on both ends of the resistor are read when a constant voltage is applied to the strain gauge, thereby detecting the position of the movable portion. Alternatively, a capacity sensor for detecting the capacity may be disposed in the vicinity of the movable portion such that the distance between the capacity sensor and the movable portion changes with the movement of the movable portion. The position of the movable portion can be detected by electrically detecting the capacity of the capacity sensor. It goes without saying that in the case of using a conventional bimorph actuator, it is possible to take out the amount of displacement of bimorph except the DC component by cutting a part of the bimorph, as shown in the examples of a conventional device. In this case, the output of displacement does not contain the DC component, but since the DC component is not always necessary in the observer shown in FIG. 1, the output of displacement can be input as a position detection signal used for the observer. However, unless the DC component is cut from the driving voltage which is input to the observer, a prediction error relating to the DC is naturally caused in the estimated error, so that the observer cannot function.

In the case in which it is impossible to take out the position detection signal to the outside of the rotary drum, an annular substrate may be attached to the interior of the drum, and the driver of the actuator, the sensor amplifier and the observer are provided within the annular substrate. The observer can be operated on the basis of the voltage supplied from the slip ring for driving the actuator. This method is applicable to any of the above-described position detecting systems.

(6) Fifth embodiment

It is also possible to take out the position detection signal to the outside of the rotary drum and provide the observer and the driver outside of the drum. An example thereof is shown in FIG. 11.

Figure 11:
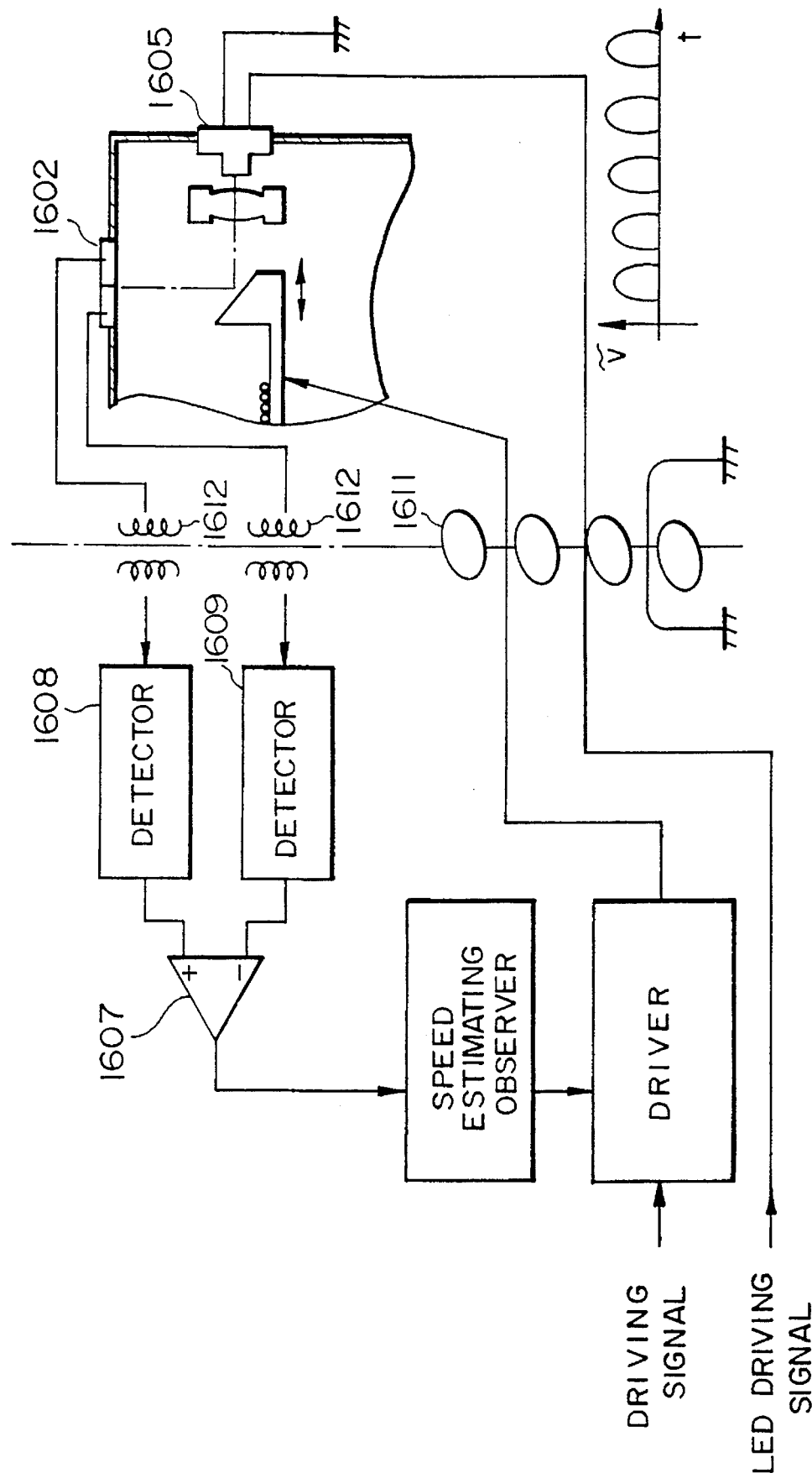
FIG. 11 is a block diagram of the structure of a fifth embodiment of the present invention in which a circuit structure such as an observer is disposed outside of a drum.

FIG. 11 is an embodiment in which an optical sensor is used in order to detect the position of the actuator, and the observer and the driver are provided outside of the rotary drum. In FIG. 11, the reference numerals 1608, 1609 represent detectors. An LED or a laser element, which is a light emitting element 1605 of the optical sensor, is driven by a driving signal shown in FIG. 11 so as to flash light. In this case, the frequency for flashing is adequately higher than the observer frequency band and in the frequency range which can pass through a rotary transformer 1612. In FIG. 11, the driving signal for the light emitting element 1605 is driven by a slip ring 1611. Alternatively, the light emitting element 1605 can be driven by transmitting the driving signal by a rotary transformer having a large capacity or supplying a power source by another means (a rotary transformer having a large capacity or a slip ring) and supplying only a command signal.

The light flashed in this way is converted into an AC photoelectric current by a light receiving element 1602 through a mirror 1606. Since the photoelectric current is a signal in the frequency band which the rotary transformer 1612 can transmit, it easily passes through the rotary transformer 1612 and it is converted into the amount of light received by the light receiving element 1602 by the detector 1608 outside of the rotary drum. The amount of light is taken out as the amount of displacement of the movable portion of the actuator by a differential amplifier 1607.

In the case of a capacitive sensor, it is possible to utilize the capacity of the sensor and provide a coil so as to constitute an LC oscillator, and subject an AC signal which is output from the oscillator to the outside of the rotary transformer to frequency-voltage conversion (F/V conversion) to take out a movable portion position signal. A similar effect is also produced by taking out an AC signal to the outside of the drum through the rotary transformer by a voltage-frequency converter (FM modulator), voltage-pulse width converter (PWM modulator), voltage-AC amplitude converter (AM modulator) or the like, which is provided in the drum.

(7) Characteristics of control systems

Figure 12:
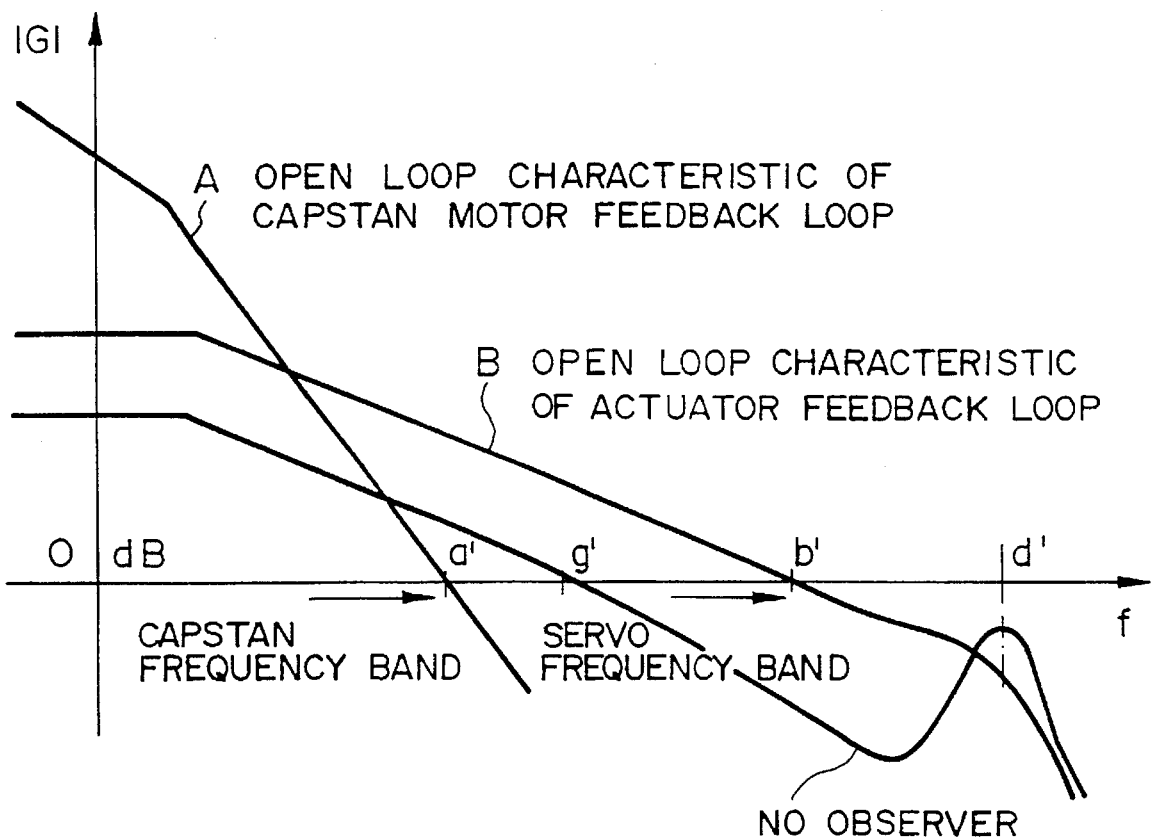
FIG. 12 shows the characteristics of a control system, in particular, the characteristic of each loop.
Figure 13:
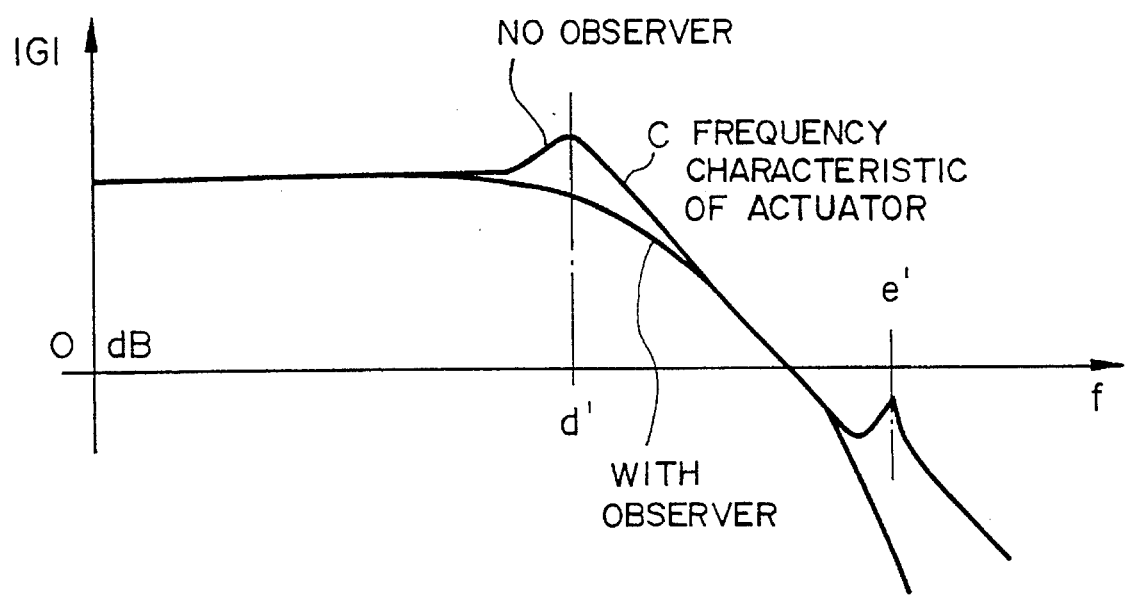
FIG. 13 shows the characteristics of a control system, in particular, the electrical damping operation in an actuator.
Figure 14:
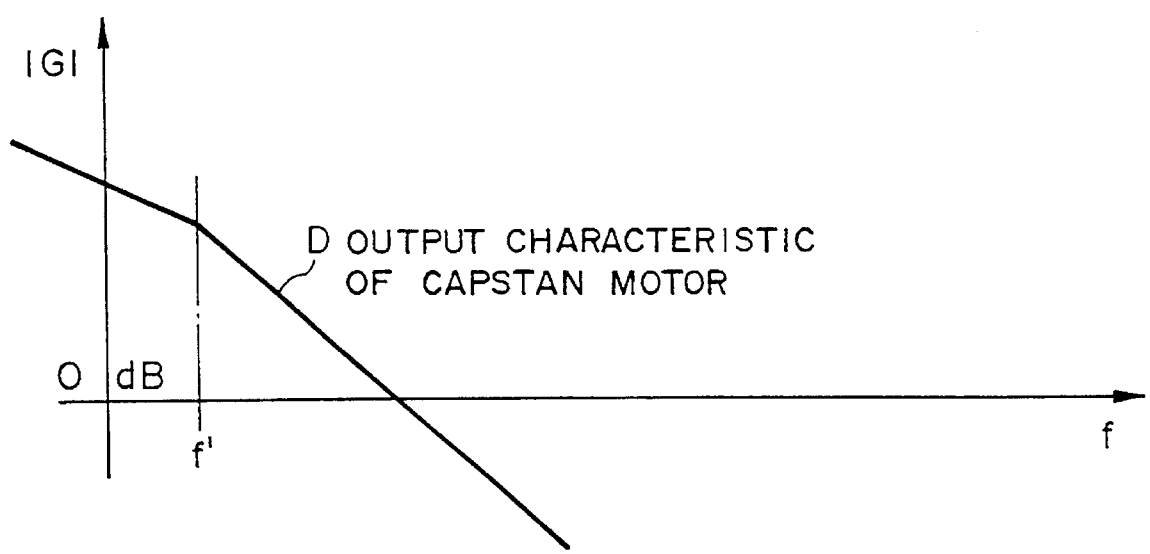
FIG. 14 shows the characteristics of a control system, in particular, output characteristic of a capstan motor.

FIGS. 12 to 14 show the characteristic of the movable head tracking control system, the characteristic of the actuator and the open loop characteristic (gain characteristic) of the capstan motor control system in the case of using the observer.

Figure 15:
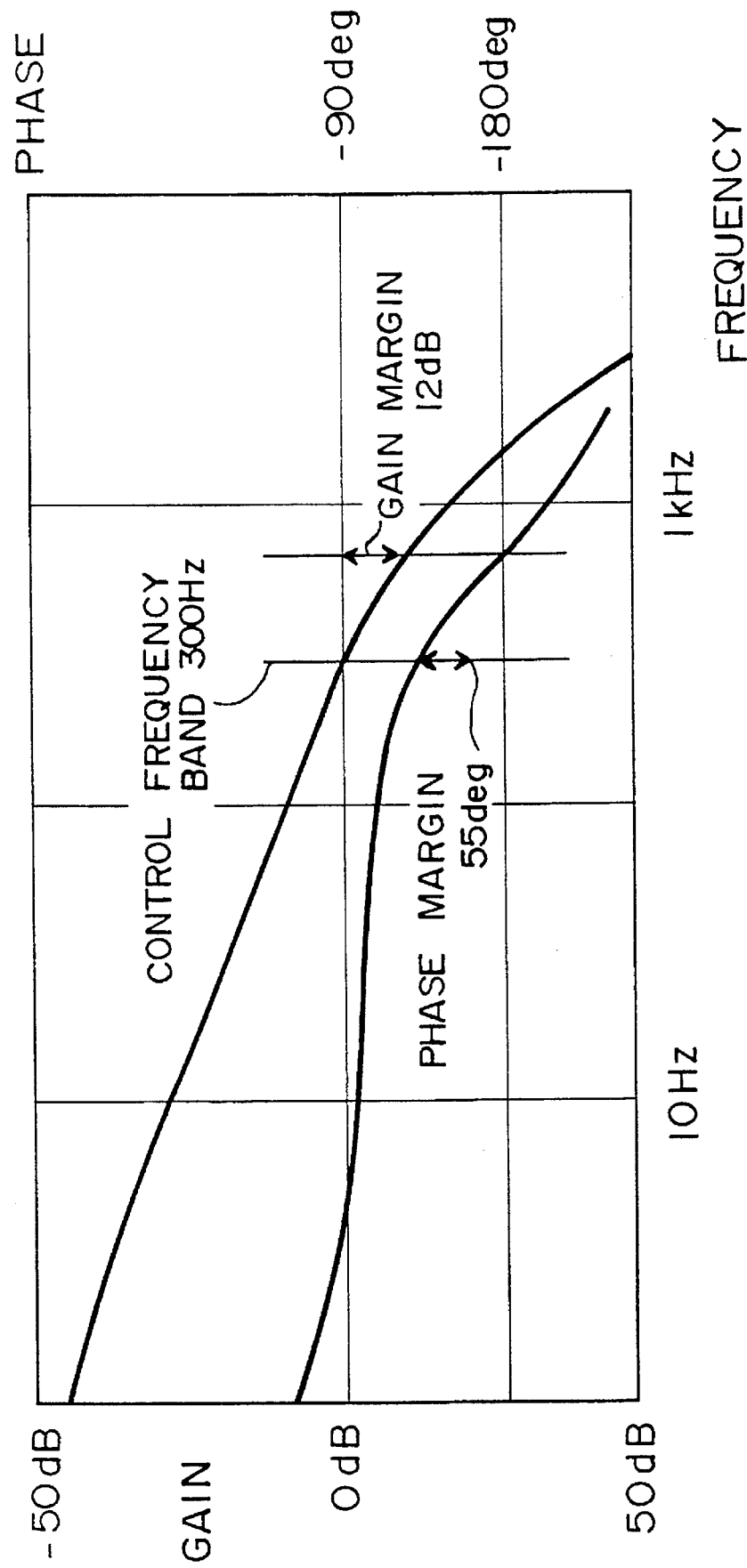
FIG. 15 shows the characteristic of a control system, in particular, the output characteristic of a capstan motor.

According to the magnetic head actuator composed of the means for detecting the position of the head and the observer, it is possible to suppress the resonance peak gain by electrical damping, as shown in FIG. 13 and, as a result, constitute an actuator tracking control system, as shown by the control system open loop characteristic B in FIG. 12. If there is no electrical damping by the observer, since the peak gain is protuberant at the serial resonance frequency d', the control frequency band must be lowered to g' in order to maintain the stability with due consideration to the gain margin. (At this time, since the phase of the control system open loop characteristic is reversed to −180° at the frequency d', if the open loop gain at the frequency d' approaches 0 dB, the control system oscillates. If the low-frequency component of the tracking error signal is fed back to the motor, since the capstan motor has the open loop characteristics such as those shown in FIGS. 12 and 14, the synthetic control characteristic in the case of closing both the capstan loop and the tracking loop corresponds to the characteristic obtained by taking the maximum gain at each frequency in FIG. 12. That is, on the low-frequency side, the capstan loop is dominant, while on the high-frequency side, the actuator loop is dominant. FIG. 15 shows an example of the open loop characteristic of the actuator tracking control system.

(9) Sixth example

Although in the first embodiment shown in FIG. 4, an observer is utilized for reproducing a pilot signal from the recorded track and detecting the direction and the amount of off-track, it is also possible to suppress unnecessary mechanical resonance of the actuator, enlarge the control frequency band, increase the stability and prevent unnecessary vibration in the wobbling system in which a pilot signal is not recorded and the magnetic head is vibrated minutely so as to control tracking in accordance with a change in the amplitude of the reproduction signal.

Figure 16:
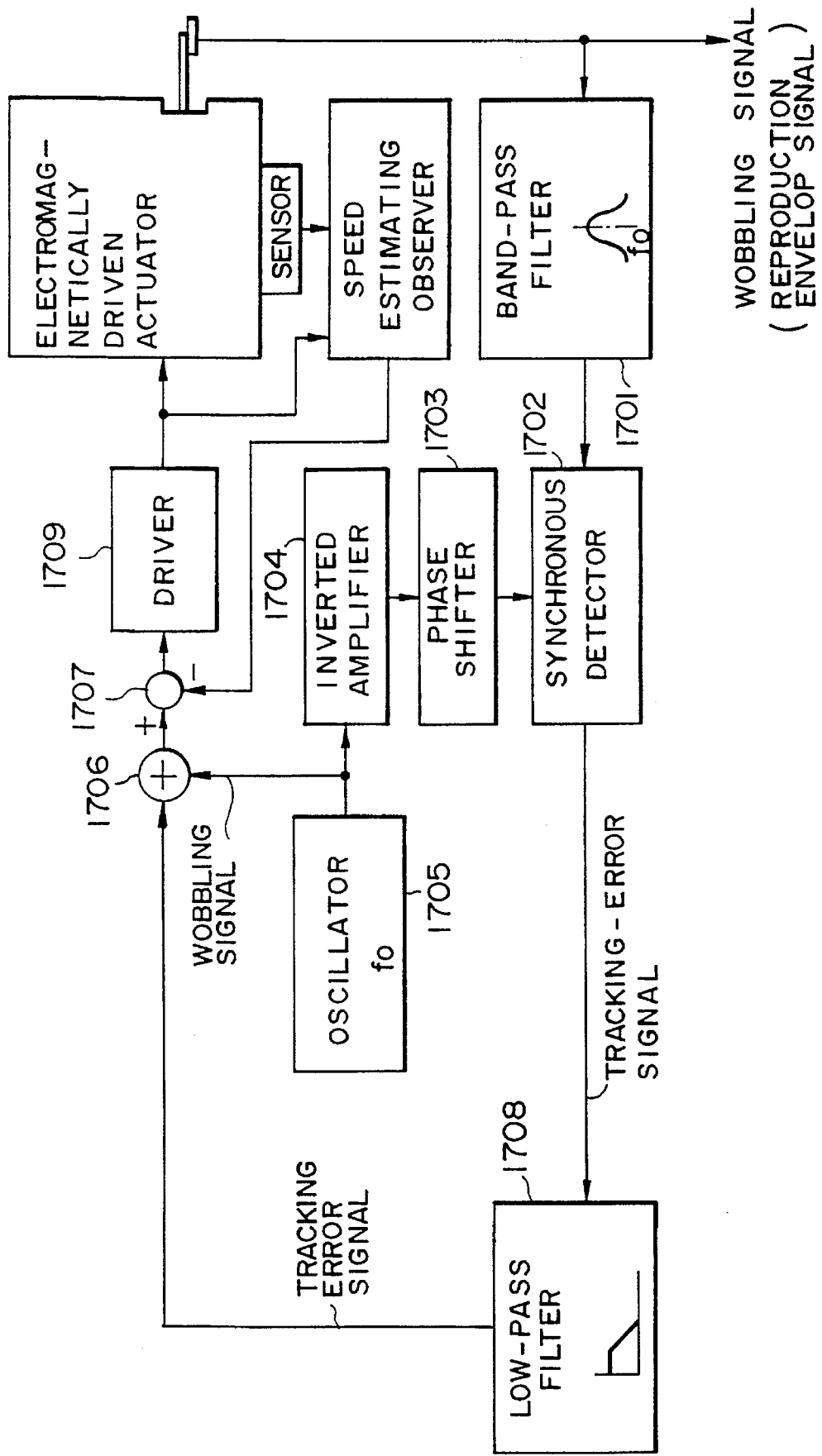
FIG. 16 shows the structure of a sixth embodiment of the present invention which adopts a wobbling system.

FIG. 16 shows a sixth embodiment of the present invention in which an observer is incorporated into a wobbling system. In FIG. 16, the reference numeral 1701 represents a band-pass filter for taking out only the wobbling frequency from the reproduction signal, 1702 a synchronous detector for taking out the direction and the amount of off-track from the signal output from the band-pass filter 1701, and 1703 a phase shifter for shifting the phase by the amount which is equivalent to the mechanical phase delay of the actuator. The reference numeral 1704 represents an inverted amplifier, 1705 an oscillator for generating a reference signal for wobbling operation, 1706 an adder for adding a wobbling signal for minutely vibrating a control signal, 1707 a subtracter for feeding back the estimated speed of an observer, and 1708 a low-pass filter (compensator) for maintaining the stability of the control loop.

In this embodiment, only the wobbling frequency contained in the reproduction signal amplitude is extracted by the band-pass filter 1701. The synchronous detector 1702 synchronously detects the command signal which is minutely vibrating the actuator by using a signal with the phase shifted by the amount equivalent to the mechanical phase delay of the actuator at the minute vibrating frequency by the phase shifter 1703, or multiplies the command signal by the shifted signal. In this way, it is possible to detect the direction and the amount of off-track. The phase of the tracking error signal obtained in this way is compensated for by the low-pass filter 1708, and the wobbling signal for minutely vibrating the actuator is added to the tracking error signal. Thereafter, the output of the observer is fed back by the subtracter 1707 and the actuator is driven by a driver 1709, thereby executing tracking control.

(10) Seventh embodiment

Figure 17:
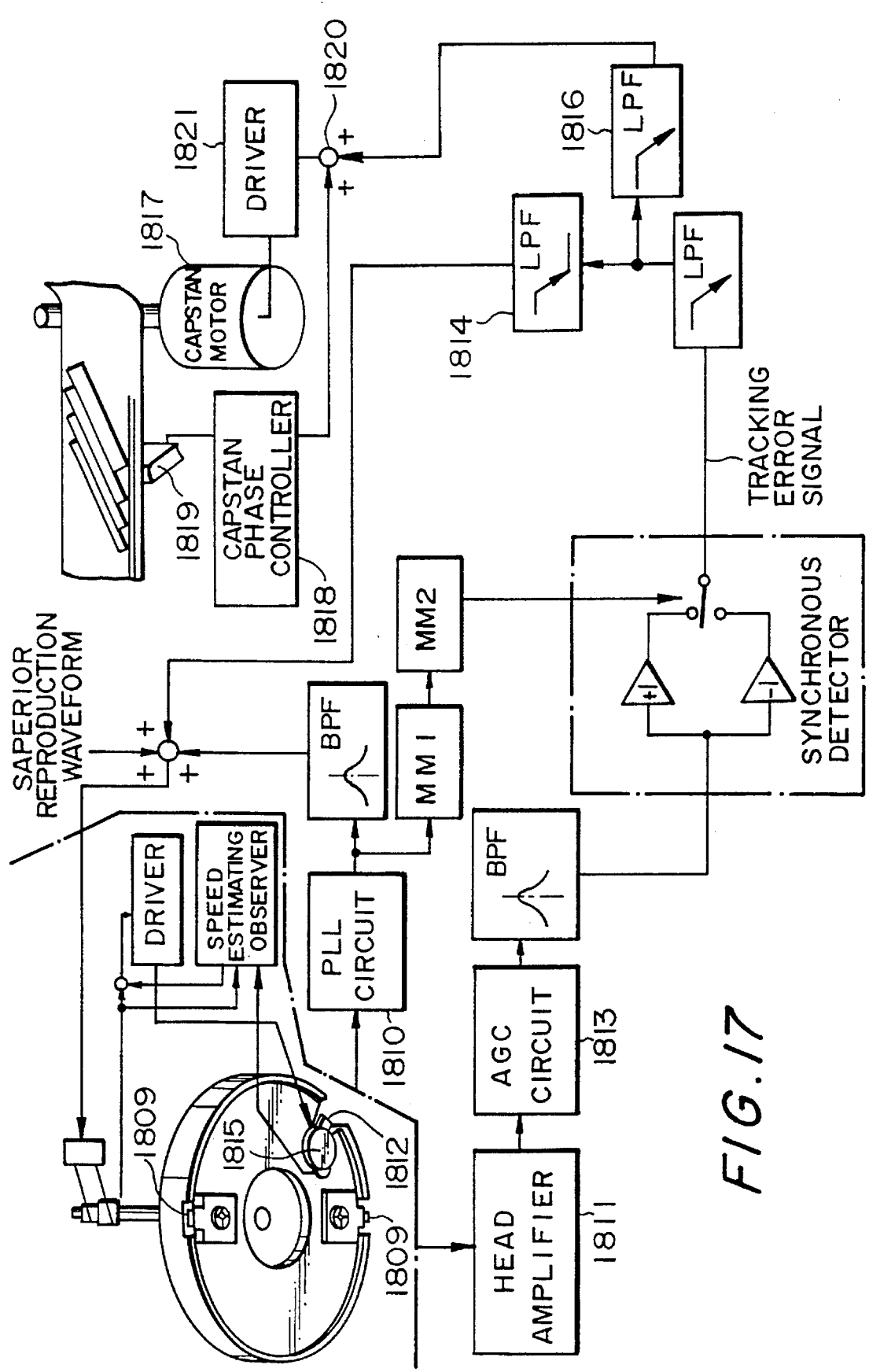
FIG. 17 shows the structure of a seventh embodiment of the present invention, which is a modification of the sixth embodiment shown in FIG. 16.
Figure 18:
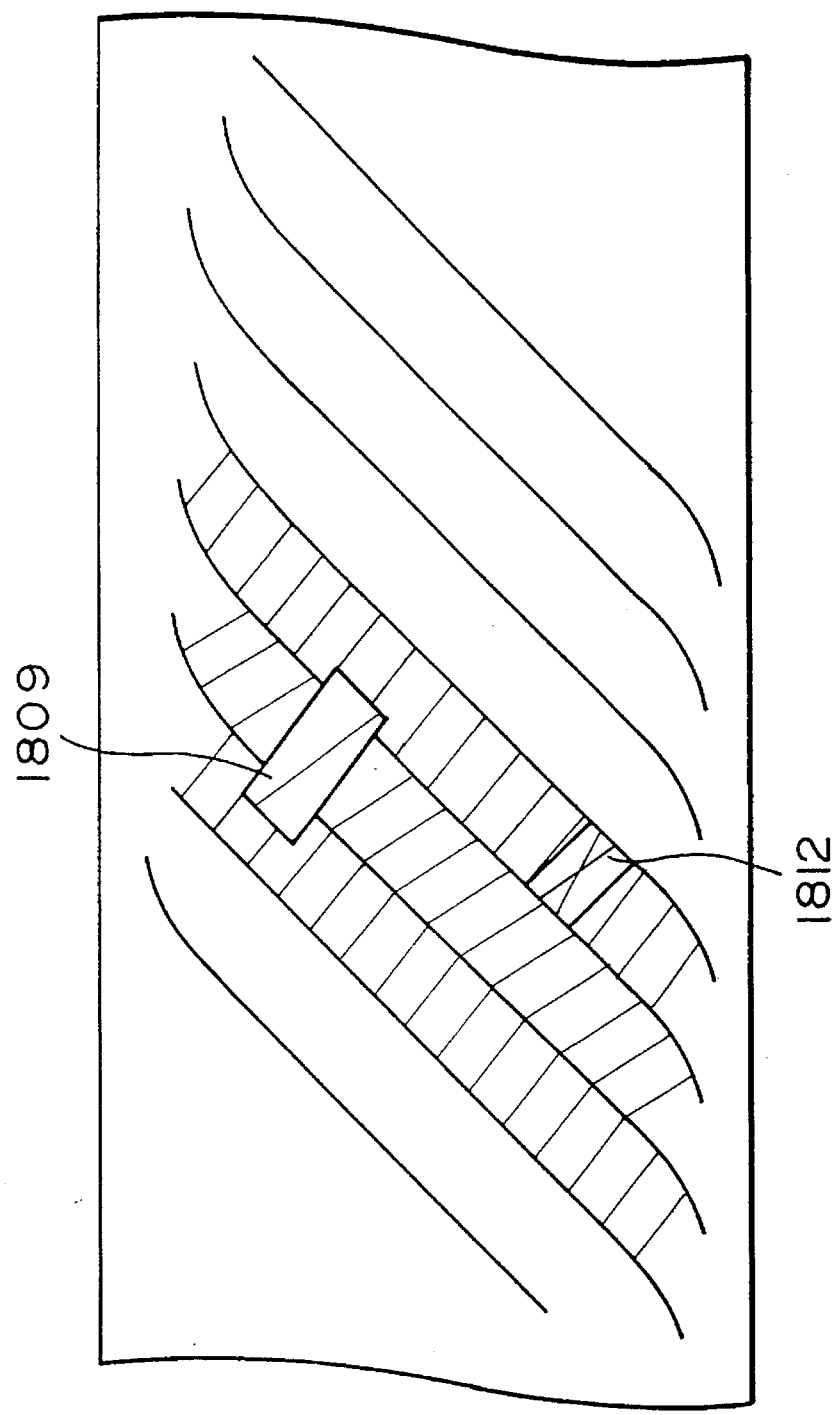
FIG. 18 shows the magnetic heads in the seventh embodiment in the state of tracing on the magnetic tape.

FIG. 17 shows a modification of the embodiment shown in FIG. 16. In FIG. 17, the reference numeral 1809 represents a fixed head, 1810 a phase locked loop (PLL) circuit for eliminating a jitter contained in a drum rotational angle detection signal, and 1811 a head amplifier for amplifying a minute signal output from a movable head 1812. The reference numeral 1813 denotes an automatic gain control circuit (AGC) for holding the amplitude of the reproduction envelope signal output from the head amplifier 1811 constant irrespective of the fluctuation of the movement of the magnetic head, the tension of the tape or the like, 1814 a low-pass filter for supplying a necessary frequency band for a control signal to an actuator 1815 of the movable head 1812, and 1816 a low-pass filter for supplying a low-frequency component of the control signal to a capstan motor 1817. The reference numeral 1818 denotes a capstan phase controller for reading the phase information output written on the linear track and output from a CTL pulse by means of a CTL head 1819 and controlling the phase oh the basis of the phase information, and 1820 an adder for adding the CTL phase control loop and the wobbling control loop and controlling the capstan motor 1817 through a driver 1821. FIG. 18 shows the magnetic heads 1809, 1812 in the state of tracing on the recorded tracking pattern.

In this embodiment, the wobbling system shown in FIG. 16 is adopted and the low-frequency component of a tracking error signal is fed back to the capstan motor. In the capstan control system, a low-frequency component of a tracking error signal with the phase thereof compensated in the wobbling system is fed back to the conventional phase control loop for controlling the phase in accordance with the CTL signal (phase detection) from the linear track. In FIG. 17, not only the movable head 1812 driven by the actuator 1815 but also the fixed head 1809 is shown. Since the low-frequency component of the tracking error signal is constantly fed back to the capstan motor 1817, the height of the movable head 1812 is constantly automatically adjusted with respect to the fixed head 1809, so that the movable head 1812 follows only non-linearity of track.

In the case of the head structure shown in FIG. 17, it is generally preferable that the head width of the fixed head 1809 is larger than the track width, as shown in FIG. 18, so that a signal can be sufficiently picked up even if there is a non-linearity of track.

(11) Concrete structure of observer

Figure 19:
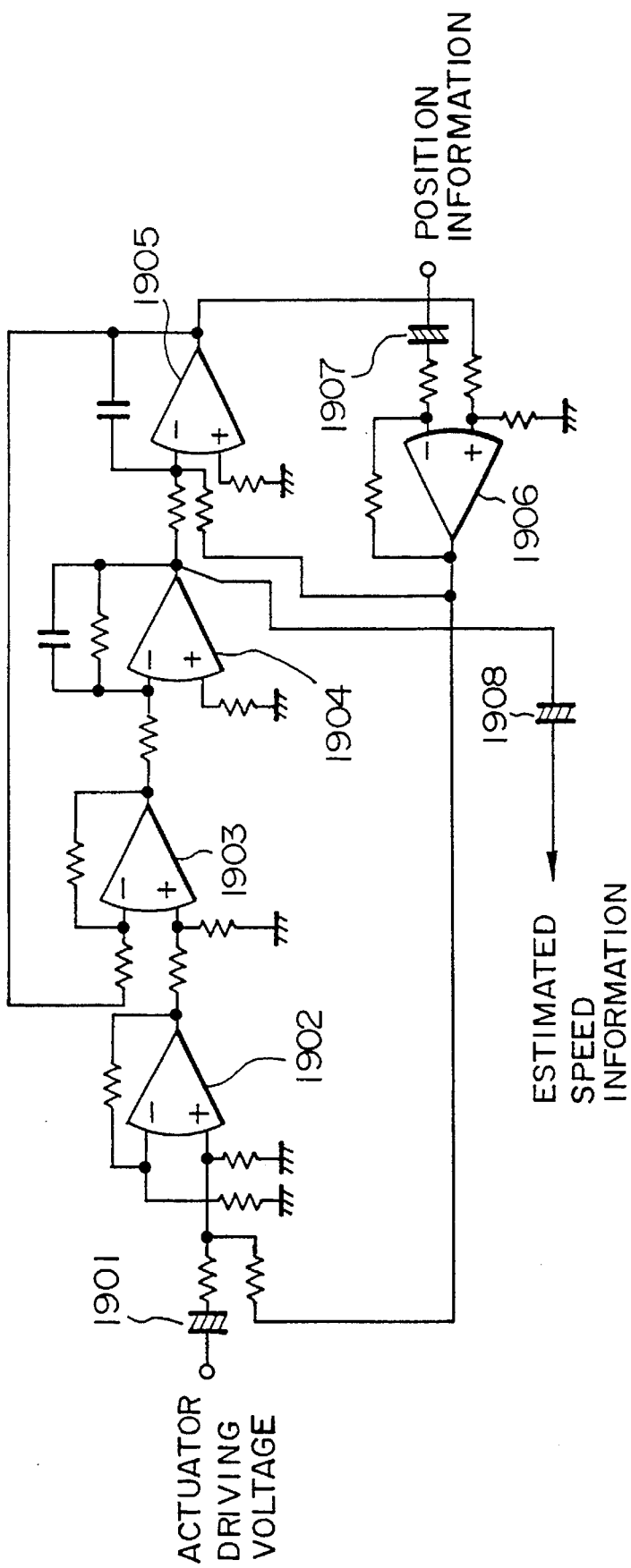
FIG. 19 is a circuit diagram of an observer composed of an analog circuit.

An example of an observer composed of an analog circuit is shown in FIG. 19.

In FIG. 19, the reference numeral 1901 represents a capacitor for taking out only the AC component of an actuator driving voltage, 1902 an amplifier for adding the feedback signal in the observer and the driving voltage and amplifying the sum, and 1903 an amplifier for feeding back the loop which simulates the spring constant in the observer. The reference numeral 1904 represents a filter for realizing the transfer characteristic which simulates the viscosity and the mass of the actuator in the observer, 1905 a filter constituting an integrator in the observer, 1906 a comparator for taking out the difference between the position information and the estimated position information from the observer, 1907 a capacitor for taking out only the AC component contained in the position information, and 1908 a capacitor for outputting only an AC component contained in the estimated speed information.

In an analog differential amplifier, an offset is apt to be produced due to a temperature drift or the like. Therefore, in the case of an observer composed of an analog circuit, it is desirable to insert the capacitors 1901, 1907 which eliminate the DC component from the actuator driving voltage input to the observer or the position information input from the position sensor. This is because since the frequency band in which damping is mainly necessary in the tracking control system is the frequency band in the vicinity of which mechanical resonance is existent, the DC component is unnecessary there.

In the circuit shown in FIG. 19, the transfer characteristic of the observer shown in FIG. 1 is simulated as it is. The R, Kd, Kt, k, F1 and F2 in FIG. 1 exist in FIG. 19 as they are as the amplifier gains. The block 1406 in FIG. 1 corresponds to an active filter using the operational amplifier 1904, and the block 1407 corresponds to the integrator using the operational amplifier 1905. The subtracter portion for obtaining the estimated error shown in FIG. 1 is composed of the operational amplifier 1906 in this embodiment, and the output of the operational amplifier 1906 has the gains which correspond to F1 and F2, respectively, in FIG. 1 and the output is fed back to the operational amplifiers 1902 to 1905 of the observer equivalent circuit. In the structure shown in FIG. 19, it is possible to unite the operational amplifiers 1903, 1904 into one active filter, thereby omitting one operational amplifier.

Although the observer is composed of an analog circuit in FIG. 19, a similar effect is obtained by expressing the transfer function shown in FIG. 1 by a software in a microcomputer or the like.

Although the control system shown in FIG. 19 is applied to a VTR, it goes without saying that a similar effect is obtained when this control system is applied to a tracking control system of a magnetic disk apparatus or an optical disk apparatus.

Although the above-described observer is composed of a co-dimensional observer in the modern control theory, it goes without saying a similar effect is obtained by an observer composed of a minimal order observer. In this case, there is no equivalent circuit and the result of solving the state equation representing the actuator characteristics by algorithm by a general minimal order observer (e.g., the minimal order observer by Gopinath) is realized as it is by the circuit.

(12) Details of damping control

A technique of electrically damping a movable head actuator by an observer has been explained above. There is a case in which the movable head is not used for tracking and used only for superior reproduction as in a commercially available VTR or the like. In this case, it is also necessary to suppress the mechanical resonance of the actuator for the purpose of accurately moving the actuator with respect to a waveform for superior reproduction and suppressing unnecessary vibration. It goes without saying that the mechanical resonance and unnecessary vibration can be suppressed by the electrical damping by the above-described system using the observer and the position sensor. However, if the electrical damping required is so small as to only suffice for the followability of the actuator to the waveform of superior reproduction and if a control system is required to have a low cost, a simplified damping circuit of a counter electromotive force feedback system may be adopted.

FIG. 20 shows the principle of a damping controller which utilizes a counter electromotive force. In FIG. 20, the reference numeral 2001 represents an equivalent coil having an electric characteristic equivalent to that of an actuator coil, 2002 and 2003 current detecting resistors, and 2004 a differential amplifier for detecting a counter electromotive force.

In this system, the equivalent coil 2001 having an electric characteristic equivalent to that of an actuator coil is connected in parallel to a driver 2005, the currents flowing on the respective current paths are detected by the current detecting resistors 2002, 2003, and the counter electromotive force is detected as the output of the differential amplifier 2004 and fed back to the original driving voltage. (At this time, since the equivalent coil 2001 does not move nor generate a counter electromotive force, a potential difference is generated on the voltages of the resistors 2003 and 2002 due to the counter electromotive force of the actuator coil, and this potential difference is detected.) However, since there is a difference between the current on the equivalent coil 2001 and the coil in the actuator 2006 due to a temperature drift or the like, the counter electromotive force detected is not accurate.

Figure 21:
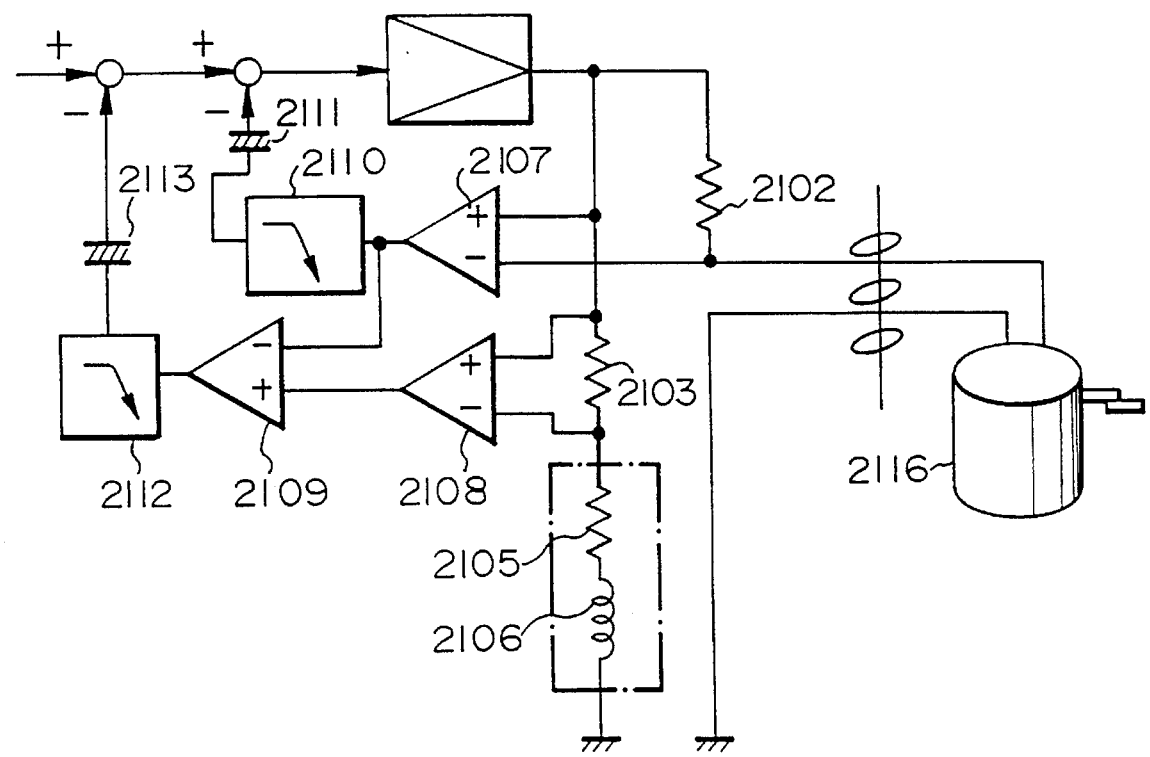

It is therefore preferable that simplified damping is carried out by a circuit such as that shown in FIG. 21.

FIG. 21 shows the structure of a damping circuit of a counter electromotive force feedback system. In FIG. 21, the reference numeral 2105 represents a resistor which simulates the resistance component of an actuator coil, 2106 a coil which simulates the inductance of the actuator coil, 2107 and 2108 differential amplifiers which simulate the voltages at both ends of current detecting resistors 2102 and 2103, respectively, 2109 a differential amplifier for taking out a counter electromotive force, 2110 a filter for limiting a frequency band of the current feedback loop, 2112 a filter for limiting a frequency band of a counter electromotive force feedback loop, and 2111 and 2113 capacitors for eliminating the DC components of the respective loops.

The voltages at both ends of the current detecting resistors 2102, 2103 are detected by the differential amplifiers 2107 and 2108. Since the output of the differential amplifier 2107 corresponds to the driving current for an actuator 2116, after the output is limited to a necessary frequency band by the filter 2110, it is fed back to the original control system through the capacitor 2111 for eliminating the DC component, thereby constituting a current feedback loop. Depending upon the frequency band in which the cut-off frequency of the filter 2110 is set, either a voltage driving system (in a frequency band in which current feedback is not executed) or a current driving system (in a frequency band in which current feedback is executed) is adopted as the driving system for the actuator 2116.

In addition, by detecting the difference between the voltages at both ends of the two current detecting resistors 2102, 2103 by the differential amplifier 2109, it is possible to take out the counter electromotive force of the actuator 2116, limiting the frequency band of the counter electromotive force by the filter 2112 and feed it back through the capacitor 2113 which eliminates the DC component, thereby electrically constituting a counter electromotive force feedback loop and damping the actuator 2116.

By making the gain of the differential amplifier 2109 variable, it is possible to make the amount of feedback and, hence, the amount of damping variable. It goes without saying that by using a band-pass filter which transmits only the mechanical resonance frequency component of the actuator as the filter 2112, it is possible to reduce the influence of the mechanical resonance.

Since the detected counter electromotive force is proportional to the speed of the actuator, it is similar to the estimated speed output from the speed observer. It is therefore clear that the actuator is damped by feeding back the detected counter electromotive force. However, when the estimation of the observer is compared with the detection of a counter electromotive force, if the position sensor used for the observer has high accuracy, since the speed estimated by the observer is more accurate than the detected counter electromotive force, if the higher-order mechanical resonance suppressing effect of the observer and the damping circuit including only an integrator are taken into consideration, the observer can secure a larger speed feedback gain and damp the actuator to a larger extent.

(13) Advantages of the first to second embodiments

As described above, according to the above-described embodiments, since the influence of the mechanical resonance of the actuator on the movable magnetic head is reduced by feeding back the speed estimated by the speed estimating observer to the actuator driving signal, the tracking following accuracy is enhanced. Consequently, the amount of off-track of the magnetic head is reduced, so that the recording density (tracking density) of a magnetic tape apparatus or the like is enhanced.

At the time of superior reproduction, it is also possible to improve the response of the actuator to a waveform for superior reproduction and to suppress the unnecessary vibration of the movable magnetic head.

In the examples shown in FIGS. 20 and 21, an equivalent coil which has an electric characteristic equivalent to that of a coil in the actuator is provided, and the estimated speed of the actuator obtained by detecting the counter electromotive force generated by the actuator coil is fed back to the actuator driving signal. Although this system is inferior in accuracy to the system using the observer, the former is effective when the electrical damping required is so small as to only suffice for the followability of the actuator to the waveform of superior reproduction and when a control system is required to have a low cost.

(14) Eighth embodiment

FIG. 22 and 23 show the structure of an eighth embodiment of the present invention.

A head 2201 for a narrow tracking pitch for a long-time mode and a head 2202 for a wide tracking pitch are attached to the present VTR system. These heads 2201, 2202 are mounted on a gimbal spring 2203.

In the conventional system, the position at which the AC magnetic field generator is disposed represents the absolute height of the movable head from the deck base.

In other words, in the conventional system, if the position at which the levels of the signals output from the two AC magnetic field generators and reproduced by the magnetic head are equal is determined as a desired height of the magnetic head, the reference absolute height varies depending upon the accuracy for mounting the AC magnetic field generators on the deck base. Although it is possible to use the height of a fixed head as the reference of the absolute height of the movable head, in this case, the movable head can only be so controlled as to be the same height as the fixed head such as an audio head. This is because since the magnetic field generated by the AC magnetic field generator and the detection sensitivity of the head amplifier for the magnetic head fluctuate with a change in temperature or the like, as described in the conventional examples, the influence of fluctuation is eliminated by controlling the magnetic head so as to be at the position at which the difference between the two detection signals is zero.

In order to form a recording pattern on the magnetic tape in accordance with various recording formats in the present VTR, there is a case in which the height of the movable head must be so controlled as not to be equal to the height of the fixed head but to be a little deviated from the height of the fixed head. To meet such demand, in this embodiment, a spacer 2204 is inserted between the gimbal spring 2203 and the magnetic head 2202, as shown in FIG. 23. For example, at the time of magnetic recording by the head for wide tracking pitch, the conventional AC magnetic field for detecting the height is reproduced by the magnetic head 2201 for a narrow tracking pitch. By closing the conventional magnetic head height control system, it is possible to situate the head 2201 for a narrow tracking pitch at the same height as the reference fixed head (e.g., audio magnetic head), and to shift the reference height of the head 2202 for a wide tracking pitch after control by the amount equivalent to the height of the spacer 2204 in FIG. 23.

(15) Ninth embodiment

Since the head for reproducing an AC magnetic field for the purpose of detecting the height need not actually magnetically record or reproduce information on the magnetic tape, such a head must be replaced by a magnetic field detector having a simple structure. FIG. 24 shows the external appearance of an absolute height detecting element 2206 mounted on a rotary drum 2205 in a ninth embodiment of the present invention. The reference numeral 2207 represents a detection coil. The gap and the amount of projection of the magnetic field detection in FIG. 24 need not be strictly determined. However, it is natural that the amount of projection must not be so large as to damage the magnetic tape. It is possible to move the movable head to a desired absolute height by mechanically adjusting the position of the magnetic field detector having such a simple structure to the desired height at which the movable head must be situated and by controlling the detector and the movable head so as to be at the same height by a conventional control system.

It is possible to judge whether or not the movable head is at a desired absolute height with accuracy by the above-described means.

(16) Tenth embodiment

In detecting the absolute height of the movable head by an AC magnetic field, it is possible to increase the current applied to the external magnetic field generating coil to such an extent that does not deteriorate a signal due to electromagnetic interference with a head amplifier or the like in the VTR. If the magnetic field generated by the magnetic field generating coil is increased, since the detection sensitivity for the absolute height of the movable head is enhanced, the accuracy for following the target value of the control system is improved. However, if the reproduction signal amplifier provided in a conventional VTR system is used, the signal is sometimes saturated depending upon the dynamic range of the reproduction signal amplifier. This is because the magnetic field generated by the AC magnetic field generating coil is much stronger than the minute magnetic field which is reproduced from the magnetic tape. It is therefore necessary to amplify the AC signal for detecting height which is obtained through the rotary transformer by an amplifier different from the conventional reproduction signal amplifier, as shown in FIG. 25.

FIG. 25 is a circuit diagram of the structure of a detection signal amplifier of an absolute height detector in a tenth embodiment of the present invention. The reference numeral 2208 represents a band-pass filter and 2209 a switching transistor. FIG. 26 shows the operation mode for the switching transistor 2209 with respect to one rotation of the rotary drum.

Since the height detection signal is obtained on the back side of the drum on which the detection head is not in contact with the magnetic tape, it is possible to take out the height detection signal through the switching transistor 2209.

In addition, by switching the four switching transistors 2209 between the modes in FIG. 25, it is possible to switch the amplifier between the recording, reproducing, detecting and in-operatinve functions.

The recording and reproduction modes for the switching transistor 2209 are switched by the rotational position of the detecting head, as shown in FIG. 26. It goes without saying that the amplifier for only reproducing the height detection signal need not have the structure shown in FIG. 25 and it may be composed of a combination of a band-pass filter and a position detection signal amplifier.

The arrangement of each head on the drum and the channels for the absolute height detecting head in the rotary transformer will now be explained.

Since the recording current flows on the recording head which is in contact with the magnetic tape during recording by a VTR, the absolute height detection signal from the AC magnetic field generating coil may be disturbed by the crosstalk between the channels of the rotary transformer. For this reason, it is necessary to keep the channel for applying the recording current away from the channel for detecting the absolute height.

For example, in the case of the present VHS VTR system having the head arrangement shown in FIG. 27, the arrangement of channels in the rotary transformer is such as that shown in FIG. 28. In order to simplify the relationship between the channel for applying the recording current and the channel for detecting the head height, the sections in which respective heads come into sliding contact with the tape in the case of the head arrangement shown in FIG. 27 are schematically represented with the head 2HR as the reference. From FIG. 29, it is clear that the heads 2HR, 6HL, AR approximately simultaneously come into sliding contact with the magnetic tape and that the heads 2HR, 6HL, AL approximately simultaneously come into sliding contact with the magnetic tape. It is therefore necessary to keep the heads 2HL, 6HR and AL away from the heads 2HR, 6HL, AL, respectively, in the channels of the rotary transformer. Since the audio head is generally kept away from the video head in order to avert the influence of crosstalk, it is possible to insert the channel for the flying erase head or the channel for exclusively for height detection, which is generally not used at the time of normal reproduction, between the channels for 2HS and 6HS in place of the short-circuiting ring which is used for preventing crosstalk between channels of the rotary transformer in the present VTR, and to short-circuit the terminal of the rotary transformer at this channel at the time of reproduction. The symbol 2HS represents a detector with the height adjusted to the reference height of the movable head 2H, and 6HS a detector with the height adjusted to the reference height of the movable head 6H.

(17) Eleventh embodiment

In the conventional system, the height of the movable head is detected only at one position per rotation of the drum, so that only one control is possible at every rotation of the drum. In a system the apparatus of which as a whole is exposed to an external disturbance such as a system installed on an automobile and a portable system, recording in accordance with the tape format may sometimes be impossible due to the vibration or displacement of the movable head within one rotation of the drum.

This problem will become serious if the recording density is enhanced and the tracking pitch becomes very narrow in the near future. It is therefore necessary to have a structure in which an ordinary movable head is fixed during the control of the absolute height at every rotation of the drum so as to make the heads insusceptible to the influence of vibration of the like. For this structure, a means for constantly detecting the height of the movable head is necessary. In this case, however, the absolute value of the sensor for constantly detecting the height of the movable head need not be accurate so long as there is a means for detecting the absolute height of the movable head at every rotation of the drum. It is possible to prevent the deviation of the head due to vibration during the rotation of drum if the absolute height of the movable head is detected by the above-described reproduced magnetic field of the AC magnetic field generating coil and the height of the movable head is so controlled that the output of the sensor for constantly detecting the height of the movable head is constant during the period from one detection of the absolute height to the next detection.

In order to detect the position of the head in the position control system during one rotation of the drum, the structure shown in FIG. 6 or the structure shown in FIG. 7 is used in this embodiment. Use of either of these structures not only enables the detection of the position but also exerts no deleterious influence of leaked magnetic flux on the head. It is also possible to use the apparatuses for optical position detection shown in FIGS. 8 to 10. Alternatively, a strain gauge may be used. Use of a piezoelectric generator type sensor formed by cutting a part of a bimorph for the detection of the absolute height is also effective.

(18) Twelfth embodiment

It is possible to utilize the output of the above-described position sensor which can constantly detect the height of the movable head and suppress the mechanical resonance of the actuator, enhance the controllability of the movable head and make the movable head insusceptible to external vibration by a damping loop composed of the following means for electrically estimating the speed. In this damping loop produced on the basis of the output of the position sensor which can constantly detect the height of the movable head, it is possible to prevent the control frequency band for the position control from being restricted to a low-frequency band due to the mechanical resonance of the movable head actuator.

In order to move the magnetic head in the drum, it is necessary to move the magnetic head uniaxially, namely, only in the direction parallel to the rotational axis of the drum. It is therefore necessary to separate the driving portion from the magnetic head or attach the magnetic head to the end of a cantilever or a leaf spring in a bimorph actuator or electromagnetically driven actuator shown in the conventional examples.

For this reason, there exists a large mechanical resonance which is characteristic of a leaf spring, as seen in the transfer characteristic (displacement-driving voltage or current characteristic) of the bimorph actuator or electromagnetically driven actuator in the conventional examples.

Since the large mechanical resonance reverses the phase in the vicinity of the serial resonance frequency, for example, in the phase control system having a phase delay compensator, the control frequency band is limited to a frequency sufficiently lower the primary resonance frequency, generally, about 1/10 to 1/several tenths of the primary resonance frequency. This is firstly because it is impossible to secure a sufficient phase margin of the control system due to the influence of the phase reversal in the vicinity of the resonance point, and secondly because if the resonance peak gain is large, the gain margin beyond the control frequency band (generally, it is necessary that the open loop gain of the control system at the frequency in the frequency band higher than the control frequency band at which the phase is $-180°$ is $-10$ to $20$ dB) becomes smaller than the resonance peak gain, so that the control system becomes unstable. In the case of setting the control frequency band between the primary resonance point and the secondary resonance point by compensating for the phase delay by a phase advancing circuit, it is necessary that the primary mechanical resonance frequency is adequately distant from the secondary serial resonance frequency or the parallel resonance frequency. In the system having a movable portion in the shape of a leaf spring such as the actuator of the movable magnetic head in a VTR, since it is impossible to take a sufficient difference between the primary resonance frequency and the secondary or higher-order resonance frequency, the phase advancing circuit for compensation is not often adopted. It is therefore necessary to electrically damp the large mechanical resonance characteristic which is characteristic of the movable magnetic head actuator of a VTR so as to have the actuator having a good controllability. However, if the damping means is composed of a differentiator as in the related art, the noise of the position sensor is increased and the tracking controllability is rather deteriorated.

Such a problem can be solved by using a speed estimating observer, as described above. In other words, it is preferable that a circuit shown in FIG. 30 is composed of an observer having the structure shown in FIG. 1 and adopting the analog structure shown in FIG. 19.

FIG. 30 shows the structure of a twelfth embodiment of the present invention, adopting a speed estimating observer. In this embodiment, the position of the movable portion of an actuator 2301 is detected by a a position detector 2302 and the detected position is input to a speed estimating observer 2303 and a position control compensator 2304. The output of the speed estimating observer 2303 is fed back to the input terminal of a driving signal amplifier 2305 through a damping loop and the position control compensator 2304 feeds back the output of the speed estimating observer 2302 to the input terminal of the driving signal amplifier 2305.

An absolute height detecting sensor 2305 for detecting the height of the head in the actuator 2301 is provided. The sensor 2305 may have any of the above-described structures. The output of the sensor 2305 is input to an absolute height detector 2306, and the output of the absolute height detector 2306 is fed back to a low frequency compensator 2307 after it is subtracted from the command for the absolute height.

The open loop gains of the respective feedback loops shown in FIG. 30 are preferably set as shown in FIGS. 31 and 32. The characteristics of the low frequency compensator 2307 are preferably set as shown in FIGS. 33 to 35, and the characteristics of the position control compensator 2304 are preferably set as shown in FIGS. 37 and 38. If the low frequency compensator 2307 has a structure such as that shown in FIG. 36, the elements a to c have the characteristics shown in FIGS. 33 to 35, respectively. If the position control compensator 2304 has a structure such as that shown in FIG. 39, the elements a and b have the characteristics shown in FIGS. 37 and 38, respectively.

Needless to say, if the system shown in FIG. 30 includes neither the position control loop no the damping control loop, the position of the head is controlled only by the control of the absolute height at each rotation of the drum and the height of the head is apt to deviate. If the system does not include the damping control loop, the ratio of suppression of the deviation of the height during one rotation is lowered, so that the head is apt to vibrate. On the other hand, if the system does not include the position control loop, although the head is unlikely to vibrate, the ratio of suppression of the deviation of the height is lowered to approximately zero. When the movable portion of the actuator has a high rigidity or viscosity, however, the system shown in FIG. 30 is free from the above-described problems even if the above two minor loops are eliminated from the absolute height correction loop. In the system shown in FIG. 30, by making the open loop gain of the absolute height correction loop larger on the low frequency side and smaller on the high frequency side than that of the position control loop containing the damping loop, the system for controlling the movable head so as to be constantly at the absolute height during the rotation of the drum is realized.

In this case, the gain of the absolute height correction loop may be compensated for on the low frequency side in the form of a secondary delay, as shown in FIG. 31. Alternatively, the DC component of the position control loop may be cut so as to lower the gain on the low frequency side, as shown in FIG. 32.

In order to realize the open loop characteristic such as that shown in FIG. 31, it is necessary to insert a filter having frequency characteristics such as those shown in FIGS. 33 to 36 as the low frequency compensator 2304 in FIG. 30.

The symbols a to c in FIG. 36 represent a lag-lead filter, a primary low-pass filter and a secondary low-pass filter, respectively, each of which is generally known. It is also necessary that the position control compensator 2397 has a structure such as that shown in FIG. 39. The symbols a and b in FIG. 39 represent a low-pass filter and a high-pass filter, respectively, each of which is well known. Naturally, these structures can be realized by an analog circuit which is composed of a capacitor and a resistor, or a digital filter.

Although amplified gain for compensating for a gain is not described in each compensator, a desired gain compensation is naturally necessary in order to realize the characteristics shown in FIGS. 31 and 32.

(19) Thirteenth embodiment

Although the system shown in FIG. 30 is composed of an analog circuit in the twelfth embodiment, it may also be produced by a software by using a high-speed digital computer such as a microprocessor.

FIG. 40 is a flowchart of the processings in the main routine of a control program in the case of realizing a position control system by using a software. In this routine, after starting and initializing the program, the following routine is repeated at every block to which the calculation period is instructed. A calculating subroutine which corresponds to the function of the speed estimating observer is first executed. A calculation subroutine which corresponds to the function of the position control system, in particular, the position control compensator is next executed. Thereafter, the calculation subroutine which corresponds to the function of the absolute height correction system, in particular, the absolute height detector and the low frequency compensator is executed. By subtracting the results of the first two subroutines from command for absolute height correction, the command value for driving the actuator is obtained.

The contents of the respective subroutines will be explained in the following. In the subroutine corresponding to the function of the observer, $K_1$ to $K_5$ are set at constants (Kd.Kt)/R, K, $F_1$, $F_2$ and $F_3$, respectively and variables A to B are serially calculated. The variables A to B are equivalent to the outputs of the blocks 1405 to 1409 in the observer shown in FIG. 1.

FIG. 42 is a flowchart of the position control subroutine in the flow shown in FIG. 40. The information about the actuator height is calculated and output through two digital filters.

FIG. 43 is a flowchart of the absolute height correction subroutine in the flow shown in FIG. 40. Absolute height information $Z_1$–$Z_2$ are averaged P times by using the count value P and after the averaged value is compensated for in a low frequency band by a digital filter, the compensated value is output as the absolute height.

The values $Z_1$ and $Z_2$ are obtained by picking up the output of the two AC magnetic field generating coils in the conventional examples by the absolute height detecting head and the movable head in the present invention, and amplifying the outputs by the amplifier shown in FIG. 25 and detecting the amplified output for peak holding or sample holding. The thus-obtained values $Z_1$ and $Z_2$ are subjected to A/D conversion and input to the microprocessor as the outputs of the respective AC magnetic field generating coils.

The above-described movable head position control system can adopt a hardware such as that shown in FIG. 44. In the case of detecting the position of the movable head by a position sensor, it is sometimes impossible to take the detection signal to the outside of the drum due to the limitation in number of the channels of the rotary transformer or in consideration of the influence of noise existent in a slip ring 2401. In the thirteenth embodiment shown in FIG. 44, a driver 2402 for an actuator and a speed estimating observer 2404 are provided on a printed circuit board 2403 within the drum, thereby enabling the actuator which is subject to electrical damping from the outside of the drum through the slip ring 2401.

(20) Fourteenth embodiment

On the other hand, it is also possible to take out the position detection signal to the outside of the rotary drum and providing the position controller and the driver outside of the drum. FIG. 45 shows an example thereof as a fourteenth embodiment of the present invention. An LED or a laser, which is a light emitting element 2502 of an optical sensor is flashed in accordance with a driving signal. At this time, the frequency of flashing is set in a frequency range which is sufficiently higher than the observer frequency band and which can pass through a rotary transformer 2502. In FIG. 45, the driving signal is supplied to the light emitting element 2501 through the slip ring 2503, but the light emitting element can be similarly flashed by transmitting the driving signal by a large-capacity transformer or supplying the power source by another means (large-capacity rotary transformer or slip ring) and supplying only a command signal to the light emitting element 2501.

The thus-flashed light is converted into an AC photocurrent by a light receiving element 1505 through a mirror 2504. Since the photocurrent is a photocurrent signal in the frequency range which the rotary transformer 2502 can transmit, it easily passes through the rotary transformer 2502. After the photocurrent is converted into the amount of light received by the light receiving element 2505, it is taken out as the amount of displacement of the movable portion of the actuator by a differential amplifier 2507.

In place of the optical sensor shown in FIG. 45, the above-described capacity sensor may be used. In this case, an LC oscillator is composed of the capacity of the sensor and a coil, and after the AC signal from the oscillator is taken out of the transformer and subjected to a frequency-voltage conversion (F/V conversion), the signal is taken out as the position signal of the movable portion. It goes without saying that a similar effect is also produced by taking out a signal to the outside of the drum through the rotary transformer by a voltage-frequency converter (FM modulator), voltage-pulse width converter (PWM modulator), voltage-AC amplitude converter (AM modulator) or the like, which is provided in the drum.

As described above, when the position signal of the movable portion is constantly taken out of the rotary transformer, the control system may be realized either by the above-described algorithm of a software or by an analog circuit. However, when the system is composed of the observer and the position controller provided on the rotary drum, there is a case in which the system must be composed of an analog circuit due to the limitation of the scale of the circuit. At this time, it is necessary to cut the DC component of the position signal input to the observer so as to prevent a drift from being produced on the analog calculated value of the observer.

It goes without saying that unless the DC component of the driving voltage input to the observer is similarly cut, a prediction error is produced in the estimated error due to the DC component, which inhibits the operation of the observer.

Such an analog structure does not produce any problem because the observer is in charge of a high frequency band of the position control system. In other words, there is almost no change in the pole-positioning shown in FIG. 3.

(21) Advantages of eighth to fourteenth embodiments

As described above, according to these embodiments, it is possible to control the movable head so as to be at a desired height and the electromagnetic induction signal of an AC magnetic field for detecting the absolute height is not interfered with the crosstalk from the recording signal current on the rotary transformer. It is also possible to take the amplified gain from the height detection signal amplifier separately from the gain of the information signal amplifier. It is thus possible to detect an accurate height. During the rotation of the drum, since the movable head is fixed to the height regulated by the position control by the position sensor which is provided in the actuator and the movable head is damped by the speed estimating observer, it is possible to prevent the vibration or displacement of the movable head due to the vibration of the magnetic recording and reproducing apparatus.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A movable head position controlling device for a magnetic recording and reproducing apparatus comprising:

a rotary drum;

magnetic head moving means, mounted on said rotary drum, for moving a magnetic head in a predetermined direction along a track of a magnetic tape at a speed which corresponds to a driving signal;

position detecting means for detecting the position of the magnetic head in the predetermined direction and outputting the result as a position deflection signal;

speed estimating means, mounted on said rotary drum, for estimating the speed of the magnetic head in the predetermined direction on the basis of the driving signal and the position deflection signal and outputting an estimated speed value, the estimated speed value subsequently being multiplied by a predetermined coefficient; and feedback and damping means for supplying a signal, which is obtained by subtracting the estimated speed value from an externally provided driving signal, to said magnetic head moving means as the driving signal to damp said magnetic head moving means.

2. The movable head position controlling device according to claim 1, wherein said speed estimating means is a co-dimensional observer including, a model block for electrically simulating the behavior of said magnetic head moving means and outputting an estimated position value of the magnetic head in the predetermined direction and the estimated speed value of the magnetic head; and estimated speed outputting means for multiplying the estimated speed value output from said model block by the predetermined coefficient.

3. The movable head position controlling device according to claim 2, wherein said speed estimating means includes, estimated error outputting means for subtracting the estimated position value of the magnetic head output from said model block from the position deflection signal and outputting the difference as an estimated error; and means for feeding back the estimated error to said model block.

4. The movable head position controlling device according to claim 1, wherein said magnetic head moving means includes, a fixed portion for supplying a constant magnetic field, and a movable portion for generating a magnetic field in accordance with the driving signal, said movable portion being moved in the predetermined direction by the interlinkage between the generated magnetic field and the constant magnetic field; and said position detecting means includes, a magnet fixed to the movable portion, a Hall sensor for detecting the magnetic field generated by said magnet fixed to said fixed portion, and means for outputting the position deflection signal which indicates the position of the magnetic head in the predetermined direction on the basis of the magnetic field detected by said Hall sensor.

5. The movable head position controlling device according to claim 4, wherein said position detecting means further includes means for magnetically shielding said magnet and the magnetic head.

6. The movable head position controlling device according to claim 1, wherein said magnetic head moving means includes, a fixed portion for supplying a constant magnetic field, and a movable portion for generating a magnetic field in accordance with the driving signal, said movable portion being moved in the predetermined direction by the interlinkage between the generated magnetic field and the constant magnetic field;

said position detecting means includes, a light emitting portion fixed to said fixed portion for emitting light, and a light receiving portion fixed to said movable portion for receiving the light emitted from said light emitting portion, detecting the degree of unbalance of the amount of light received, and outputting the position deflection signal which indicates the position of the magnetic head.

7. The movable head position controlling device according to claim 6, wherein said light receiving portion is divided into a plurality of light receiving pieces in the predetermined direction and each difference between said light receiving pieces is detected as the degree of unbalance of the amount of light received.

8. The movable head position controlling device according to claim 1, wherein said magnetic head moving means includes, a fixed portion for supplying a constant magnetic field; and a movable portion for generating a magnetic field in accordance with the driving signal, said movable portion being moved in the predetermined direction by the interlinkage between the generated magnetic field and the constant magnetic field; and said position detecting means includes, a light emitting portion fixed to said fixed portion for emitting light, reflecting means fixed to said movable portion for reflecting the light emitted from said light emitting portion, and a light receiving portion for receiving the light reflected by said reflecting means, detecting the degree of unbalance of the amount of light received, and outputting the position deflection signal which indicates the position of the magnetic head.

9. The movable head position controlling device according to claim 8, wherein said light receiving portion is divided into a plurality of light receiving pieces in the predetermined direction and each difference between said light receiving pieces is detected as the degree of unbalance of the amount of light received.

10. The movable head position controlling device according to claim 1, wherein said magnetic head moving means includes, an actuator mounted in a rotary drum and moving the magnetic head in the predetermined direction, and a driver for controlling said actuator in accordance with the driving signal.

11. A method of movable magnetic head position control of a magnetic recording and reproducing apparatus, the magnetic head being mounted on a rotary drum, the method comprising:

(a) moving the magnetic head in a predetermined direction along a track of a magnetic tape at a speed which corresponds to a driving signal;

(b) detecting the position of the magnetic head in the predetermined direction and providing a position deflection signal indicative thereof;

(c) estimating the speed of the magnetic head in the predetermined direction on the basis of the driving signal and the position deflection signal and providing an estimated speed value indicative thereof, the estimated speed value being multiplied by a predetermined coefficient; and (d) subtracting the estimated speed value from an externally provided driving signal to provide the driving signal as feedback for damping movement of the magnetic head, said step (c) of estimating occurring on the rotary drum.

12. The method of movable magnetic head position control of claim 11, wherein said step (c) comprises:

(c1) electrically simulating said step (a) of moving the magnetic head to provide an estimated position value of the magnetic head in the predetermined direction and the estimated speed value of the magnetic head; and (c2) multiplying the estimated speed value by the predetermined coefficient.

13. The method of movable magnetic head position control of claim 12, wherein step (c) further comprises:

(c3) subtracting the estimated position value of the magnetic head from the position deflection signal and providing the difference as an estimated error; and (c4) feeding back the estimated error for said step (c1) of electrically simulating.

14. The method of movable magnetic head position control of claim 11, wherein the magnetic recording and reproducing apparatus includes a magnetic head actuator having a fixed portion for supplying a constant magnetic field and a movable portion for generating a magnetic field in accordance with the driving signal, the movable portion being moved in the predetermined direction by the interlinkage between the generated magnetic field and the constant magnetic field, said step (b) comprising:

(b1) emitting a magnetic field from the movable portion;

(b2) detecting the magnetic field at the fixed portion; and (b3) providing the position deflection signal which indicates the position of the magnetic head in the predetermined direction on the basis of the detected magnetic field.

15. The method of movable magnetic head position control of claim 14, further comprising magnetically shielding the magnet and the magnetic head.

16. The method of movable magnetic position control of claim 11, wherein the magnetic recording and reproducing apparatus includes a magnetic head actuator having a fixed portion for supplying a constant magnetic field and a movable portion for generating a magnetic field in accordance with the driving signal, the movable portion being moved in the predetermined direction by the interlinkage between the generated magnetic field and the constant magnetic field, said step (b) comprising:

(b1) emitting light from the fixed portion; and (b2) receiving the emitted light at the movable portion, detecting the degree of unbalance of the amount of light received, and providing the position deflection signal which indicates the position of the magnetic head.

17. The method of movable magnetic head position control of claim 16, wherein said step (b2) comprises receiving the emitted light as divided into a plurality of light receiving pieces in the predetermined direction and detecting each difference between the light receiving pieces is detected as the degree of unbalance of the amount of light received.

18. The method of movable magnetic head position control of claim 11, wherein the magnetic recording and reproducing apparatus includes a magnetic head actuator having a fixed portion for supplying a constant magnetic field and a movable portion for generating a magnetic field in accordance with the driving signal, the movable portion being moved in the predetermined direction by the interlinkage between the generated magnetic field and the constant magnetic field, said step (b) comprising:

(b1) emitting light from the fixed portion;
(b2) reflecting the emitted light off the movable portion; and
(b3) receiving the reflected light, detecting the degree of unbalance of the amount of light received, and providing the position deflection signal which indicates the position of the magnetic head.

19. The method of movable magnetic head position control of claim 18, wherein said step (b3) comprises receiving the reflected light as divided into a plurality of light receiving pieces in the predetermined direction and detecting each difference between the light receiving pieces as the degree of unbalance of the amount of light received.

20. A method of driving a magnetic head with an actuator mounted upon a rotary drum comprising:

a) driving the magnetic head a desired direction in response to an applied input drive signal;
b) determining a position of the magnetic head to provide a position deflection signal;
c) modeling the performance of the actuator in accordance with at least position and velocity of the magnetic head to estimate actuator response based upon the input drive signal and the position deflection signal; and
d) modifying the input drive signal with the estimate of actuator response to improve magnetic head control accuracy in said step a) of driving, said step c) of modeling occurring on the rotary drum.

21. A method of driving a magnetic head with an actuator mounted upon a rotary drum comprising:

a) driving the magnetic head a desired direction in response to an applied input drive signal;
b) determining a position of the magnetic head to provide a position deflection signal;
c) modeling the performance of the actuator in accordance with position, velocity and acceleration of the magnetic head to estimate actuator response based upon the input drive signal and the position deflection signal; and
d) modifying the input drive signal with the estimate of actuator response to improve magnetic head control accuracy in said step a) of driving, said step c) of modeling occurring on the rotary drum.

* * * * *